US009917750B2

(12) United States Patent
Inoue et al.

(10) Patent No.: US 9,917,750 B2
(45) Date of Patent: Mar. 13, 2018

(54) METHOD FOR PROVIDING INFORMATION

(71) Applicant: PANASONIC INTELLECTUAL PROPERTY CORPORATION OF AMERICA, Torrance, CA (US)

(72) Inventors: Ryuji Inoue, Kanagawa (JP); Takamitsu Sasaki, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 404 days.

(21) Appl. No.: 14/720,058

(22) Filed: May 22, 2015

(65) Prior Publication Data

US 2015/0319056 A1 Nov. 5, 2015

Related U.S. Application Data

(63) Continuation of application No. PCT/JP2013/007415, filed on Dec. 17, 2013.

(Continued)

(51) Int. Cl.
*G06F 15/16* (2006.01)
*H04L 12/26* (2006.01)
(Continued)

(52) U.S. Cl.
CPC ........ *H04L 43/045* (2013.01); *G06F 17/2211* (2013.01); *G06Q 30/04* (2013.01); *G06Q 50/06* (2013.01)

(58) Field of Classification Search
CPC .................................................. H04L 43/045
(Continued)

(56) References Cited

U.S. PATENT DOCUMENTS

2010/0289652 A1\* 11/2010 Javey ....................... H04Q 9/00
340/605
2011/0289087 A1 11/2011 Kopp et al.
(Continued)

FOREIGN PATENT DOCUMENTS

JP   H11-120473   4/1999
JP   4134379      12/1999
(Continued)

OTHER PUBLICATIONS

Search report from International Bureau of WIPO, PCT/JP2013/007415, dated Mar. 11, 2014.

*Primary Examiner* — Karen Tang
(74) *Attorney, Agent, or Firm* — Greenblum & Bernstein, P.L.C.

(57) ABSTRACT

A method includes: inputting information indicating power usage corresponding to each of a plurality of user IDs; generating a differential value between i) a first cumulative value of power usage corresponding to a first user ID in a prescribed period and ii) a second cumulative value of power usage corresponding to a second user ID in the prescribed period; generating a first conversion value by converting the differential value to a use time of an electric home appliance corresponding to a first type among electric home appliances corresponding to the first user ID; generating display data indicating that the differential value corresponds to the first conversion value; and transmitting the display data to an information terminal device corresponding to the first user ID.

21 Claims, 38 Drawing Sheets

Related U.S. Application Data

(60) Provisional application No. 61/883,327, filed on Sep. 27, 2013.

(51) Int. Cl.
*G06F 17/22* (2006.01)
*G06Q 30/04* (2012.01)
*G06Q 50/06* (2012.01)

(58) Field of Classification Search
USPC .......................................................... 709/207
See application file for complete search history.

(56) References Cited

U.S. PATENT DOCUMENTS

| | | | | |
|---|---|---|---|---|
| 2012/0023816 A1* | 2/2012 | Lansu | ................ | A01G 9/1423 47/17 |
| 2012/0078427 A1* | 3/2012 | Jang | ................ | H02J 3/14 700/291 |
| 2012/0197451 A1* | 8/2012 | Jang | ................ | G06Q 10/063 700/291 |
| 2012/0203591 A1* | 8/2012 | Andoji | ................ | G06Q 10/0635 705/7.28 |
| 2012/0215369 A1* | 8/2012 | Desai | ................ | G06Q 10/06 700/291 |
| 2012/0232816 A1* | 9/2012 | Oh | ................ | G01D 4/004 702/62 |
| 2012/0280827 A1 | 11/2012 | Kashiwagi et al. | | |
| 2013/0080210 A1* | 3/2013 | Vogel | ................ | G06Q 10/06 705/7.33 |
| 2014/0188565 A1* | 7/2014 | Dantressangle | ....... | G06Q 50/06 705/7.33 |
| 2017/0116688 A1* | 4/2017 | Ahn | ................ | G06Q 50/06 |
| 2017/0116689 A1* | 4/2017 | Grossman | ................ | G06Q 50/06 |

FOREIGN PATENT DOCUMENTS

| | | |
|---|---|---|
| JP | 2002-189779 A | 7/2002 |
| JP | 2003-162787 | 6/2003 |
| JP | 2003-316922 | 11/2003 |
| JP | 2008-092681 A | 4/2008 |
| JP | 2009-47682 | 3/2009 |
| JP | 2010-218077 | 9/2010 |
| JP | 2012-133764 | 7/2012 |
| JP | 2012-515962 | 7/2012 |
| JP | 2012-234422 | 11/2012 |

* cited by examiner

FIG. 5

| USER ID | DATE | POWER CONSUMPTION(kWh) |
|---|---|---|
| U0001 | 2013/8/1 | 14.8 |

FIG. 6

| USER ID | DEVICE TYPE | DEVICE ID | ... | DEVICE USE HISTORY ||||...|
|---|---|---|---|---|---|---|---|---|
| | | | | 2013/08/01 | 2013/08/02 | 2013/08/03 | 2013/08/04 | ... |
| U0001 | AIR CONDITIONER | D001 | ... | 9:00~22:00 | 9:30~22:30 | 9:30~14:30<br>18:00~21:30 | 9:30~11:30 | ... |
| | | D002 | | — | 22:30~24:00 | 0:00~5:00<br>23:00~24:00 | 0:00~5:00 | |
| | | D003 | | — | — | 14:30~18:00 | — | |
| | TELEVISION SET | D004 | ... | 6:45~7:30<br>11:50~13:00<br>18:00~22:30 | 6:45~7:30<br>10:30~14:00<br>18:00~0:00 | 6:45~7:30<br>11:50~13:00<br>18:00~22:30 | 7:30~11:30 | ... |
| | | D005 | | 21:00~24:00 | 22:00~24:00 | — | — | |
| | REFRIGERATOR | D006 | ... | 0:00~24:00 | 0:00~24:00 | 0:00~24:00 | 0:00~24:00 | ... |
| | ... | ... | | | | | | |
| ... | | | | | | | | |

FIG. 7

| USER ID | HOUSEHOLD COMPOSITION | | POSTAL CODE | RESIDENCE TYPE | TYPE/NUMBER OF USED APPLIANCES | | | | |
|---|---|---|---|---|---|---|---|---|---|
| | ADULTS | MINORS | | | AIR CONDITIONER | REFRIGERATOR | LIGHTING FIXTURE | TELEVISION SET | ... |
| U0001 | 2 | 2 | 123-4567 | DETACHED HOUSE | 3 | 2 | 12 | 3 | ... |
| U0002 | 2 | 0 | 234-5678 | APARTMENT | 1 | 1 | 6 | 1 | ... |
| ... | ... | ... | ... | ... | ... | ... | ... | ... | ... |

FIG. 8

| USER ID | ... | MONTHLY POWER CONSUMPTION(kWh) | | | | | ... |
| --- | --- | --- | --- | --- | --- | --- | --- |
| | | 2013/04 | 2013/05 | 2013/06 | 2013/07 | 2013/08 | |
| U0001 | ... | 363.6 | 342.7 | 291.0 | 349.4 | 460.1 | ... |
| U0002 | ... | 300.1 | 293.8 | 238.4 | 285.1 | 369.1 | ... |
| ... | | ... | ... | ... | ... | ... | |

FIG. 9

| DEVICE TYPE | REFERENCE POWER CONSUMPTION (kW PER HOUR) |
|---|---|
| AIR CONDITIONER | 0.13 |
| REFRIGERATOR | 0.034 |
| LIGHTING FIXTURE | 0.05 |
| TELEVISION SET | 0.1 |
| ... | ... |

FIG. 33

| DEVICE TYPE | NON-SELECTED DEVICE FLAG |
|---|---|
| AIR CONDITIONER | 0 |
| REFRIGERATOR | 1 |
| LIGHTING FIXTURE | 0 |
| TELEVISION SET | 0 |
| ... | ... |

METHOD FOR PROVIDING INFORMATION

RELATED APPLICATIONS

This application is a continuation application of international Application No. PCT/JP2013/007415, filed Dec. 17, 2013, and claims the benefit of U.S. Provisional application No. 61/883,327, filed Sep. 27, 2013, the disclosures of which are incorporated by reference herein in their entireties.

TECHNICAL FIELD

The present disclosure relates to a method for providing information, an information management system, and an information terminal device for managing information related to usage of an electric home appliance in association with a user ID.

BACKGROUND ART

Conventionally, there are techniques for transmitting, to a client accessing an energy conservation supporting apparatus, response data comparing data related to an operational status of an electrical appliance system that is a target for energy conservation support with data related to an operational status of another electrical appliance system to be compared with the operational status of electrical appliance system that is the target for energy conservation support (for example, refer to Patent Literature 1). Accordingly, the energy conservation supporting apparatus can provide an energy conservation advice based on the comparison with an operational status of each electrical appliance in another electrical appliance system.

In addition, with respect to air conditioning devices, there are techniques for aggregating usage data and performing statistical processing in order to obtain at least one statistical value among an average value, a median value, and a standard deviation of usage data of a plurality of air conditioning devices and to compare usage data of specific air conditioning devices (for example, refer to Patent Literature 2). Accordingly, a user can objectively evaluate power usage of the user's own air conditioning device from a result of a comparative evaluation between the air conditioning device and another air conditioning device. Moreover, Patent Literature 2 describes extracting and comparing air conditioning devices used by families with a same number of members, by people of the same age, or by people who reside in the same area in order to eliminate differences in use environments and increase comparison accuracy.

However, the conventional art described above require further improvements.

Patent Literature 1: Japanese Patent Application Laid-open No. 2010-218077 (paragraphs [0048] to [0054], paragraph [0058], FIG. 8, and the like)

Patent Literature 2: Japanese Patent No. 4134379 (paragraphs [0031] to [0036], FIG. 3, and the like)

SUMMARY OF THE INVENTION

In one general aspect, the techniques disclosed here feature a method including: inputting, via a network, information indicating power usage corresponding to each of a plurality of user IDs; generating a differential value between i) a first cumulative value of power usage corresponding to a first user ID among the plurality of user IDs in a prescribed period and ii) a second cumulative value of power usage corresponding to a second user ID among the plurality of user IDs in a same period as the prescribed period; generating a first conversion value by converting the differential value to a use time of an electric home appliance corresponding to a first type among electric home appliances corresponding to the first user ID; generating display data indicating that the differential value between i) the first cumulative power usage corresponding to the first user ID and ii) the second cumulative power usage corresponding to the second user ID in the prescribed period corresponds to the first conversion value that is generated by converting the differential value to the use time of the electric home appliance corresponding to the first type; and transmitting the display data to an information terminal device corresponding to the first user ID.

Accordingly, further improvements can be achieved.

These general and specific aspects may be implemented using a system, a method, and a computer program, and any combination of systems, methods, and computer programs.

BRIEF DESCRIPTION OF THE DRAWINGS

FIG. 5 is a diagram showing an example of power consumption data.

FIG. 6 is a diagram showing an example of device use history stored in a device use history database.

FIG. 7 is a diagram showing an example of user information stored in a user information database.

FIG. 8 is a diagram showing an example of power consumption history stored in a power consumption history database.

FIG. 9 is a diagram showing an example of reference power consumption stored in a reference power consumption database.

FIG. 33 is a diagram showing an example of a non-selected device flag stored in a non-selected device database.

Figure 1:
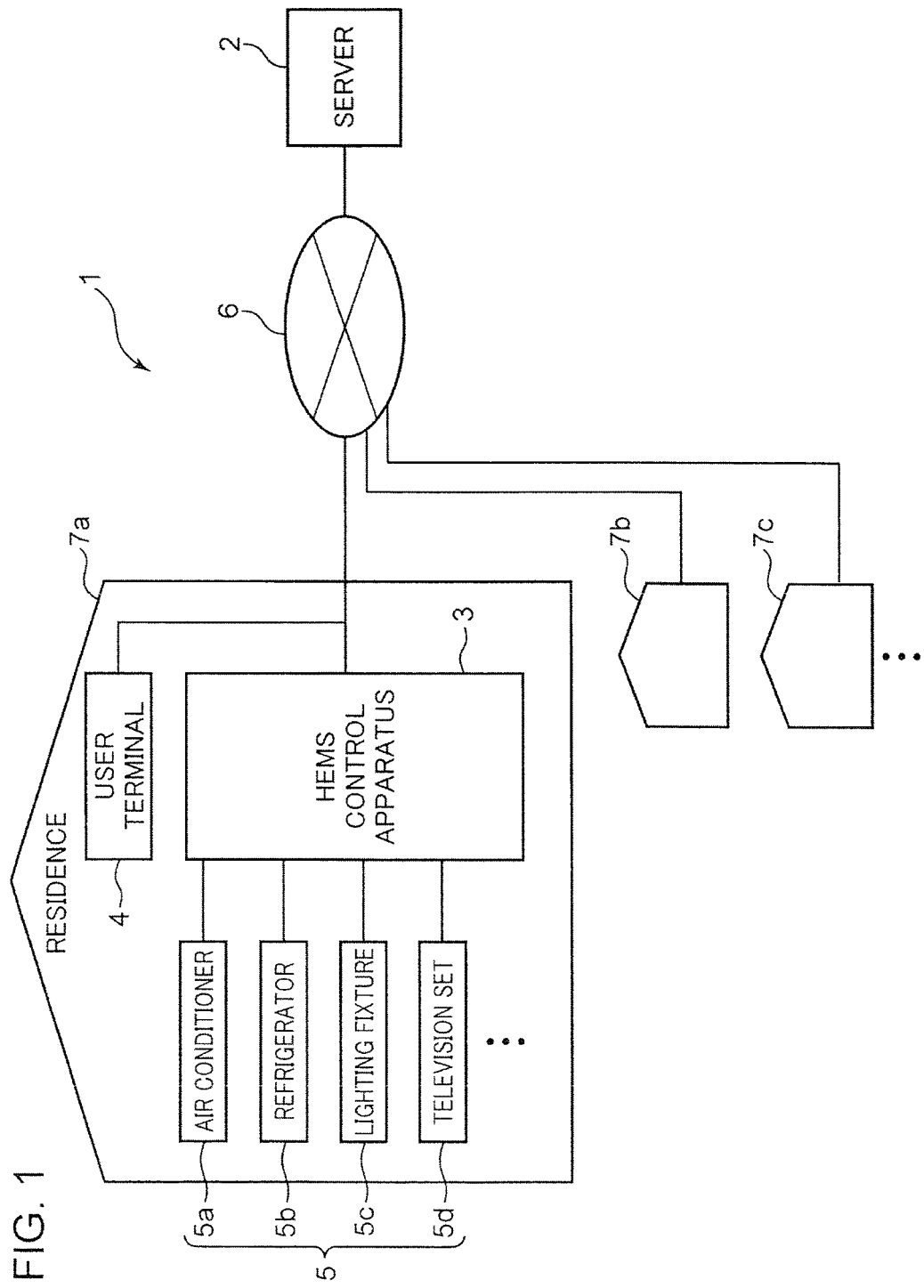
FIG. 1 is a diagram showing an overall configuration of an information management system according to a first embodiment of the present disclosure.

DETAILED DESCRIPTION (Story Before Inventing Aspect According to Present Disclosure)

According to Patent Literature 1 described above, an energy conservation supporting apparatus transmits response data comparing data related to an operational status of an electrical appliance system that is a target for energy conservation support with data related to an operational status of another electrical appliance system and provides energy conservation advice. In this case, an example of the energy conservation advice may be "Use time of the air conditioner seems to increase during the night. Power consumption may be reduced by turning off the air conditioner when going to sleep" (refer to FIG. 11 in Patent Literature 1).

In a similar manner, in Patent Literature 2, a center apparatus of a system compares usage data of a plurality of air conditioning devices with usage data of a specific air conditioning device and provides an energy conservation advice. In this case, an example of the energy conservation advice may be "The set temperature during cooler mode should be slightly lowered" (refer to FIG. 3 in Patent Literature 2).

However, the apparatuses in both Patent Literature 1 and Patent Literature 2 are limited to presenting comparison results. While a user can recognize that the user's power usage is higher than power usage of another person based on the comparison result, there is a problem in that the user is unable to realize the magnitude of a difference between the user's power usage and the power usage of another person as indicated by the comparison result when applying the difference to the user's everyday life.

For example, in Patent Literature 1, when power usage of an air conditioner of a specific user exceeds power usage of an air conditioner of second user during the night, an energy conservation advice based on a category corresponding to the degree of excess is presented to the specific user. Therefore, when applied to the everyday life of the specific user who is a target for energy conservation support, the specific user is unable to realize the magnitude of a difference between power usage of the user's air conditioner and the power usage of the air conditioner of another person.

In a similar manner, in Patent Literature 2, when power usage of an air conditioner of a specific user exceeds power usage of an air conditioner of second user, an energy conservation advice based on a category corresponding to the degree of excess is presented to the specific user. Therefore, when applied to the everyday life of the specific user, the specific user is unable to realize the magnitude of a difference between the power usage of the user's air conditioner and the power usage of the air conditioner of another person.

Therefore, when there is a difference between the power usage of the specific user and the power usage of second user, regardless of the magnitude of the difference, a problem arises in that the magnitude of the difference cannot be conveyed to the specific user who is a target for energy conservation support by presenting a generalized energy conservation advice and an energy conservation effect is not promoted.

In addition, in Patent Literature 1 and Patent Literature 2, a plurality of energy conservation advices are stored in advance in a memory in association with categories of comparison results of each electric home appliance and power usage, and any one of the energy conservation advices is read out in accordance with a comparison result between power usage of a specific user and power usage of second user. Therefore, there is a problem in that the plurality of energy conservation advices must inevitably be energy conservation advices that are applicable to any user. Furthermore, since a plurality of energy conservation advices are stored in advance in a memory in association with categories of comparison results of each electric home appliance and power usage, there is a problem of memory capacity occupied by the advices. As the number of individual electric home appliances increases, a large number of energy conservation advices must be prepared accordingly. In addition, finely classifying the categories of comparison results of power usage necessitates preparing pluralities of energy conservation advices accordingly. Therefore, as the number of energy conservation advices increases, memory capacity must also be increased.

In order to solve the problems listed above, the present inventors arrived at a disclosure represented by the respective aspects described below.

A method for providing information according to an aspect of the present disclosure is a method for providing information in an information management system that manages log information related to electric home appliances in association with each of a plurality of user IDs, the method including: inputting, via a network, information indicating power usage corresponding to each of the plurality of user IDs; generating a differential value between i) a first cumulative value of power usage corresponding to a first user ID among the plurality of user IDs in a prescribed period and ii) a second cumulative value of power usage corresponding to a second user ID among the plurality of user IDs in a same period as the prescribed period; generating a first conversion value by converting the differential value to a use time of an electric home appliance corresponding to a first type among electric home appliances corresponding to the first user ID; generating display data indicating that the differential value between i) the first cumulative power usage corresponding to the first user ID and ii) the second cumulative power usage corresponding to the second user ID in the prescribed period corresponds to the first conversion value that is generated by converting the differential value to the use time of the electric home appliance corresponding to the first type; and transmitting the display data to an information terminal device corresponding to the first user ID.

In the aspect described above, when there is a difference between one's power usage and power usage of another person, the difference is not categorized nor is a generalized energy conservation advice presented. In other words, according to the aspect described above, a differential value between a first cumulative value of power usage corresponding to first user in a prescribed period and a second cumulative value of power usage corresponding to second user in the prescribed period is converted to a use time of an electric home appliance of a given type among electric home appliances of the first user.

Accordingly, instead of simply presenting a difference value between one's power usage and the power usage of another person, since the difference value is presented after being converted to a use time of an electric home appliance of a given type among electric home appliances of the first user, the first user can recognize the differential value as a use time of an electric home appliance of the given type that is used by the first user.

The converted use time fluctuates successively in accordance with changes in the differential value. Therefore, the converted use time is a unique value for the first user which cannot be shared with second user. In addition, a use time is a parameter that a general user is likely to realize in everyday life, as compared to power usage. Furthermore, the differential value is converted to a use time of an electric home appliance of a given type instead of a use time of each of a plurality of electric home appliances. Therefore, when power usage representing the differential value is converted to a use time of an electric home appliance of a specific type, it can be shown what kind of use time the differential value corresponds to.

As a result, information on the magnitude of a differential value related to power usage in the everyday life of a specific individual who is a target can be provided as information unique to first user using an electric home appliance of a given type and a use time of an electric home appliance of the given type which are parameters that are individually and specifically identified by each user. Accordingly, the first user can be readily made aware of how much use time is to be reduced with respect to which type of electric home appliance in order to achieve energy conservation. In other words, since a value converted to a specific type of an electric home appliance and a use time of an electric home appliance of the specific type which conform to the everyday life of first user, a suggestion as to what degree a use time of which type of electric home appliance is to be shortened to reduce the differential value is made in a manner that is easier to understand. Therefore, the user can be prompted to engage in specific energy saving behavior.

In addition, in the aspect described above, a plurality of pieces of information related to energy conservation advices are not prepared in advance in association with categories representing comparison results of individual electric home appliances and power usage. In the present aspect, a differential value between a first cumulative value of power usage corresponding to first user ID in a prescribed period and a second cumulative value of power usage corresponding to second user ID in the prescribed period is converted to, and presented as, a use time of an electric home appliance of a first type among electric home appliances corresponding to the first user ID. Therefore, since a use time of an electric home appliance of a first type which is converted every time is presented, an increase in the number of individual electric home appliances can be prevented and, at the same time, an increase in memory capacity can be prevented regardless of how a comparison result of power usage is to be categorized. For example, by adopting a configuration in which a shared portion of display data is templated and a parameter portion that varies individually such as an electric home appliance of a first type and a use time of the electric home appliance of the first type is variable when generating display data, an increase in memory capacity can be prevented significantly.

Furthermore, in the aspect described above, for example, the display data may be generated when the first cumulative value is larger than the second cumulative value.

In other words, when the first cumulative value is larger than the second cumulative value, a differential value between the first cumulative value of power usage of an electric home appliance corresponding to first user ID in a prescribed period and the second cumulative value of power usage of an electric home appliance corresponding to second user ID in the prescribed period is converted to a use time of an electric home appliance of a first type among electric home appliances of the first user to be presented to the first user.

In addition, in the aspect described above, for example, the display data may include the first cumulative value and the second cumulative value.

Furthermore, in the aspect described above, for example, the method further including: generating a first electricity bill value corresponding to the differential value, wherein the display data may include the first electricity bill value.

In addition, in the aspect described above, for example, the method further including: generating a second electricity bill value corresponding to the first cumulative value and a third electricity bill value corresponding to the second cumulative value, wherein the display data may include the second electricity bill value and the third electricity bill value.

Furthermore, in the aspect described above, for example, a residence corresponding to the second user ID may be located within a prescribed range from a residence corresponding to the first user ID.

In addition, in the aspect described above, for example, a composition of residents in a residence corresponding to the second user ID may be the same as a composition of residents in a residence corresponding to the first user ID.

Furthermore, in the aspect described above, for example, a layout of a residence corresponding to the second user ID may be the same as a layout of a residence corresponding to the first user ID.

In addition, in the aspect described above, for example, the second user ID may be associated with a plurality of second user IDs, and the second cumulative value may be obtained by averaging cumulative values of power usage of electric home appliances corresponding to the plurality of the second user IDs in the prescribed period.

Furthermore, in any of the aspects described above, for example, the electric home appliance of the first type may include an electric home appliance of a type with highest power usage among the electric home appliances corresponding to the first user ID in the prescribed period.

In this case, the differential value is converted to a use time of an electric home appliance of a type with highest power usage among the electric home appliances corresponding to the first user ID instead of to a use time of each of the plurality of electric home appliances. For example, when the electric home appliance of a type with highest power usage among the electric home appliances corresponding to the first user ID is an air conditioner, the differential value is converted to a use time of an air conditioner. In addition, for example, when the electric home appliance of a type with highest power usage among the electric home appliances corresponding to the first user ID is a television set, the differential value is converted to a use time of a television set.

Therefore, when power usage representing the differential value is replaced with a use time of an electric home appliance of a type with highest power usage (in the examples given above, an air conditioner or a television set) among the electric home appliances corresponding to the first user ID, it can be shown what kind of use time of an electric home appliance corresponding to the first user ID the differential value corresponds to.

As a result, information on the magnitude of a differential value related to power usage in the everyday life of first user who is a target can be provided as information unique to the first user using an electric home appliance of a type with highest power usage and a use time of an electric home appliance of the type with the highest power usage which are parameters that are individually and specifically identified with respect to first user ID.

Accordingly, by using a parameter of an electric home appliance of a type with highest power usage, a user can readily recognize which type of electric home appliance is to be a focus of a reduction in use time in order to contribute to overall energy conservation in a more efficient manner by one energy saving behavior. For example, the user can recognize that, when an electric home appliance of a type with highest power usage among electric home appliances corresponding to first user ID is an air conditioner, a contribution to overall energy conservation can be made in a more efficient manner by reducing the use time of the air conditioner, as compared to reducing the use time of electric home appliances of other types. In other words, since a value representing a conversion to a specific type of an electric home appliance and a use time of an electric home appliance of the specific type which conform to the everyday life of first user is presented, a suggestion as to what degree a use time of which type of electric home appliance is to be shortened to effectively reduce the differential value is made in a manner that is easier to understand. Therefore, the user can be prompted to engage in specific energy saving behavior.

In addition, in any of the aspects described above, for example, the electric home appliance of the first type may include an electric home appliance of a type with a longest use time among the electric home appliances corresponding to the first user ID in the prescribed period.

Furthermore, in the aspect described above, for example, the method further including: obtaining a divided value by dividing the differential value using power consumption of the electric home appliance of the first type, to use the obtained divided value as the first conversion value.

In addition, in the aspect described above, for example, the electric home appliance of the first type may include one of an air conditioner, a television set, or a lighting fixture.

Furthermore, in the aspect described above, for example, the method further including: generating, when the first conversion value exceeds a prescribed upper limit value, a second conversion value by converting a portion of the differential value to a use time of the electric home appliance of the first type; generating a third conversion value by converting the remaining portion of the differential value to a use time of an electric home appliance corresponding to a second type among the electric home appliances corresponding to the first user ID; and generating the display data which indicates that the differential value corresponds to i) the second conversion value that is generated by converting of the portion of the differential value to the use time of the electric home appliance of the first type and to ii) the third conversion value that is generated by converting the remaining portion of the differential value to the use time of the electric home appliance of the second type.

When power usage indicating a differential value is replaced with a use time of an electric home appliance of one type, there may be cases where the replaced use time is too long as a use time of an electric home appliance of the one type in a prescribed period. For example, when the electric home appliance of the first type is an air conditioner and the differential value is replaced with a use time of the air conditioner for a one-month period, the replaced use time may sometimes be too long as a use time of the air conditioner for a one-month period. In this case, even if the air conditioner is not used for one month, a surplus of the replaced use time may occur. When such a surplus occurs, even if parameters that are individually and specifically identified with respect to a specific user of a type of an electric home appliance and a use time of the electric home appliance are presented and the user is prompted to engage in energy saving behavior, since the presented parameters are not realistic, the presentation of the parameters may not result in promoting energy saving behavior.

However, according to the present aspect, when the first conversion value exceeds a prescribed upper limit value, for example, when the first conversion value is too long as a use time of the electric home appliance of the first type, a use time of an electric home appliance of another type is also used to distribute power usage indicating a differential value among electric home appliances of a plurality of types. Therefore, a realistic guideline can be presented in terms of how much use time is to be reduced with respect to which type of electric home appliance in order to efficiently contribute to energy conservation. For example, by converting a differential value between power usage of first user and power usage of second user so as to be distributed between, for example, a use time of an air conditioner and a use time of a television set, how much use time of the air conditioner is to be reduced and how much use time of the television set is to be reduced to reduce the differential value can be presented to the first user as a realistic guideline.

In addition, in the aspect described above, for example, the electric home appliance of the first type may include a first electric home appliance of a type with highest power usage among the electric home appliances corresponding to the first user ID in the prescribed period, and the electric home appliance of the second type may include a second electric home appliance of a type with second highest power usage among the electric home appliances corresponding to the first user ID in the prescribed period.

Furthermore, in the aspect described above, for example, the electric home appliance of the first type may include a first electric home appliance of a type with a longest use time among the electric home appliances corresponding to the first user ID in the prescribed period, and the electric home appliance of the second type may include a second electric home appliance of a type with a second longest use time among the electric home appliances corresponding to the first user ID in the prescribed period.

In addition, in the aspect described above, for example, the first electric home appliance of the first type may include one of an air conditioner, a television set, and a lighting fixture, and when the first electric home appliance of the first type is any of the air conditioner, the television set, and the lighting fixture, the second electric home appliance of the second type may include any of the air conditioner, the television set, and the lighting fixture that does not overlap with the electric home appliance of the first type.

Furthermore, in the aspect described above, for example, the prescribed period may include one month.

In addition, in the aspect described above, for example, the prescribed period may include one week.

Furthermore, in the aspect described above, for example, the log information related to the electric home appliance may include information indicating a use time of the electric home appliance.

In addition, in the aspect described above, for example, the log information related to the electric home appliance may include information indicating a use time slot of the electric home appliances on each day.

Furthermore, in the aspect described above, for example, the electric home appliance of the first type may not include an electric home appliance of a type whose power-on state continues all day.

Even when a differential value is converted to a use time of an electric home appliance of a type whose power-on state continues all day, the use time of an electric home appliance of such a type cannot be reduced. Therefore, an electric home appliance of a type whose power-on state continues all day is favorably excluded from the electric home appliance of the first type.

In addition, in the aspect described above, for example, the electric home appliance of the type in which power-on state continues all day may include a refrigerator.

A method for providing information according to another aspect of the present disclosure is a method for providing information in an information management system that manages log information related to electric home appliances in association with each of a plurality of user IDs, the method including: inputting, via a network, information indicating power usage corresponding to each of the plurality of user IDs; generating a differential value between i) a first cumulative value of power usage corresponding to a first user ID among the plurality of user IDs in a prescribed period and ii) a second cumulative value of power usage corresponding to a second user ID among the plurality of user IDs in a same period as the prescribed period; generating a first conversion value by converting a portion of the differential value to a use time of an electric home appliance corresponding to a first type among electric home appliances corresponding to the first user ID; generating a second conversion value by converting the remaining portion of the differential value to a use time of an electric home appliance corresponding to a second type among the electric home appliances corresponding to the first user ID; generating display data indicating that the differential value between i) power usage corresponding to the first user ID and ii) power usage corresponding to the second user ID in the prescribed period corresponds to a) the first conversion value that is generated by converting a portion of the differential value to the use time of the electric home appliance of the first type and b) the second conversion value that is generating by converting the remaining portion of the differential value to the use time of the electric home appliance of the second type; and transmitting the display data to an information terminal device corresponding to the first user ID.

According to the other aspect described above, a differential value between power usage corresponding to first user ID and power usage corresponding to second user ID in a prescribed period is presented using a use time of an electric home appliance of a first type and a use time of an electric home appliance of a second type. In this case, power usage indicating the differential value is converted so as to be distributed between a use time of the electric home appliance of the first type and a use time of the electric home appliance of the second type. For example, by converting a differential value between power usage of first user and power usage of second user so as to be distributed between, for example, a use time of an air conditioner and a use time of a television set, how much use time of the air conditioner is to be reduced and how much use time of the television set is to be reduced to reduce the differential value can be presented to the first user as a realistic guideline.

In addition, in the other aspect described above, similarly, a plurality of pieces of information related to energy conservation advices are not prepared in advance in association with categories representing comparison results of individual electric home appliances and power usage. In the present aspect, a differential value between a first cumulative value of power usage corresponding to first user ID in a prescribed period and a second cumulative value of power usage corresponding to second user ID in the prescribed period is converted to, and presented as, a use time of an electric home appliance of a first type and a use time of an electric home appliance of a second type among the electric home appliances corresponding to the first user ID. Therefore, since a use time of the electric home appliance of the first type and a use time of the electric home appliance of the second type which are converted every time are presented, an increase in the number of individual electric home appliances can be prevented and, at the same time, an increase in memory capacity can be prevented regardless of how a comparison result of power usage is to be categorized. For example, by adopting a configuration in which a shared portion of display data is templated and a parameter portion that varies individually such as an electric home appliance of a first type, an electric home appliance of a second type, a use time of the electric home appliance of the first type, and a use time of the electric home appliance of the second type is variable when generating display data, an increase in memory capacity can be prevented significantly.

In addition, in the other aspect described above, for example, the electric home appliance of the first type may include a first electric home appliance of a type with highest power usage among the electric home appliances corresponding to the first user ID in the prescribed period, and the electric home appliance of the second type may include a second electric home appliance of a type with second highest power usage among the electric home appliances corresponding to the first user ID in the prescribed period.

Furthermore, in the other aspect described above, for example, the electric home appliance of the first type may include a first electric home appliance of a type with a longest use time among the electric home appliances corresponding to the first user ID in the prescribed period, and the electric home appliance of the second type may include a second electric home appliance of a type with a second longest use time among the electric home appliances corresponding to the first user ID in the prescribed period.

An information management system according to another aspect of the present disclosure is an information management system including an information management server that manages log information related to electric home appliances in association with each of a plurality of user IDs, and an information terminal device corresponding to a first user ID among the plurality of user IDs, wherein the information management server includes: a processor; and a non-transitory memory having stored thereon executable instructions, which when executed by the processor, cause the processor to perform: inputting, via a network, information indicating power usage corresponding to each of the plurality of user IDs; generating a differential value between i) a first cumulative value of power usage corresponding to the first user ID among the plurality of user IDs in a prescribed period and ii) a second cumulative value of power usage corresponding to a second user ID among the plurality of user IDs in a same period as the prescribed period; generating a first conversion value by converting the differential value to a use time of an electric home appliance corresponding to a first type among electric home appliances corresponding to the first user ID; generating display data indicating that the differential value between i) the first cumulative power usage corresponding to the first user ID and ii) the second cumulative power usage corresponding to the second user ID in the prescribed period corresponds to the first conversion value that is generated by converting the differential value to the use time of the electric home appliance corresponding to the first type; and transmitting the display data to the information terminal device corresponding to the first user ID, and the information terminal device corresponding to the first user ID includes: a receiver that receives the display data; a display that displays the display data; and a controller that controls the receiver and the display.

The information terminal device according to the other aspect of the present disclosure is an information terminal device connected to the information management system that is the other aspect described above.

An information terminal device according to another aspect of the present disclosure is an information terminal device in an information management system including an information management server that manages log information related to electric home appliances in association with each of a plurality of user IDs, and an information terminal device corresponding to a first user ID among the plurality of user IDs, the information terminal device comprising: a receiver that receives display data generated by the information management server; a display that displays the display data; and a controller that controls the receiver and the display, wherein the information management server generates a differential value between i) a first cumulative value of power usage corresponding to the first user ID among the plurality of user IDs in a prescribed period and ii) a second cumulative value of power usage corresponding to a second user ID among the plurality of user IDs in a same period as the prescribed period, the information management server generates a first conversion value by converting the differential value to a use time of an electric home appliance corresponding to a first type among electric home appliances corresponding to the first user ID, and the information management server generates the display data indicates that the differential value between i) the first cumulative power usage corresponding to the first user ID and ii) the second cumulative power usage corresponding to the second user ID in the prescribed period corresponds to the first conversion value that is generated by converting the differential value to the use time of the electric home appliance corresponding to the first type.

Hereinafter, embodiments of the present disclosure will be described with reference to the accompanying drawings. It is to be understood that the following embodiments are merely examples embodying the present disclosure and are not intended to limit the technical scope of the present disclosure.

First Embodiment

FIG. 1 is a diagram showing an overall configuration of an information management system according to a first embodiment of the present disclosure.

An information management system 1 shown in FIG. 1 includes a server 2, a home energy management system (HEMS) control apparatus 3, a user terminal 4, and electric home appliances 5.

The information management system 1 manages log information related to the electric home appliances 5 in association with each of a plurality of user IDs.

The server 2 is connected to the HEMS control apparatus 3 and the user terminal 4 via a network 6 so as to be capable of communicating with each other. The server 2 acquires log information of the electric home appliances 5 from the HEMS control apparatus 3 installed in each home of each user and stores the acquired log information in association with user IDs. Moreover, the network 6 is, for example, the Internet.

The server 2 is a virtual server that cooperates with various devices via the network 6. The server 2 mainly manages enormous data (big data) that is difficult to handle with ordinary database management tools and the like.

The server 2 provides accumulated log information in a fixed unit to a service provider (not shown). In this case, the fixed unit may be a unit that can be provided to the service provider by organizing information accumulated by the server 2 or a unit requested by the service provider. In addition, while a configuration is adopted in which information is provided in a fixed unit, the information need not necessarily be provided in a fixed unit and the amount of information may vary depending on the circumstances. The log information is stored as necessary in a server owned by the service provider.

Furthermore, the service provider organizes the log information into information suitable for a service provided to a user and provides the organized information to the user. The user to which the service is provided may be a user of the electric home appliances 5 or may be an outside user. As a method of providing the service to the user, for example, the service may be provided directly from the service provider to the user. In addition, as a method of providing the service to the user, for example, the service may be provided once again via the server 2. Alternatively, the server 2 may organize the log information into information suitable for a service provided to a user and provide the organized information to the service provider.

In addition, as a method of providing the service, the service may be provided to the user by feeding back service contents to the electric home appliances 5 or the service may be provided to the user by displaying the service contents on the user terminal 4.

Residences 7a, 7b, and 7c are residences that are respectively occupied by users A, B, and C. The HEMS control apparatus 3, the user terminal 4, and the electric home appliances 5 are respectively arranged in the residences 7a, 7b, and 7c.

The HEMS control apparatus 3 is connected to the server 2 and the user terminal 4 via the network 6 so as to be capable of communicating with each other. The HEMS control apparatus 3 collects log information from the electric home appliances 5 arranged inside the residence and transmits the collected log information to the server 2.

The user terminal 4 is connected to the server 2 and the HEMS control apparatus 3 via the network 6 so as to be capable of communicating with each other. The user terminal 4 is constituted by, for example, a personal computer, a smartphone, a tablet terminal, or a mobile phone.

The electric home appliances 5 include, for example, an air conditioner 5a, a refrigerator 5b, a lighting fixture 5c, and a television set 5d, and are constituted by various electrical appliances arranged inside the residence 7a. The electric home appliance 5 are connected to the HEMS control apparatus 3 by a wireless or wired connection. The electric home appliances 5 transmit log information to the HEMS control apparatus 3.

Figure 2:
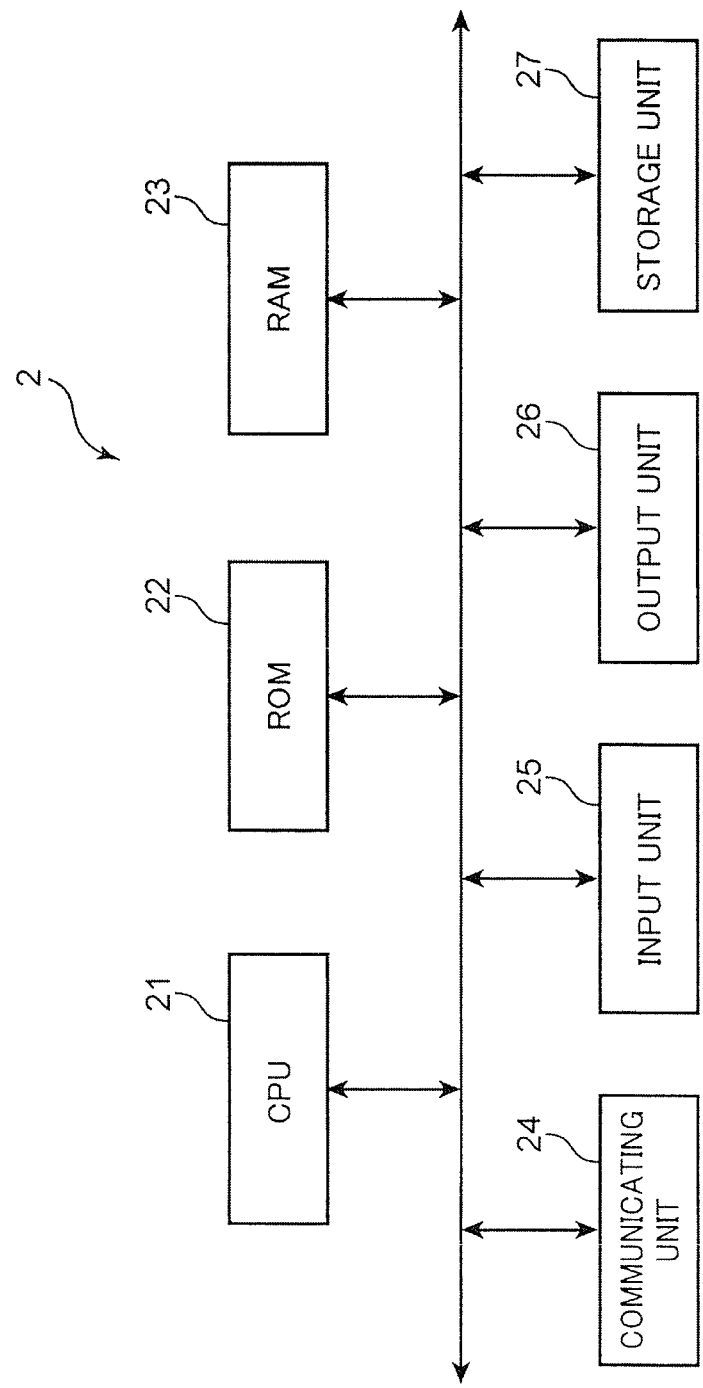
FIG. 2 is a diagram showing a hardware configuration of a server shown in FIG. 1.

FIG. 2 is a diagram showing a hardware configuration of the server shown in FIG. 1.

The server 2 shown in FIG. 2 includes a CPU (central processing unit) 21, a ROM (read only memory) 22, a RAM (random access memory) 23, a communicating unit 24, an input unit 25, an output unit 26, and a storage unit 27. The server 2 is an example of an information management server that manages log information related to electric home appliances in association with each of a plurality of user IDs.

The CPU 21 controls the respective units in the server 2. The ROM 22 stores programs for operating functions of the respective units in the server 2. The RAM 23 temporarily stores data processed in the server 2. The communicating unit 24 receives log information transmitted by the HEMS control apparatus 3 and transmits various data to the user terminal 4.

The input unit 25 is constituted by, for example, a keyboard and a mouse and accepts input of various types of information by the user. The output unit 26 is constituted by, for example, a liquid crystal display device or a printer and outputs various types of information to the outside. The storage unit 27 is constituted by a semiconductor memory, a hard disk drive, an optical disk drive, or the like and stores various data.

Figure 3:
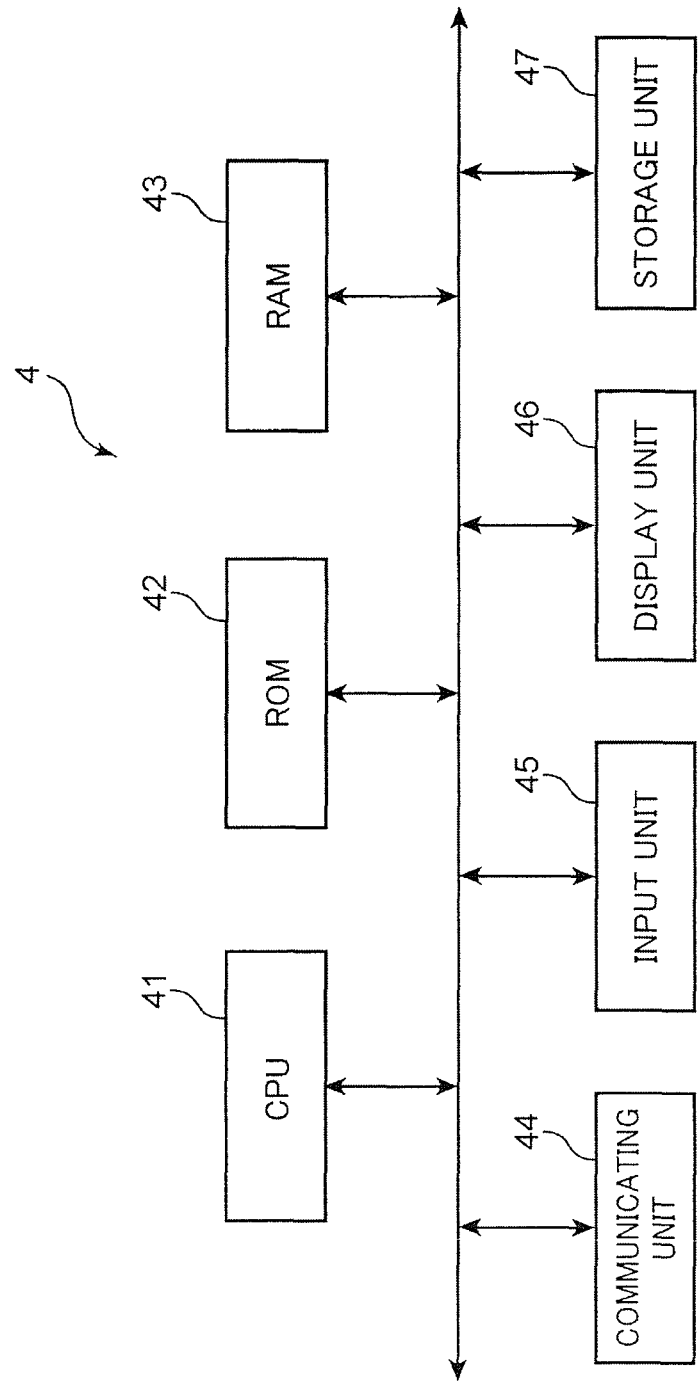
FIG. 3 is a diagram showing a hardware configuration of a user terminal shown in FIG. 1.

FIG. 3 is a diagram showing a hardware configuration of the user terminal shown in FIG. 1.

The user terminal 4 shown in FIG. 3 includes a CPU (central processing unit) 41, a ROM (read only memory) 42, a RAM (random access memory) 43, a communicating unit 44, an input unit 45, a display unit 46, and a storage unit 47. The user terminal 4 is an example of an information terminal device corresponding to each of a plurality of user IDs.

The CPU 41 is an example of a control unit and controls respective units in the user terminal 4 such as the communicating unit 44 and the display unit 46. The ROM 42 stores programs for operating functions of the respective units in the user terminal 4. The RAM 43 temporarily stores data processed in the user terminal 4. The communicating unit 44 receives display data generated by the server 2 and transmits various data to the server 2.

The input unit 45 is constituted by, for example, a keyboard, a mouse, or a touch panel and accepts input of various types of information by the user. The display unit 46 is constituted by, for example, a liquid crystal display device and displays received display data. The storage unit 47 is constituted by a semiconductor memory, a hard disk drive, an optical disk drive, or the like and stores various data.

Figure 4:
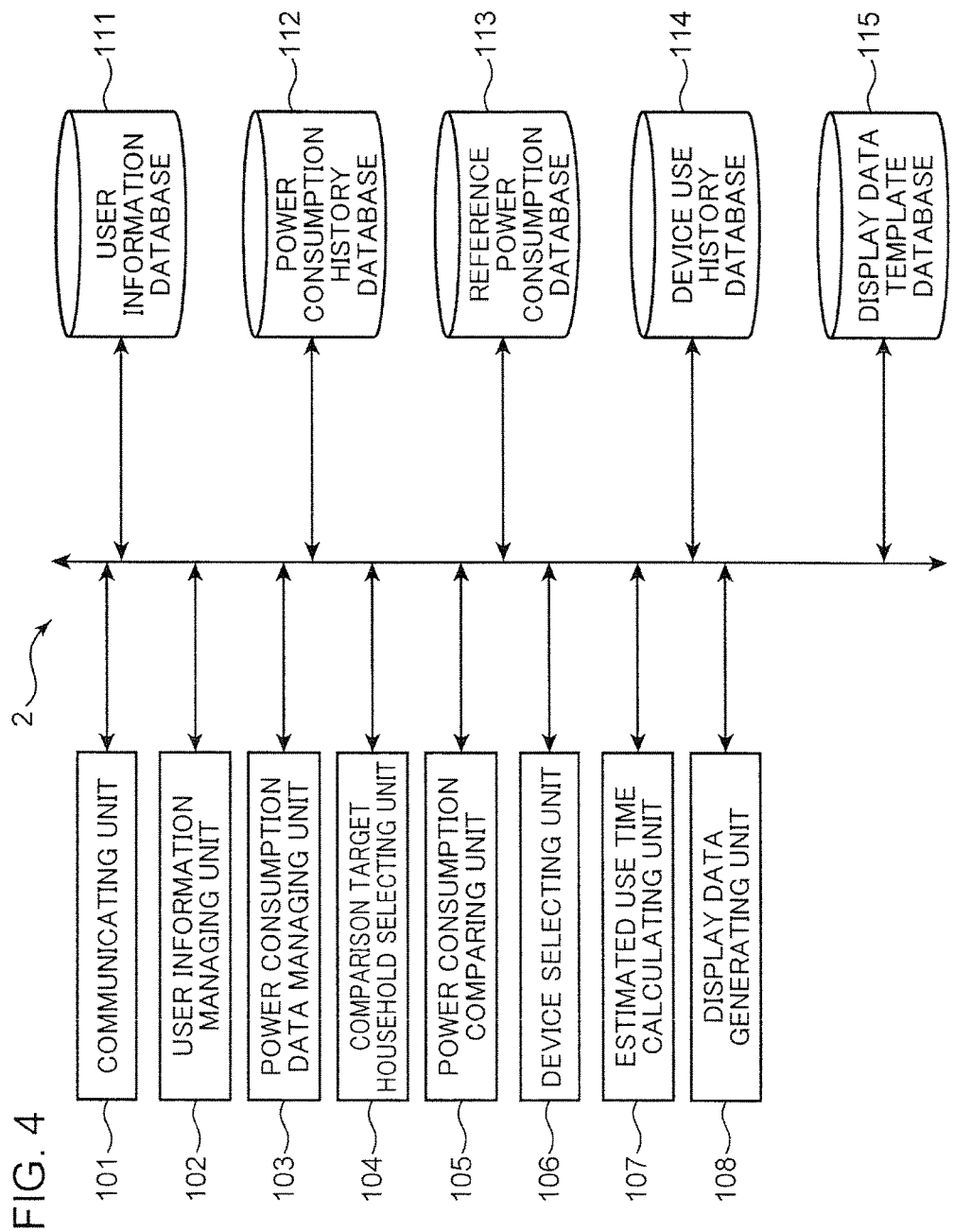
FIG. 4 is a diagram showing a software configuration of the server shown in FIG. 1.

FIG. 4 is a diagram showing a software configuration of the server 2 shown in FIG. 1.

The server 2 shown in FIG. 4 includes a communicating unit 101, a user information managing unit 102, a power consumption data managing unit 103, a comparison target household selecting unit 104, a power consumption comparing unit 105, a device selecting unit 106, an estimated use time calculating unit 107, a display data generating unit 108, a user information database 111, a power consumption history database 112, a reference power consumption database 113, a device use history database 114, and a display data template database 115.

The communicating unit 101 is implemented by the communicating unit 24 shown in FIG. 2. The user information managing unit 102, the power consumption data managing unit 103, the comparison target household selecting unit 104, the power consumption comparing unit 105, the device selecting unit 106, the estimated use time calculating unit 107, and the display data generating unit 108 are implemented by the CPU 21 shown in FIG. 2. The user information database 111, the power consumption history database 112, the reference power consumption database 113, the device use history database 114, and the display data template database 115 are implemented by the storage unit 27 shown in FIG. 2.

The communicating unit 101 receives log information of the electric home appliances 5 arranged in each residence and power consumption data of each residence. The communicating unit 101 inputs, in association with each of a plurality of user IDs, information indicating power usage corresponding to each of the plurality of user IDs via the network 6.

FIG. 5 is a diagram showing an example of power consumption data. As shown in FIG. 5, the HEMS control apparatus 3 transmits power consumption data together with a user ID and a date. The power consumption data is transmitted once every day and indicates an amount of power consumed in a residence in one day. A user ID is assigned in advance to each home (each residence).

In addition, the HEMS control apparatus 3 transmits log information together with a user ID, a device type representing a type of an electric home appliance, and an device ID for identifying an electric home appliance. Log information represents a use start date/time and a use end date/time of an electric home appliance. In other words, log information related to an electric home appliance includes information indicating a use time slot of the electric home appliance of each day. The HEMS control apparatus 3 transmits log information representing a use start date/time and a use end date/time of an electric home appliance upon the end of use of the electric home appliance.

Alternatively, the HEMS control apparatus 3 may transmit log information representing a use start date/time of an electric home appliance upon start of use of the electric home appliance and transmit log information representing a use end date/time of the electric home appliance upon the end of use of the electric home appliance. In addition, the HEMS control apparatus 3 may transmit log information representing a period of time over which an electric home appliance had been used by the user instead of transmitting log information representing a use start date/time and a use end date/time of the electric home appliance. In other words, log information related to an electric home appliance may include information indicating a use period of the electric home appliance. In addition, the HEMS control apparatus 3 may store log information of the respective electric home appliances and collectively transmit the log information of the respective electric home appliances every prescribed period of time. Furthermore, the HEMS control apparatus 3 may store log information of the respective electric home appliances and transmit the log information of the respective electric home appliances once each day together with power consumption data.

The communicating unit 101 stores received log information in the device use history database 114.

FIG. 6 is a diagram showing an example of device use history stored in the device use history database. As shown in FIG. 6, the device use history database 114 stores a user ID, a device type, a device ID, and a device use history in association with each other. The device use history represents dates/times of use of an electric home appliance and includes use start dates/times and use end dates/times.

The user ID, the device type, and the device ID are input using, for example, the user terminal 4 and transmitted to the server 2. The communicating unit 101 stores the user ID, the device type, and the device ID transmitted from the user terminal 4 in the device use history database 114 in advance, and when a new electric home appliance is arranged, updates contents of the device use history database 114. In addition, the communicating unit 101 updates device use history based on received log information.

The user information managing unit 102 manages user information stored in the user information database 111. The user information database 111 stores user information for each user ID.

FIG. 7 is a diagram showing an example of user information stored in the user information database. As shown in FIG. 7, the user information database 114 stores a user ID, a household composition, a postal code, a residence type, and types/number of used appliances in association with each other.

A household composition is information indicating the number of adults and the number of minors among residents in a residence corresponding to a user ID. A residence type is information indicating whether the residence corresponding to the user ID is a detached house or an apartment. Types/number of used appliances are information indicating the types and the number of electric home appliances arranged in the residence corresponding to the user ID.

User information is input using, for example, the user terminal 4 and transmitted to the server 2. The user information managing unit 102 stores user terminal transmitted from the user terminal 4 in the user information database 111 in advance, and when a new electric home appliance is arranged, updates contents of user information in the user information database 111.

The power consumption data managing unit 103 manages power consumption data acquired from each electric home appliance. The power consumption data managing unit 103 stores power consumption data received by the communicating unit 101 in the power consumption history database 112. The power consumption history database 112 stores a history of power consumption for each user ID.

FIG. 8 is a diagram showing an example of power consumption history stored in the power consumption history database. As shown in FIG. 8, the power consumption history database 112 stores monthly power consumption of a residence corresponding to a user ID.

The comparison target household selecting unit 104 selects a user ID of a household to be a comparison target from a plurality of user IDs. In this case, the comparison target household selecting unit 104 selects a user ID with a same composition of residents as a composition of residents in a residence corresponding to a user ID providing advice related to energy conservation as the user ID of the household to be a comparison target.

Alternatively, the comparison target household selecting unit 104 may select a user ID within a prescribed range from the residence corresponding to the user ID providing advice related to energy conservation as the user ID of the household to be a comparison target. In addition, the comparison target household selecting unit 104 may select a user ID with a same residence type (layout) as a residence type (layout) of the residence corresponding to the user ID providing advice related to energy conservation as the user ID of the household to be a comparison target.

The power consumption comparing unit 105 compares a first cumulative value of power usage corresponding to first user ID (the user ID providing advice related to energy conservation) among the plurality of user IDs in a prescribed period with a second cumulative value of power usage corresponding to second user ID (the user ID of the household to be a comparison target) among the plurality of user IDs in a same period as the prescribed period.

Moreover, the second cumulative value is favorably an average value obtained by averaging cumulative values of power usage of electric home appliances corresponding to each of a plurality of second user IDs in the prescribed period. In other words, the power consumption comparing unit 105 calculates an average value that is an average of cumulative values of power usage of electric home appliances corresponding to each of a plurality of second user IDs in the prescribed period, as the second cumulative value.

The device selecting unit 106 selects an electric home appliance of a first type among electric home appliances corresponding to first user ID (the user ID providing advice related to energy conservation). In this case, the electric home appliance of the first type includes an electric home appliance of a type with highest power usage among electric home appliances corresponding to the first user ID in the prescribed period. For example, the electric home appliance of the first type may include an air conditioner, a television set, or a lighting fixture. Moreover, when it is determined by the power consumption comparing unit 105 that the first cumulative value is greater than the second cumulative value, the device selecting unit 106 selects the electric home appliance of the first type.

The estimated use time calculating unit 107 generates a differential value between a first cumulative value of power usage corresponding to first user ID (the user ID providing advice related to energy conservation) among the plurality of user IDs in a prescribed period and a second cumulative value of power usage corresponding to second user ID (the user ID of the household to be a comparison target) among the plurality of user IDs in a same period as the prescribed period. Moreover, the prescribed period is, for example, one month. Alternatively, the prescribed period may be, for example, one week, half a month, a half year, or one year. In addition, the prescribed period may be a period between a first day to the present day of the present month, the previous month, or a month specified by the user.

Furthermore, the estimated use time calculating unit 107 generates a first conversion value by converting the generated differential value to a use time of the electric home appliance of the first type among the electric home appliances corresponding to first user ID. The estimated use time calculating unit 107 generates a divided value that is a division of the generated differential value by reference power consumption of the electric home appliance of the first type as the first conversion value. Moreover, reference power consumption refers to power consumption per hour by an electric home appliance.

The reference power consumption database 113 stores power consumption per hour as reference power consumption for each type of the electric home appliances.

FIG. 9 is a diagram showing an example of reference power consumption stored in the reference power consumption database. As shown in FIG. 9, the reference power consumption database 113 stores a device type and reference power consumption in association with each other. Reference power consumption is power that is consumed by an electric home appliance per hour. For example, reference power consumption of an air conditioner is 0.13 kW. reference power consumption of a refrigerator is 0.034 kW, reference power consumption of a lighting fixture is 0.05 kW, and reference power consumption of a television set is 0.1 kW.

The display data generating unit 108 generates display data indicating that the differential value between power usage corresponding to first user ID and power usage corresponding to second user ID in the prescribed period corresponds to the first conversion value that is generated by converting the differential value to a use time of the electric home appliance of the first type.

In addition, the display data generating unit 108 may generate a first electricity bill value that is a conversion of the differential value to an electricity bill. The display data may include the first electricity bill value. Furthermore, the display data generating unit 108 may generate display data indicating that the first electricity bill value corresponding to a difference between power usage corresponding to second user ID and power usage corresponding to first user ID in the prescribed period corresponds to the first conversion value that is generated by converting the differential value to a use time of the electric home appliance of the first type.

In addition, the display data may include a first cumulative value and a second cumulative value. The display data generating unit 108 may generate a second electricity bill value that is a conversion of the first cumulative value to an electricity bill and a third electricity bill value that is a conversion of the second cumulative value to an electricity bill. The display data may include the second electricity bill value and the third electricity bill value.

Furthermore, the display data generating unit 108 may generate display data when the first cumulative value is greater than the second cumulative value.

The communicating unit 101 transmits display data to the user terminal 4 corresponding to the first user ID.

The display data template database 115 stores a first display data template that is displayed when a first cumulative value of power usage corresponding to first user ID among a plurality of user IDs in a prescribed period is greater than a second cumulative value of power usage corresponding to second user ID among the plurality of user IDs in a same period as the prescribed period, and a second display data template that is displayed when the first cumulative value of power usage corresponding to the first user ID among a plurality of user IDs in a prescribed period is equal to or smaller than the second cumulative value of power usage corresponding to the second user ID among the plurality of user IDs in a same period as the prescribed period.

The display data generating unit 108 reads out a display data template in accordance with a magnitude relationship between the first cumulative value and the second cumulative value from the display data template database 115.

Next, a flow of processes of the information management system 1 according to the first embodiment of the present disclosure will be described.

Figure 10:
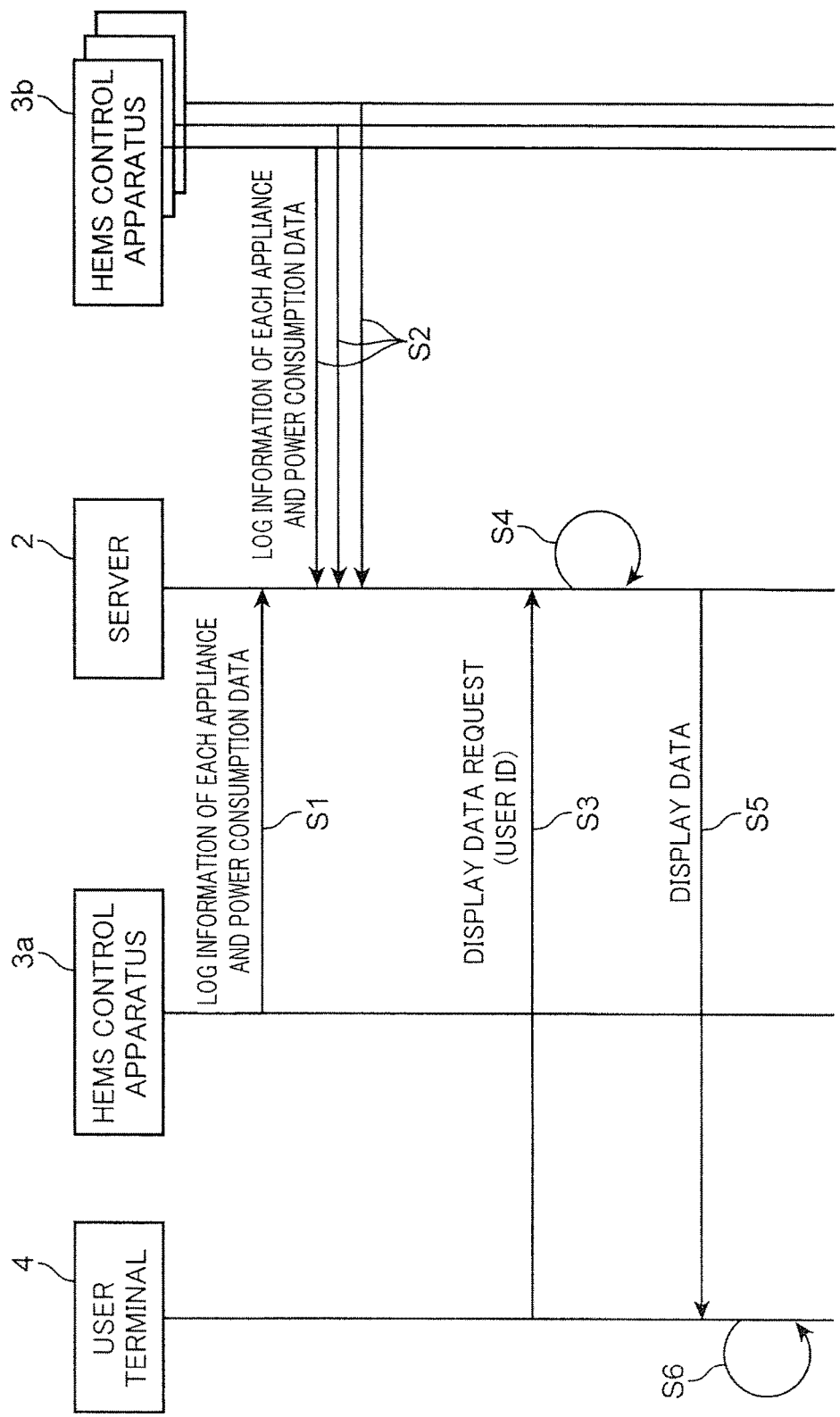
FIG. 10 is a sequence diagram showing a flow of processes of the information management system according to the first embodiment of the present disclosure.

FIG. 10 is a sequence diagram showing a flow of processes of the information management system 1 according to the first embodiment of the present disclosure. In FIG. 10, an HEMS control apparatus 3a is installed in a residence of a user A who desires that advice related to energy conservation be provided, and an HEMS control apparatus 3b is installed in a residence of a user B that differs from the residence of the user A. In addition, the user terminal 4 is owned by the user A.

First, the HEMS control apparatus 3a transmits log information of each electric home appliance installed in the residence of the user A and power consumption data of the residence of the user A to the server 2 at a prescribed timing (step S1). The server 2 receives log information and power consumption data transmitted by the HEMS control apparatus 3a.

In addition, the HEMS control apparatus 3b transmits log information of each electric home appliance installed in the residence of the user B and power consumption data of the residence of the user B to the server 2 at a prescribed timing (step S2). The server 2 receives log information and power consumption data transmitted by the HEMS control apparatus 3b. Moreover, in addition to the HEMS control apparatus 3b arranged in the residence of the user B, HEMS control apparatuses arranged in residences of second users also transmit log information and power consumption data to the server 2 at prescribed timings.

While the HEMS control apparatus 3a and the HEMS control apparatus 3b transmit log information and power consumption data at the same time, alternatively, log information and power consumption data may be transmitted at different timings.

Next, the user terminal 4 transmits a display data request to the server 2 (step S3). The display data request includes a user ID for identifying the user A. The server 2 receives the display data request transmitted by the user terminal 4.

Next, the server 2 generates display data (step S4). At this point, the server 2 performs a process of selecting a comparison target household, a process of comparing power consumption, a process of selecting an electric home appliance whose use time is to be a target of conversion of the differential value, a process of calculating an estimated use time, and a process of generating display data.

Specifically, the server 2 generates a differential value between a first cumulative value of power usage corresponding to first user ID among a plurality of user IDs in a prescribed period and a second cumulative value of power usage corresponding to second user ID among the plurality of user IDs in a same period as the prescribed period. In addition, the server 2 generates a first conversion value by converting the generated differential value to a use time of the electric home appliance of the first type among the electric home appliances corresponding to the first user ID. Furthermore, the server 2 generates display data indicating that the differential value between power usage corresponding to the first user ID and power usage corresponding to the second user ID in the prescribed period corresponds to the first conversion value that is generated by converting the differential value to a use time of the electric home appliance of the first type.

In addition, the server 2 generates a first electricity bill value that is a conversion of the differential value to an electricity bill. The server 2 generates display data indicating that the first electricity bill corresponding to a difference between power usage corresponding to the first user ID and power usage corresponding to the second user ID in the prescribed period corresponds to the first conversion value that is generated by converting the differential value to a use time of the electric home appliance of the first type.

Next, the server 2 transmits the generated display data to the user terminal 4 (step S5). The user terminal 4 receives the display data transmitted by the server 2.

Next, the user terminal 4 displays the received display data (step S6).

An outline of processes of the server 2 according to the first embodiment of the present disclosure will now be described.

Figure 11:
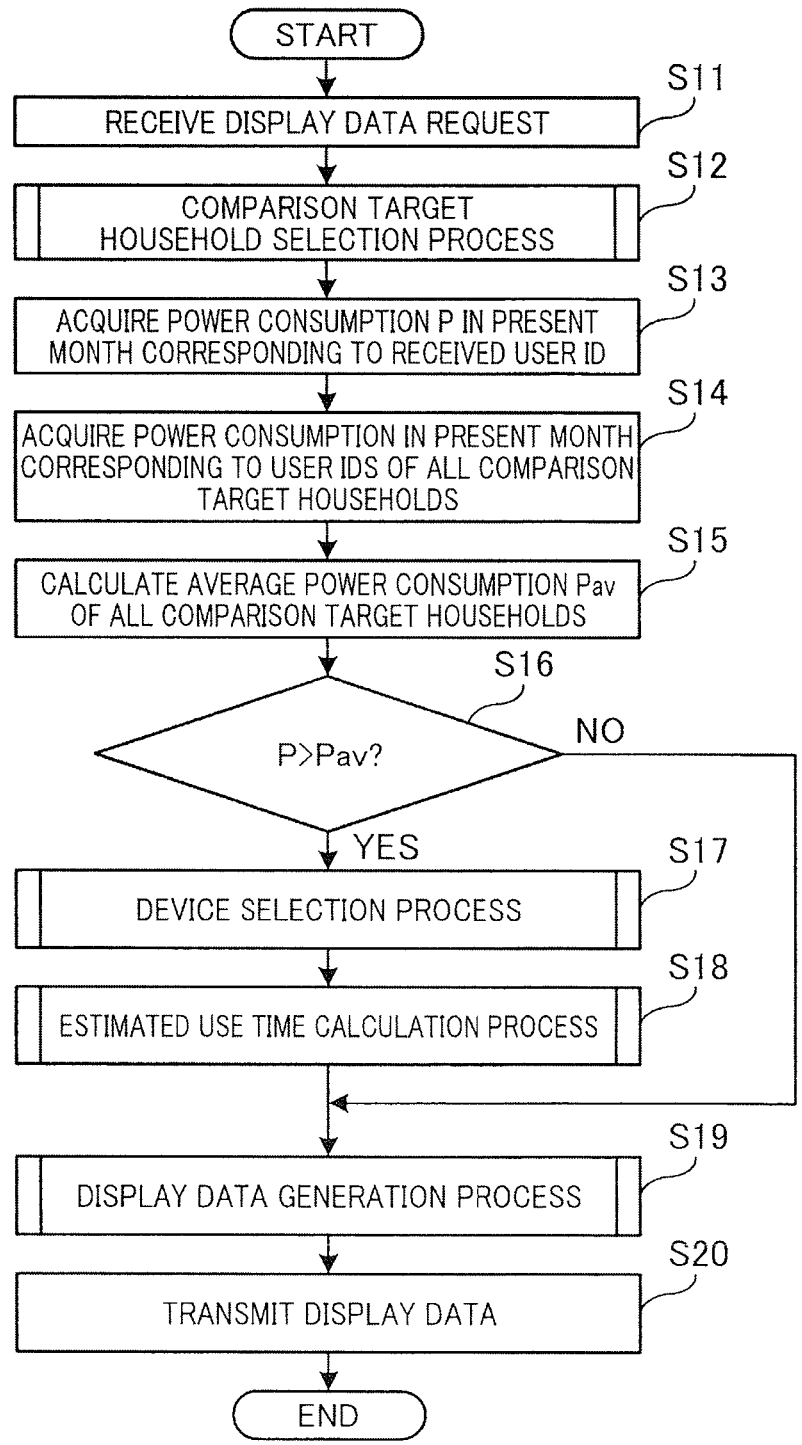
FIG. 11 is a flow chart illustrating an outline of processes of the server according to the first embodiment of the present disclosure.

FIG. 11 is a flow chart illustrating an outline of processes of the server 2 according to the first embodiment of the present disclosure.

First, in step S11, the communicating unit 101 receives a display data request for requesting acquisition of display data transmitted by the user terminal 4. Moreover, as described earlier, the display data request includes a user ID for identifying a user.

Next, in step S12, the comparison target household selecting unit 104 performs a comparison target household selection process to select a user ID of a household to be a comparison target from a plurality of user IDs. Details of the comparison target household selection process will be given later.

Next, in step S13, the power consumption comparing unit 105 acquires power consumption P in the present month corresponding to the user ID received by the communicating unit 101 from the power consumption history database 112. The power consumption comparing unit 105 acquires a record including the user ID received by the communicating unit 101 from the power consumption history database 112 and acquires the power consumption P in the present month from the acquired record.

Next, in step S14, the power consumption comparing unit 105 acquires power consumption in the present month corresponding to user IDs of all comparison target households selected by the comparison target household selecting unit 104 from the power consumption history database 112. The power consumption comparing unit 105 acquires a record including the user ID of each of all comparison target households selected by the comparison target household selecting unit 104 from the power consumption history database 112 and acquires the power consumption in the present month from each acquired record.

Next, in step S15, the power consumption comparing unit 105 calculates average power consumption Pav of all comparison target households.

Moreover, while the power consumption comparing unit 105 calculates average power consumption Pav of all comparison target households in the present embodiment, the present disclosure is not particularly limited thereto. The power consumption comparing unit 105 may calculate average power consumption Pav of a part of comparison target households among all comparison target households. For example, the power consumption comparing unit 105 may calculate average power consumption Pav of 10 comparison target households with lowest power consumption among power consumption of all comparison target households acquired from the power consumption history database 112.

Next, in step S16, the power consumption comparing unit 105 determines whether or not the power consumption P corresponding to the received user ID is higher than the average power consumption Pav corresponding to the user IDs of the comparison target households. When it is determined that the power consumption P is not higher than the average power consumption Pav or, in other words, when it is determined that power consumption P is equal to or lower than the average power consumption Pav (NO in step S16), in step S19, the display data generating unit 108 executes a display data generation process to generate display data. Moreover, details of the display data generation process will be given later.

On the other hand, when it is determined that the power consumption P is higher than the average power consumption Pav (YES in step S16), in step S17, the device selecting unit 106 executes a device selection process to select an electric home appliance of a first type among electric home appliances corresponding to the first user ID (the user ID providing advice related to energy conservation). Moreover, details of the device selection process will be given later.

Next, in step S18, the estimated use time calculating unit 107 executes an estimated use time calculation process to generate a differential value between a first cumulative value (power consumption P) in a prescribed period of power usage corresponding to first user ID (the received user ID) among the plurality of user IDs and a second cumulative value (average power consumption Pav) in a same period as the prescribed period of power usage corresponding to the second user IDs (the user IDs of the comparison target households) among the plurality of user IDs and, at the same time, to generate a first conversion value by converting the differential value to a use time of the electric home appliance of the first type among electric home appliances corresponding to the first user ID. Moreover, details of the estimated use time calculation process will be given later.

Next, in step S19, the display data generating unit 108 executes a display data generation process to generate display data.

Next, in step S20, the communicating unit 101 transmits the display data generated by the display data generating unit 108 to the user terminal 4.

Details of the comparison target household selection process in step S12 shown in FIG. 11 will now be described.

Figure 12:
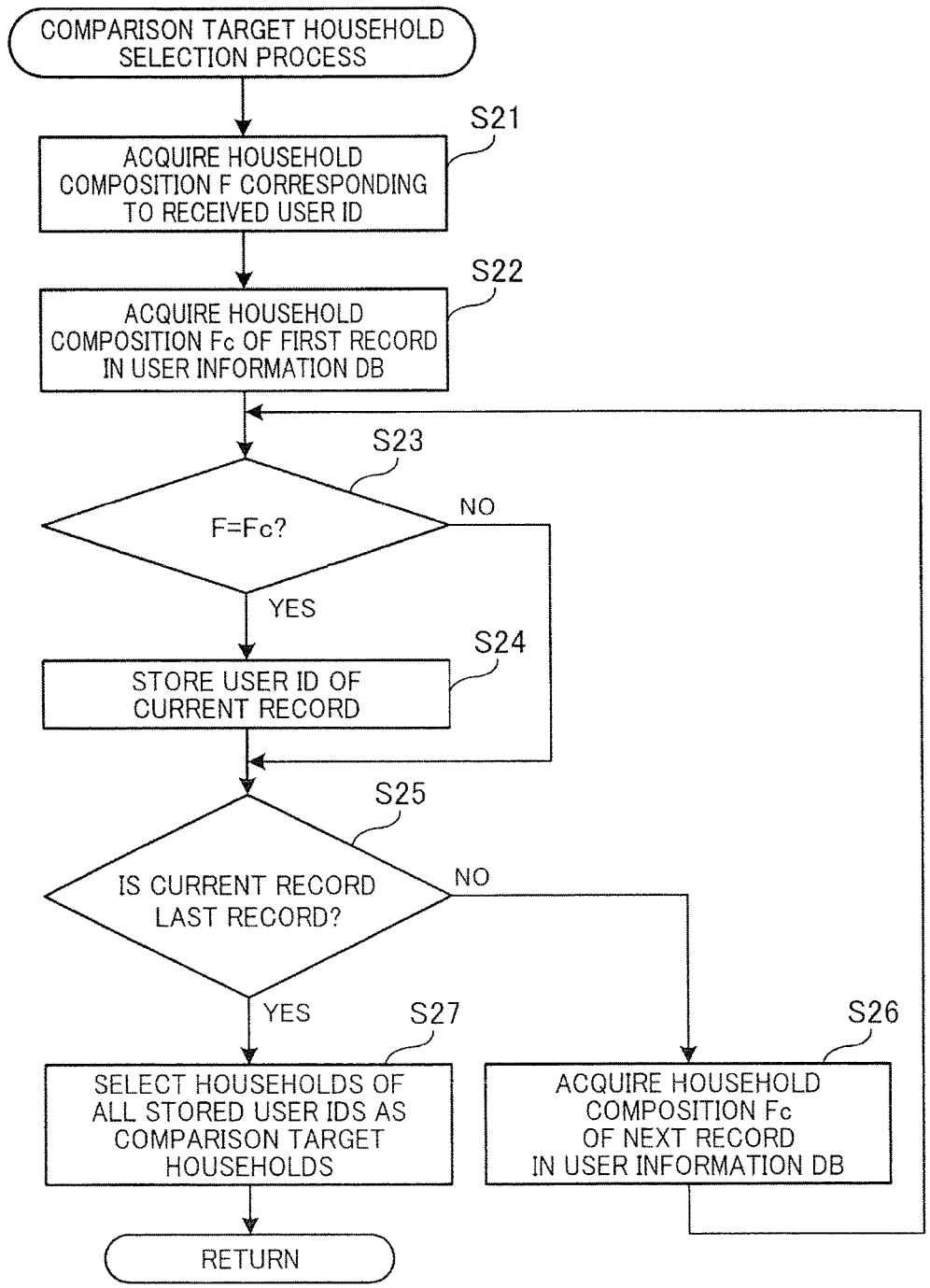
FIG. 12 is a flow chart illustrating details of a comparison target household selection process according to the first embodiment of the present disclosure.

FIG. 12 is a flow chart illustrating details of the comparison target household selection process according to the first embodiment of the present disclosure.

First, in step S21, the comparison target household selecting unit 104 acquires a household composition F corresponding to the user ID received by the communicating unit 101 from the user information database 111. The comparison target household selecting unit 104 acquires a record including the user ID received by the communicating unit 101 from the user information database 111 and acquires the household composition F from the acquired record.

Next, in step S22, the comparison target household selecting unit 104 acquires a household composition Fc of a first record in the user information database 111. The comparison target household selecting unit 104 acquires the first record from the user information database 111 and acquires the household composition Fc from the acquired record.

Next, in step S23, the comparison target household selecting unit 104 determines whether or not the household composition F is the same as the household composition Fc. When it is determined that the household composition F is not the same as the household composition Fc (NO in step S23), a transition is made to the process of step S25.

On the other hand, when it is determined that the household composition F is the same as the household composition Fc (YES in step S23), in step S24, the comparison target household selecting unit 104 stores a user ID of the current record having the same household composition Fc as the household composition F. Moreover, when the user ID of the acquired current record is the same as the received user ID, the comparison target household selecting unit 104 does not store the user ID of the acquired current record. In addition, the user ID of the current record is temporarily stored in, for example, the RAM 23.

Next, in step S25, a determination is made on whether or not the current record is a last record in the user information database 111. When it is determined that the current record is not the last record in the user information database 111 (NO in step S25), in step S26, the comparison target household selecting unit 104 acquires a household composition Fc of a next record in the user information database 111. The comparison target household selecting unit 104 acquires the record next to the current record from the user information database 111 and acquires the household composition Fc from the acquired record. Subsequently, the comparison target household selecting unit 104 returns to the process of step S23 and performs processes of step S23 and subsequent steps.

On the other hand, when it is determined that the current record is the last record in the user information database 111 (YES in step S25), in step S27, the comparison target household selecting unit 104 selects households of all stored user IDs as comparison target households. Subsequently, the comparison target household selecting unit 104 ends the comparison target household selection process.

While a comparison target household is selected based on a composition of residents (household composition) of a residence corresponding to the received user ID in the description given above, the present disclosure is not limited thereto. Alternatively, a comparison target household may be selected based on whether or not a residence is within a prescribed range from the residence corresponding to the received user ID. In a first modification of the comparison target household selection process according to the first embodiment described below, a comparison target household is selected based on whether or not a household is within a prescribed range from the residence corresponding to the received user ID.

Figure 13:
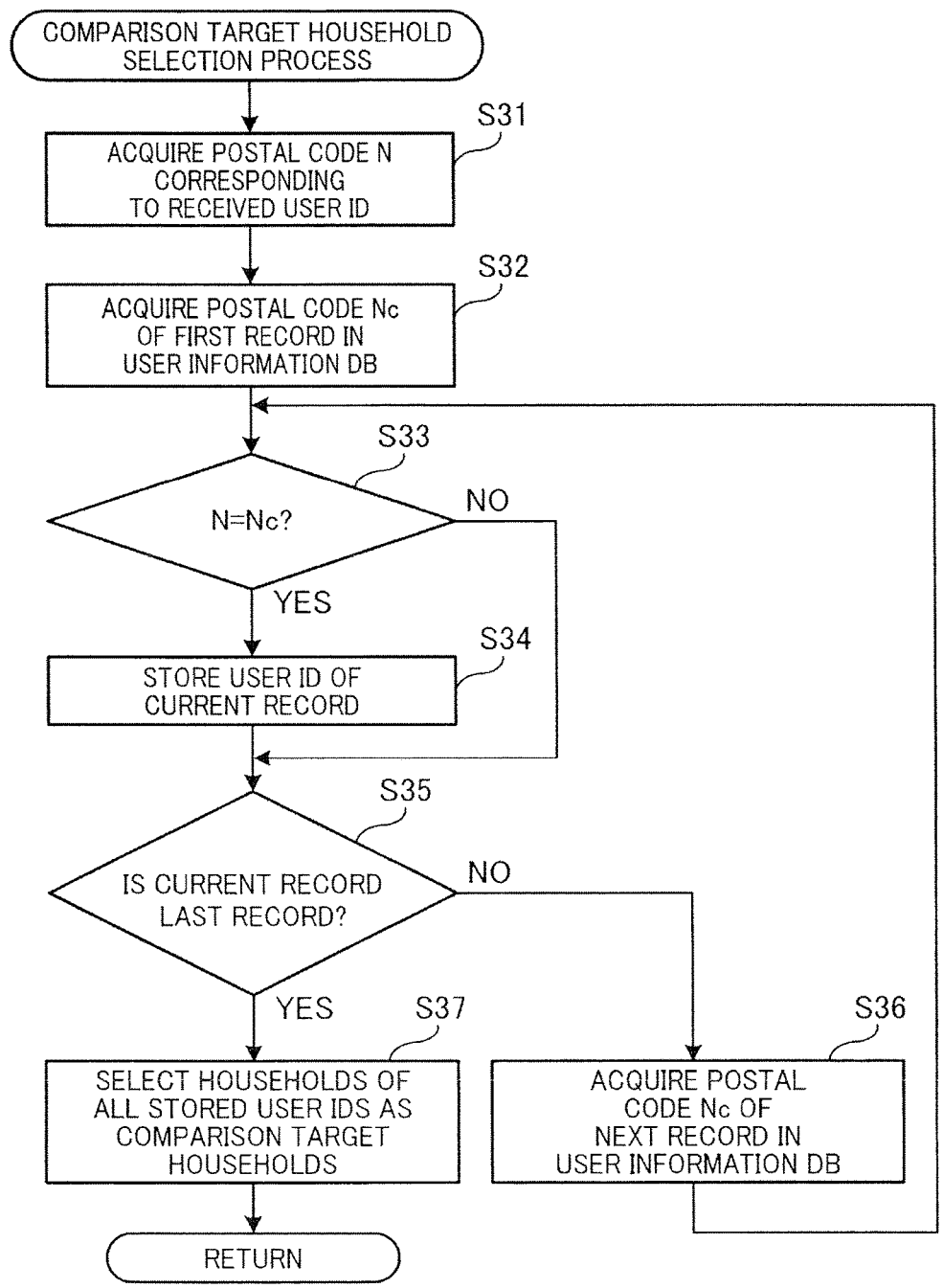
FIG. 13 is a flow chart illustrating details of a first modification of the comparison target household selection process according to the first embodiment of the present disclosure.

FIG. 13 is a flow chart illustrating details of a first modification of the comparison target household selection process according to the first embodiment of the present disclosure.

First, in step S31, the comparison target household selecting unit 104 acquires a postal code N corresponding to the user ID received by the communicating unit 101 from the user information database 111. The comparison target household selecting unit 104 acquires a record including the user ID received by the communicating unit 101 from the user information database 111 and acquires the postal code N from the acquired record.

Next, in step S32, the comparison target household selecting unit 104 acquires a postal code Nc of a first record in the user information database 111. The comparison target household selecting unit 104 acquires the first record from the user information database 111 and acquires the postal code Nc from the acquired record.

Next, in step S33, the comparison target household selecting unit 104 determines whether or not the postal code N is the same as the postal code Nc. When it is determined that the postal code N is not the same as the postal code Nc (NO in step S33), a transition is made to the process of step S35.

On the other hand, when it is determined that the postal code N is the same as the postal code Nc (YES in step S33), in step S34, the comparison target household selecting unit 104 stores a user ID of the current record having the same postal code Nc as the postal code N. Moreover, when the user ID of the acquired current record is the same as the received user ID, the comparison target household selecting unit 104 does not store the user ID of the acquired current record. In addition, the user ID of the current record is temporarily stored in, for example, the RAM 23.

Next, in step S35, a determination is made on whether or not the current record is a last record in the user information database 111. When it is determined that the current record is not the last record in the user information database 111 (NO in step S35), in step S36, the comparison target household selecting unit 104 acquires a postal code Nc of a next record in the user information database 111. The comparison target household selecting unit 104 acquires the record next to the current record from the user information database 111 and acquires the postal code Nc from the acquired record. Subsequently, the comparison target household selecting unit 104 returns to the process of step S33 and performs processes of step S33 and subsequent steps.

On the other hand, when it is determined that the current record is the last record in the user information database 111 (YES in step S35), in step S37, the comparison target household selecting unit 104 selects households of all stored user IDs as comparison target households. Subsequently, the comparison target household selecting unit 104 ends the comparison target household selection process.

Moreover, while the comparison target household selecting unit 104 selects a comparison target household based on a portal code corresponding to the received user ID in the first modification of the present first embodiment, the present disclosure is not limited thereto. Alternatively, the comparison target household selecting unit 104 may select a comparison target household based on information that enables a determination to be made on whether or not a residence is within a prescribed range from the residence corresponding to the received user ID. For example, the comparison target household selecting unit 104 may select a comparison target household based on a telephone number or an address corresponding to the received user ID. Alternatively, for example, the comparison target household selecting unit 104 may select a user ID of a residence within a prescribed range from position coordinates of the residence corresponding to the received user ID. In this case, position coordinates are to be acquired by a GPS (Global Positioning System) or the like.

While a comparison target household is selected based on whether or not a residence is within a prescribed range from the residence corresponding to the received user ID in the description given above, the present disclosure is not limited thereto. Alternatively, a comparison target household may be selected based on a residence type (layout) of the residence corresponding to the received user ID. In a second modification of the comparison target household selection process according to the first embodiment described below, a comparison target household is selected based on a residence type (layout) of the residence corresponding to the received user ID.

Figure 14:
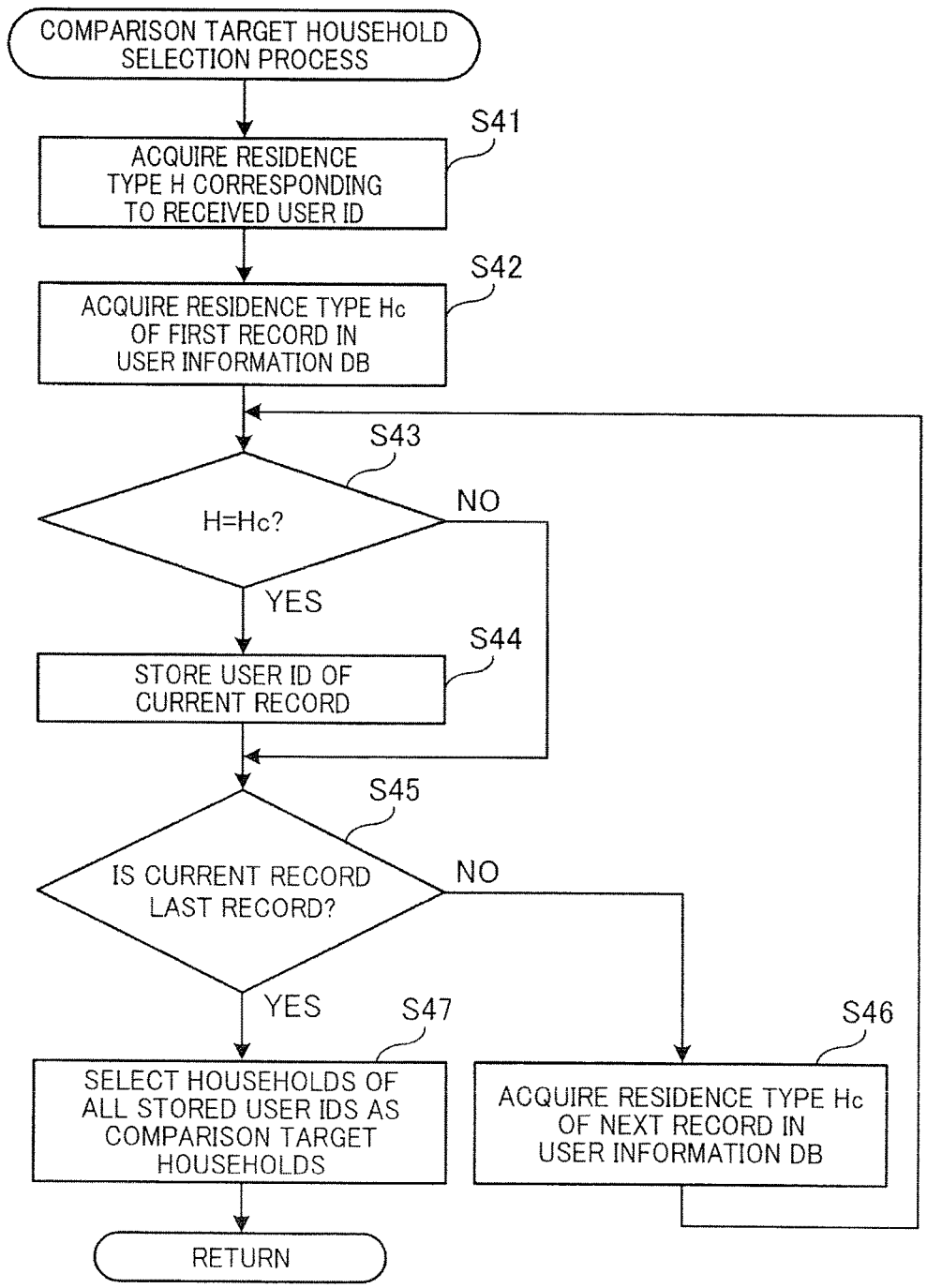
FIG. 14 is a flow chart illustrating details of a second modification of the comparison target household selection process according to the first embodiment of the present disclosure.

FIG. 14 is a flow chart illustrating details of a second modification of the comparison target household selection process according to the first embodiment of the present disclosure.

First, in step S41, the comparison target household selecting unit 104 acquires a residence type H corresponding to the user ID received by the communicating unit 101 from the user information database 111. Moreover, a residence type according to the present embodiment is either a detached house or an apartment. The comparison target household selecting unit 104 acquires a record including the user ID received by the communicating unit 101 from the user information database 111 and acquires the residence type H from the acquired record.

Next, in step S42, the comparison target household selecting unit 104 acquires a residence type Hc of a first record in the user information database 111. The comparison target household selecting unit 104 acquires the first record from the user information database 111 and acquires the residence type Hc from the acquired record.

Next, in step S43, the comparison target household selecting unit 104 determines whether or not the residence type H is the same as the residence type Hc. When it is determined that the residence type H is not the same as the residence type Hc (NO in step S43), a transition is made to the process of step S45.

On the other hand, when it is determined that the residence type H is the same as the residence type He (YES in step S43), in step S44, the comparison target household selecting unit 104 stores a user ID of the current record having the same residence type He as the residence type H. Moreover, when the user ID of the acquired current record is the same as the received user ID, the comparison target household selecting unit 104 does not store the user ID of the acquired current record. In addition, the user ID of the current record is temporarily stored in, for example, the RAM 23.

Next, in step S45, a determination is made on whether or not the current record is a last record in the user information database 111. When it is determined that the current record is not the last record in the user information database 111 (NO in step S45), in step S46, the comparison target household selecting unit 104 acquires a residence type He of a next record in the user information database 111. The comparison target household selecting unit 104 acquires the record next to the current record from the user information database 111 and acquires the residence type Hc from the acquired record. Subsequently, the comparison target household selecting unit 104 returns to the process of step S43 and performs processes of step S43 and subsequent steps.

On the other hand, when it is determined that the current record is the last record in the user information database 111 (YES in step S45), in step S47, the comparison target household selecting unit 104 selects households of all stored user IDs as comparison target households. Subsequently, the comparison target household selecting unit 104 ends the comparison target household selection process.

Moreover, while the comparison target household selecting unit 104 selects a comparison target household based on whether a residence type of a residence corresponding to the user ID is a detached house or an apartment in the second modification of the present first embodiment, the present disclosure is not limited thereto. The comparison target household selecting unit 104 may select a comparison target household based on whether a layout composition of a residence is the same as a layout composition of the residence corresponding to the user ID. In this case, a layout composition refers to types of rooms such as a living room, a kitchen, a western style room, and a Japanese style room, and the number of rooms of each type. In addition, the comparison target household selecting unit 104 may select a comparison target household based on whether the number of rooms of a residence is the same as the number of rooms in the residence corresponding to the user ID. Furthermore, the comparison target household selecting unit 104 may select a comparison target household based on whether an area of the premises of a residence is the same as an area of the premises of the residence corresponding to the user ID. In addition, the comparison target household selecting unit 104 may select a comparison target household based on whether a total floor area of a residence is the same as a total floor area of the residence corresponding to the user ID.

Details of the device selection process in step S17 shown in FIG. 11 will now be described.

Figure 15:
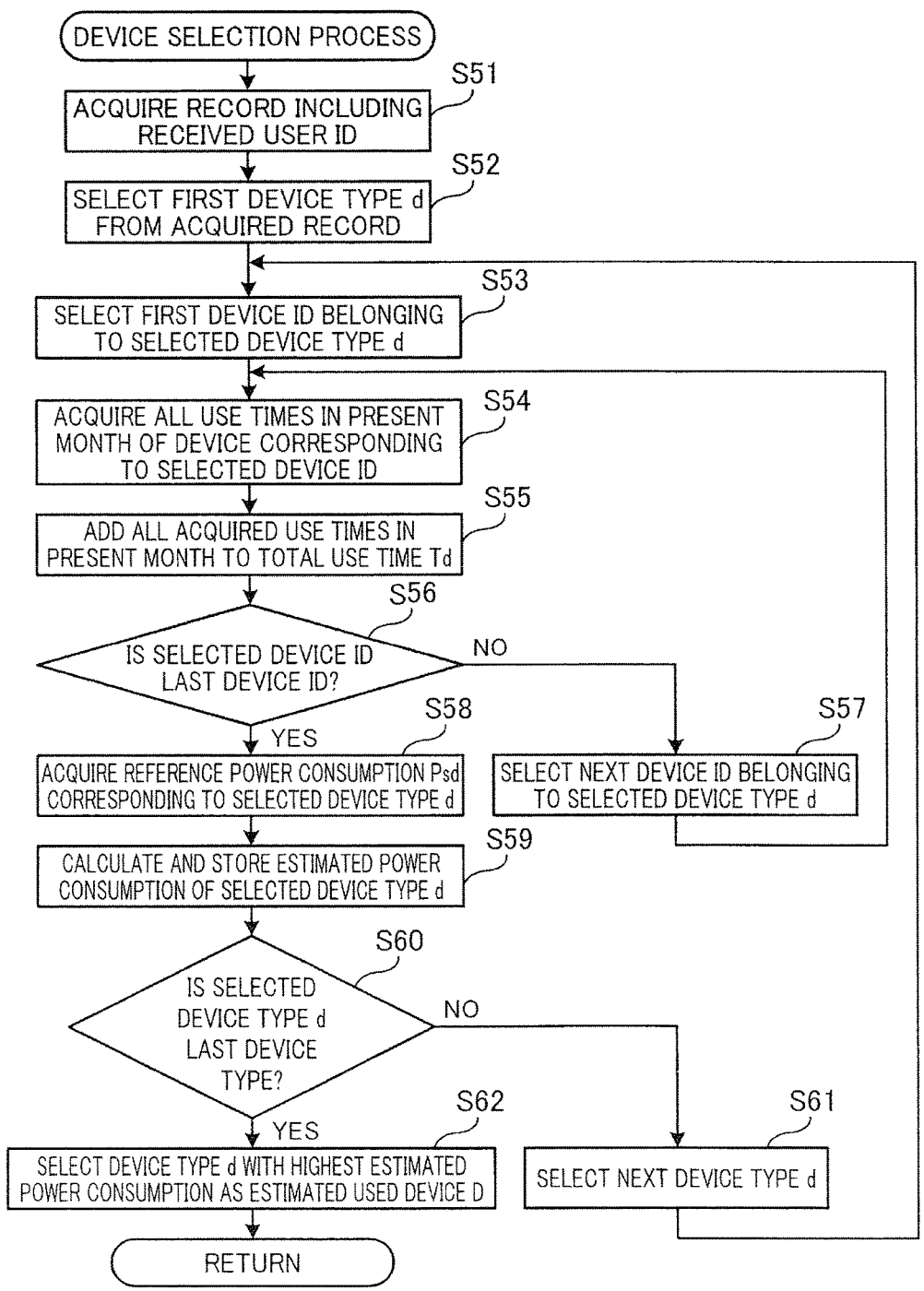
FIG. 15 is a flow chart illustrating details of a device selection process according to the first embodiment of the present disclosure.

FIG. 15 is a flow chart illustrating details of the device selection process according to the first embodiment of the present disclosure.

First, in step S51, the device selecting unit 106 acquires a record including a received user ID from the device use history database 114.

Next, in step S52, the device selecting unit 106 selects a first device type d from the acquired record.

Next, in step S53, the device selecting unit 106 selects a first device ID belonging to the selected device type d.

Next, in step S54, the device selecting unit 106 acquires all use times in the present month of a device corresponding to the selected device ID.

Next, in step S55, the device selecting unit 106 adds all acquired use times in the present month to a total use time Td indicating a sum of use times of each device type. Moreover, the use time Td is temporarily stored in the RAM 23 for each device type. The device selecting unit 106 adds all acquired use times in the present month to the total use time Td stored in the RAM 23 and updates the total use time Td stored in the RAM 23.

Next, in step S56, the device selecting unit 106 determines whether the selected device ID is a last device ID in the selected device type d. When it is determined that the selected device ID is not the last device ID in the selected device type d (NO in step S56), in step S57, the device selecting unit 106 selects a next device ID belonging to the selected device type d. Subsequently, the device selecting unit 106 returns to the process of step S54 and performs processes of step S54 and subsequent steps.

On the other hand, when it is determined that the selected device ID is the last device ID in the selected device type d (YES in step S56), in step S58, the device selecting unit 106 acquires reference power consumption Psd corresponding to the selected device type d from the reference power consumption database 113.

Next, in step S59, the device selecting unit 106 calculates and stores estimated power consumption of the selected device type d. The device selecting unit 106 calculates the estimated power consumption by multiplying the total use time Td of the selected device type d with the reference power consumption Psd corresponding to the acquired device type d. The calculated estimated power consumption is temporarily stored in, for example, the RAM 23.

Next, in step S60, the device selecting unit 106 determines whether or not the selected device type d is a last device type in the acquired record. When it is determined that the selected device type d is not the last device type in the acquired record (NO in step S60), in step S61, the device selecting unit 106 acquires a next device type d from the acquired record. Subsequently, the device selecting unit 106 returns to the process of step S53 and performs processes of step S53 and subsequent steps.

On the other hand, when it is determined that the selected device type d is the last device type in the acquired record (YES in step S60), in step S62, the device selecting unit 106 compares estimated power consumption of all device types and selects a device type d with highest estimated power consumption as an estimated used device D. Subsequently, the device selecting unit 106 ends the device selection process.

Details of the estimated use time calculation process in step S18 shown in FIG. 11 will now be described.

Figure 16:
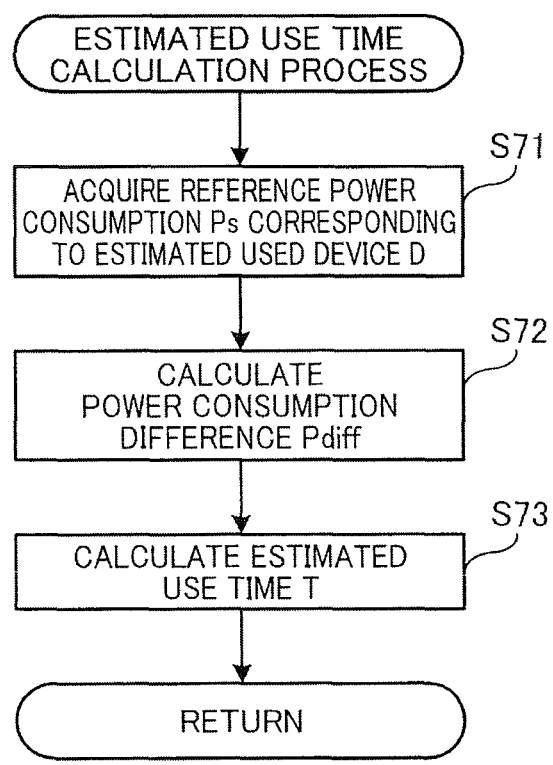
FIG. 16 is a flow chart illustrating details of an estimated use time calculation process according to the first embodiment of the present disclosure.

FIG. 16 is a flow chart illustrating details of the estimated use time calculation process according to the first embodiment of the present disclosure.

First, in step S71, the estimated use time calculating unit 107 acquires reference power consumption Ps corresponding to the estimated used device D selected by the device selecting unit 106 from the reference power consumption database 113.

Next, in step S72, the estimated use time calculating unit 107 calculates a power consumption difference Pdiff that is a differential value between power consumption P in the present month corresponding to the received user ID and average power consumption Pav of all comparison target households. The estimated use time calculating unit 107 calculates the power consumption difference Pdiff by subtracting the average power consumption Pav of all comparison target households from the power consumption P in the present month corresponding to the received user ID.

Next, in step S73, the estimated use time calculating unit 107 calculates an estimated use time T by dividing the calculated power consumption difference Pdiff by the acquired reference power consumption Ps. Subsequently, the estimated use time calculating unit 107 ends the estimated use time calculation process.

Details of the display data generation process in step S19 shown in FIG. 11 will now be described.

Figure 17:
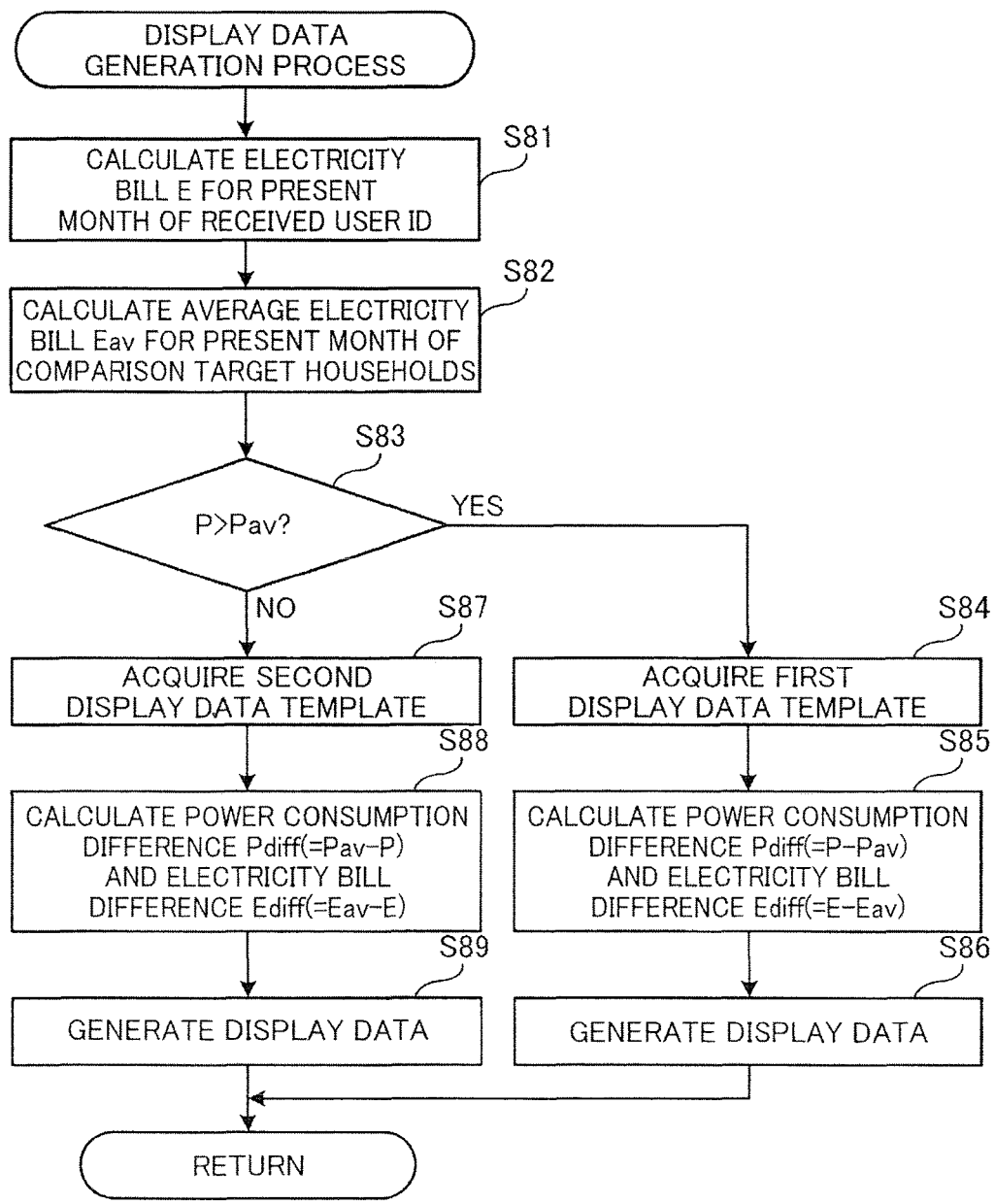
FIG. 17 is a flow chart illustrating details of a display data generation process according to the first embodiment of the present disclosure.

FIG. 17 is a flow chart illustrating details of the display data generation process according to the first embodiment of the present disclosure.

First, in step S81, the display data generating unit 108 calculates an electricity bill E for the present month of the user ID received by the communicating unit 101. The display data generating unit 108 calculates the electricity bill E for the present month of the received user ID by multiplying power consumption P in the present month corresponding to the received user ID by a prescribed electricity bill unit price. Moreover, the prescribed electricity bill unit price is stored in advance in, for example, the storage unit 27.

Next, in step S82, the display data generating unit 108 calculates an average electricity bill Eav for the present month of comparison target households. The display data generating unit 108 calculates the average electricity bill Eav for the present month of the comparison target households by multiplying the average power consumption Pav of all comparison target households by the prescribed electricity bill unit price.

Next, in step S83, the display data generating unit 108 determines whether or not the power consumption P corresponding to the received user ID is higher than the average power consumption Pav corresponding to the user IDs of the comparison target households. When it is determined that the power consumption P is higher than the average power consumption Pav (YES in step S83), in step S84, the display data generating unit 108 acquires a first display data template that is displayed when the power consumption P is higher than the average power consumption Pav from the display data template database 115.

Next, in step S85, the display data generating unit 108 calculates a power consumption difference Pdiff that is a differential value between the power consumption P corresponding to the received user ID and the average power consumption Pav corresponding to the user IDs of the comparison target households and an electricity bill difference Ediff that is a differential value between the electricity bill E for the present month of the received user ID and the average electricity bill Eav for the present month of the comparison target households. The display data generating unit 108 calculates the power consumption difference Pdiff by subtracting the average power consumption Pav corresponding to the user IDs of the comparison target households from the power consumption P corresponding to the received user ID. In addition, the display data generating unit 108 calculates the electricity bill difference Ediff by subtracting the average electricity bill Eav for the present month of the comparison target households from the electricity bill E for the present month of the received user ID.

Next, in step S86, the display data generating unit 108 generates display data that respectively applies the power consumption P, the electricity bill E, the average power consumption Pav, the average electricity bill Eav, the power consumption difference Pdiff, the electricity bill difference Ediff, the estimated used device D, and the estimated use time T to the acquired first display data template. Subsequently, the display data generating unit 108 ends the display data generation process.

On the other hand, when it is determined that the power consumption P is not higher than the average power consumption Pav or, in other words, when it is determined that the power consumption P is equal to or lower than the average power consumption Pav (NO in step S83), in step S87, the display data generating unit 108 acquires a second display data template that is displayed when the power consumption P is equal to or lower than the average power consumption Pav from the display data template database 115.

Next, in step S88, the display data generating unit 108 calculates a power consumption difference Pdiff that is a differential value between the average power consumption Pav corresponding to the user IDs of the comparison target households and the power consumption P corresponding to the received user ID and an electricity bill difference Ediff that is a differential value between the average electricity bill Eav for the present month of the comparison target households and the electricity bill E for the present month of the received user ID. The display data generating unit 108 calculates the power consumption difference Pdiff by subtracting the power consumption P corresponding to the received user ID from the average power consumption Pav corresponding to the user IDs of the comparison target households. In addition, the display data generating unit 108 calculates the electricity bill difference Ediff by subtracting the electricity bill E for the present month of the received user ID from the average electricity bill Eav for the present month of the comparison target households.

Next, in step S89, the display data generating unit 108 generates display data that respectively applies the power consumption P, the electricity bill E, the average power consumption Pav, the average electricity bill Eav, the power consumption difference Pdiff, and the electricity bill difference Ediff to the acquired second display data template. Subsequently, the display data generating unit 108 ends the display data generation process.

Moreover, when the power consumption P is the same as the average power consumption Pav, the display data generating unit 108 may acquire a display data template that is displayed when the power consumption P and the average power consumption Pav are the same from the display data template database 115. In this case, the display data generating unit 108 may generate display data that respectively applies the power consumption P, the electricity bill E, the average power consumption Pav, the average electricity bill Eav, the power consumption difference Pdiff, and the electricity bill difference Ediff to the acquired display data template.

Figure 18:
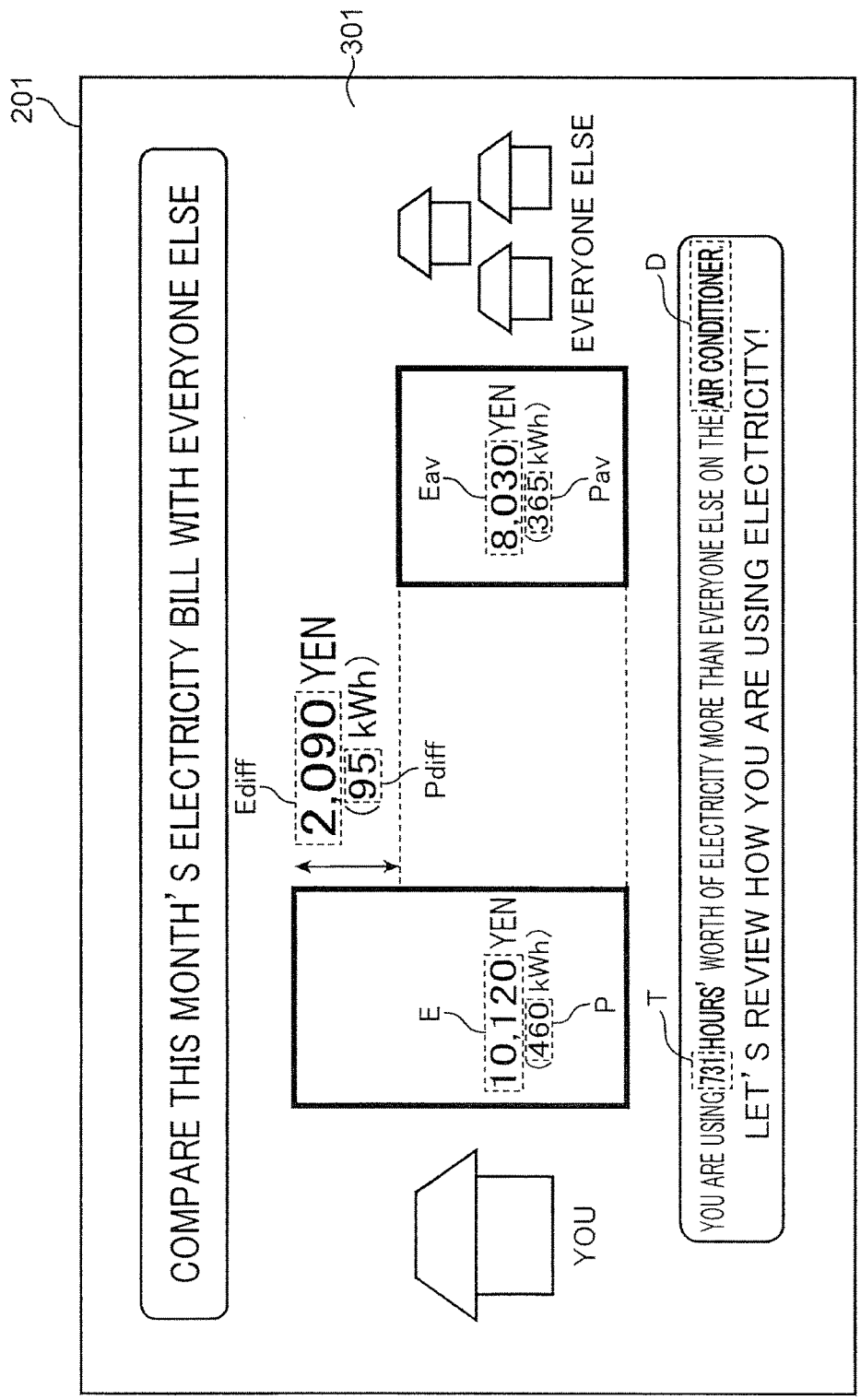
FIG. 18 is a diagram showing an example of display data that is generated when power consumption P is higher than average power consumption Pav according to the present first embodiment.

FIG. 18 is a diagram showing an example of display data that is generated when power consumption P is higher than average power consumption Pav according to the present first embodiment.

In display data 201 shown in FIG. 18, power consumption P, an electricity bill E, average power consumption Pav, an average electricity bill Eav, a power consumption difference Pdiff, an electricity bill difference Ediff, an estimated used device D, and an estimated use time T are respectively applied to a first display data template 301.

For example, the first display data template 301 includes texts reading "Compare this month's electricity bill with everyone else" and "You are using YYYY hours' worth of electricity more than everyone else on XXXX. Let's review how you are using electricity!" The estimated used device D is applied to "XXXX" and the estimated use time T is applied to "YYYY".

In addition, in the example shown in FIG. 18, "460" (kWh) is applied as the power consumption P, "10,120" (yen) is applied as the electricity bill E, "365" (kWh) is applied as the average power consumption Pav, "8,030" (yen) is applied as the average electricity bill Eav, "95" (kWh) is applied as the power consumption difference Pdiff, "2,090" (yen) is applied as the electricity bill difference Ediff, "air conditioner" is applied as the estimated used device D, and "731" (hours) is applied as the estimated use time T.

As shown, the display data 201 indicates that the differential value (the power consumption difference Pdiff) between power usage (the power consumption P) corresponding to the first user ID and power usage (the average power consumption Pav) corresponding to second user IDs (comparison target households) in the prescribed period corresponds to the first conversion value (the estimated use time T) that is generated by converting the differential value (the power consumption difference Pdiff) to a use time of the estimated used device D. Therefore, the user is able to realize the magnitude of a difference between the user's power usage and the power usage of other people when applying the difference to the user's everyday life. In addition, since the difference between the user's power usage and the power usage of other people is presented by being converted into a use time of an electric home appliance owned by the user, the user can be prompted to engage in energy conservation.

Figure 19:
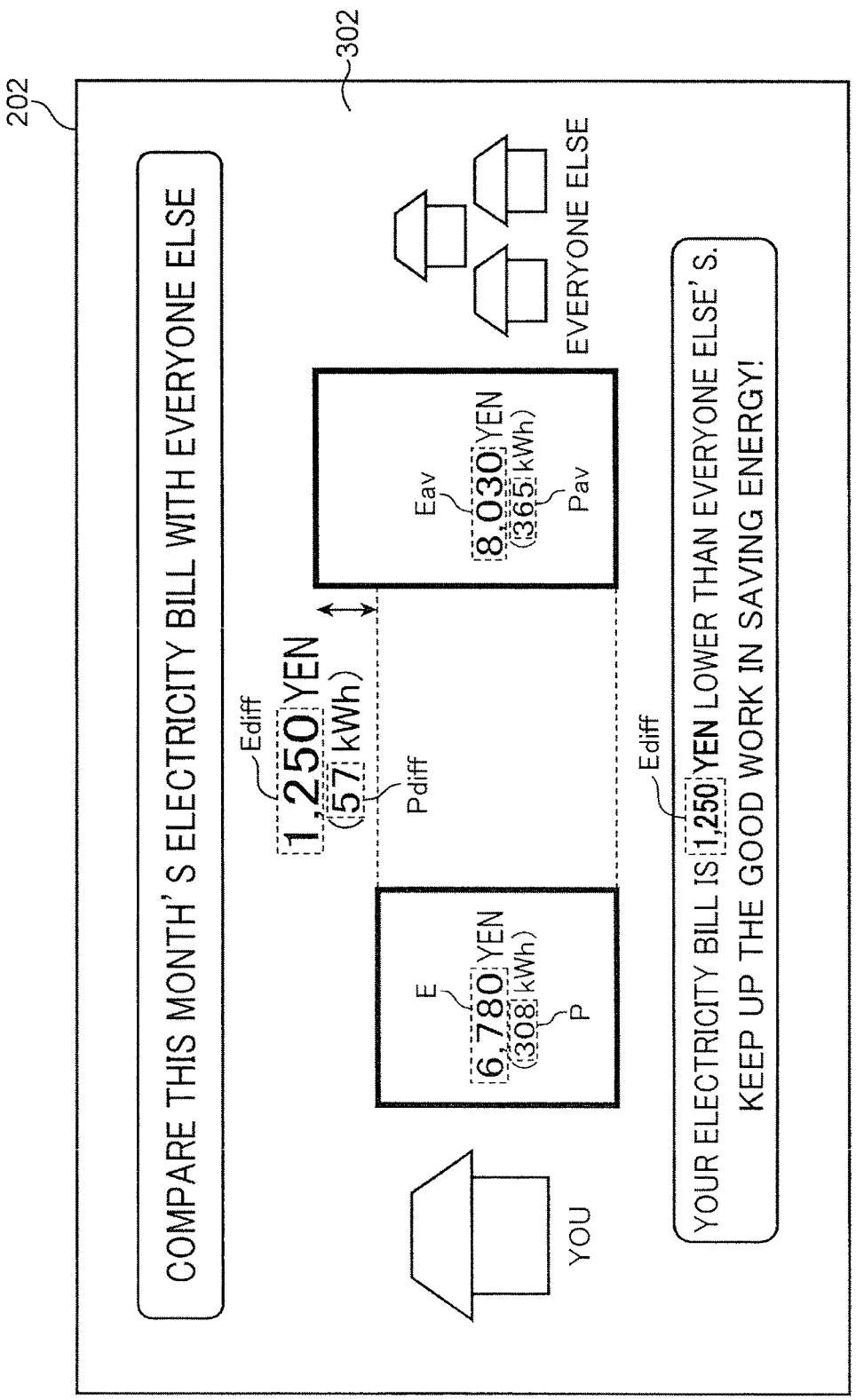
FIG. 19 is a diagram showing an example of display data that is generated when power consumption P is equal to or lower than average power consumption Pav according to the present first embodiment.

FIG. 19 is a diagram showing an example of display data that is generated when power consumption P is equal to or lower than average power consumption Pav according to the present first embodiment.

In display data 202 shown in FIG. 19, power consumption P, an electricity bill E, average power consumption Pav, an average electricity bill Eav, a power consumption difference Pdiff, and an electricity bill difference Ediff are respectively applied to a second display data template 302.

For example, the second display data template 302 includes texts reading "Compare this month's electricity bill with everyone else" and "Your electricity bill is ZZZZ yen lower than everyone else's. Keep up the good work in saving energy!" The electricity bill difference Ediff is applied to "ZZZZ".

In addition, in the example shown in FIG. 19, "308" (kWh) is applied as the power consumption P, "6,780" (yen) is applied as the electricity bill E, "365" (kWh) is applied as the average power consumption Pav, "8,030" (yen) is applied as the average electricity bill Eav, "57" (kWh) is applied as the power consumption difference Pdiff, and "1,250" (yen) is applied as the electricity bill difference Ediff.

Figure 20:
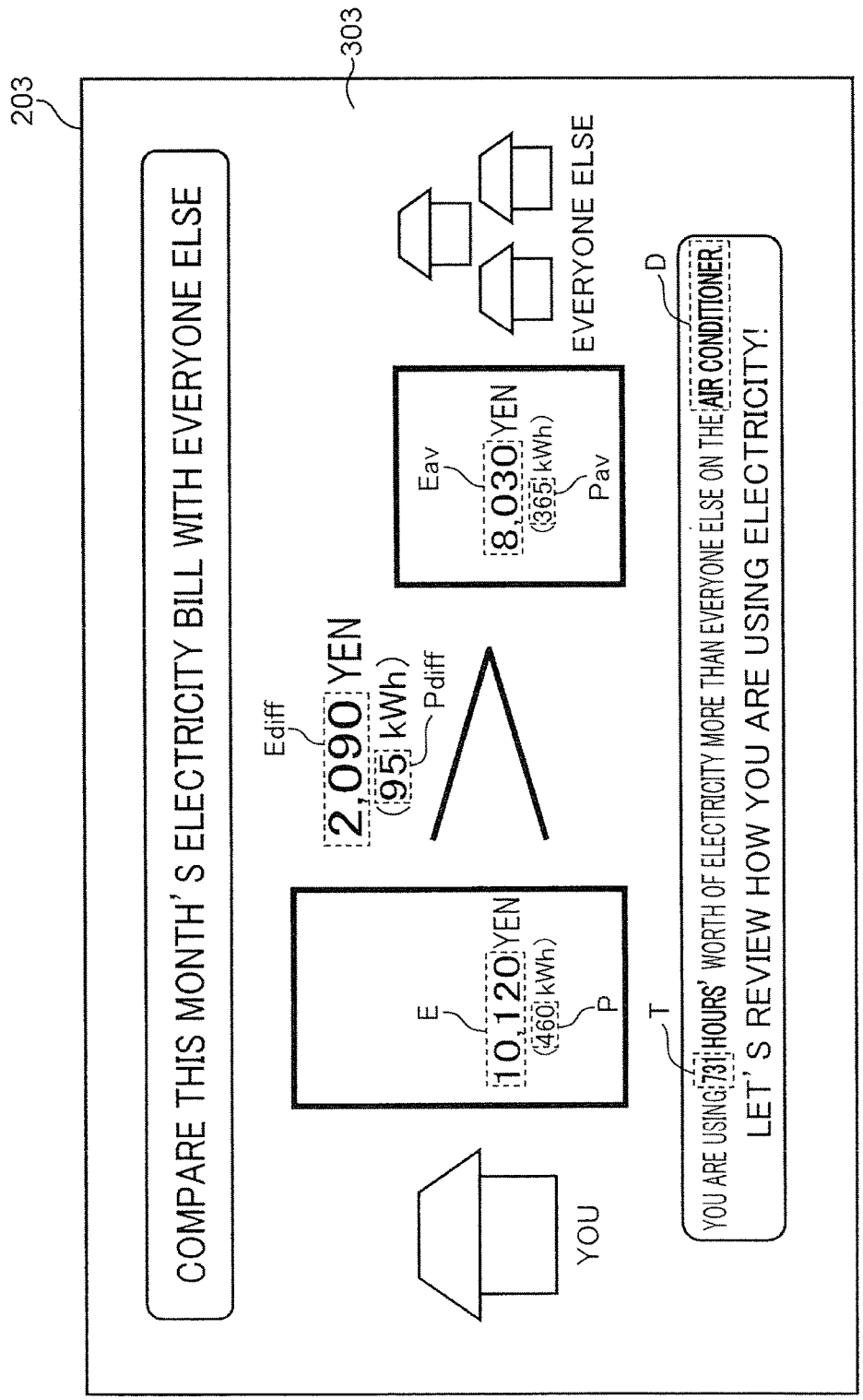
FIG. 20 is a diagram showing a first modification of display data that is generated when power consumption P is higher than average power consumption Pav according to the present first embodiment.

FIG. 20 is a diagram showing a first modification of display data that is generated when power consumption P is higher than average power consumption Pav according to the present first embodiment.

In display data 203 shown in FIG. 20, power consumption P, an electricity bill E, average power consumption Pav, an average electricity bill Eav, a power consumption difference Pdiff, an electricity bill difference Ediff, an estimated used device D, and an estimated use time T are respectively applied to a first display data template 303.

The first display data template 303 shown in FIG. 20 differs from the first display data template 301 shown in FIG. 18 in that the power consumption P being higher than the average power consumption Pav is expressed by an inequality sign. An inequality sign representing a magnitude relationship between the power consumption P and the average power consumption Pav is shown in a center portion of the display data 203.

Figure 21:
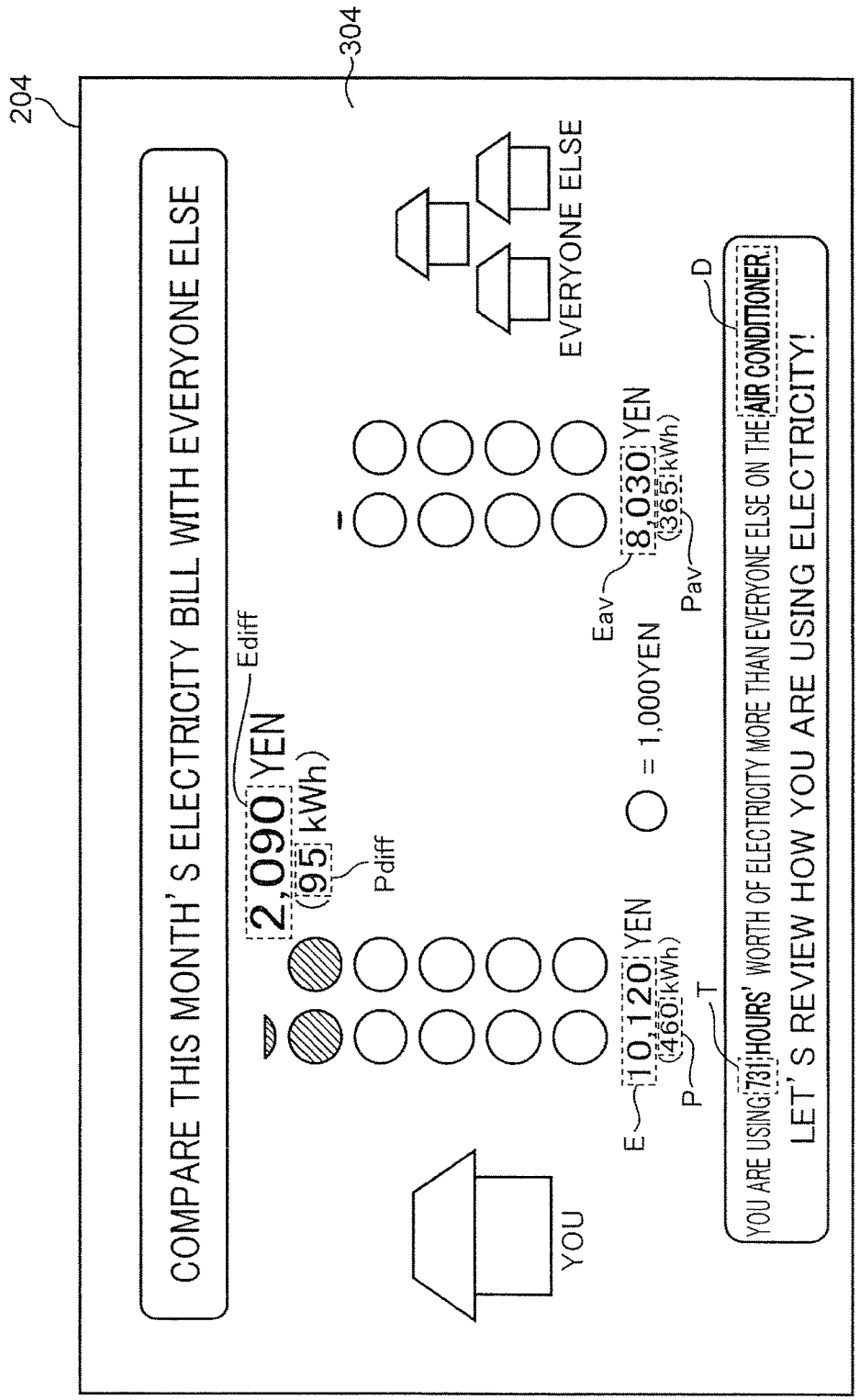
FIG. 21 is a diagram showing a second modification of display data that is generated when power consumption P is higher than average power consumption Pav according to the present first embodiment.

FIG. 21 is a diagram showing a second modification of display data that is generated when power consumption P is higher than average power consumption Pav according to the present first embodiment.

In display data 204 shown in FIG. 21, power consumption P, an electricity bill E, average power consumption Pav, an average electricity bill Eav, a power consumption difference Pdiff, an electricity bill difference Ediff, an estimated used device D, and an estimated use time T are respectively applied to a first display data template 304.

The first display data template 304 shown in FIG. 21 differs from the first display data template 301 shown in FIG. 18 in that the electricity bill E and the average electricity bill Eav are expressed by numbers of prescribed object images and that the electricity bill difference Ediff is expressed by varying display modes of the prescribed object images. In the display data 204, for example, the electricity bill E and the average electricity bill Eav are expressed by the numbers of circular images, whereby one circular image represents 1,000 yen. In addition, the electricity bill difference Ediff is expressed by using a different color for circular images corresponding to the electricity bill difference Ediff from circular images corresponding to the average electricity bill Eav.

Moreover, display data may include an electricity bill corresponding to each of a plurality of electric home appliances arranged in a residence of a user. Hereinafter, a process of generating display data including an electricity bill corresponding to each of a plurality of electric home appliances arranged in a residence of a user will be described with reference to FIGS. 22 to 25.

Figure 22:
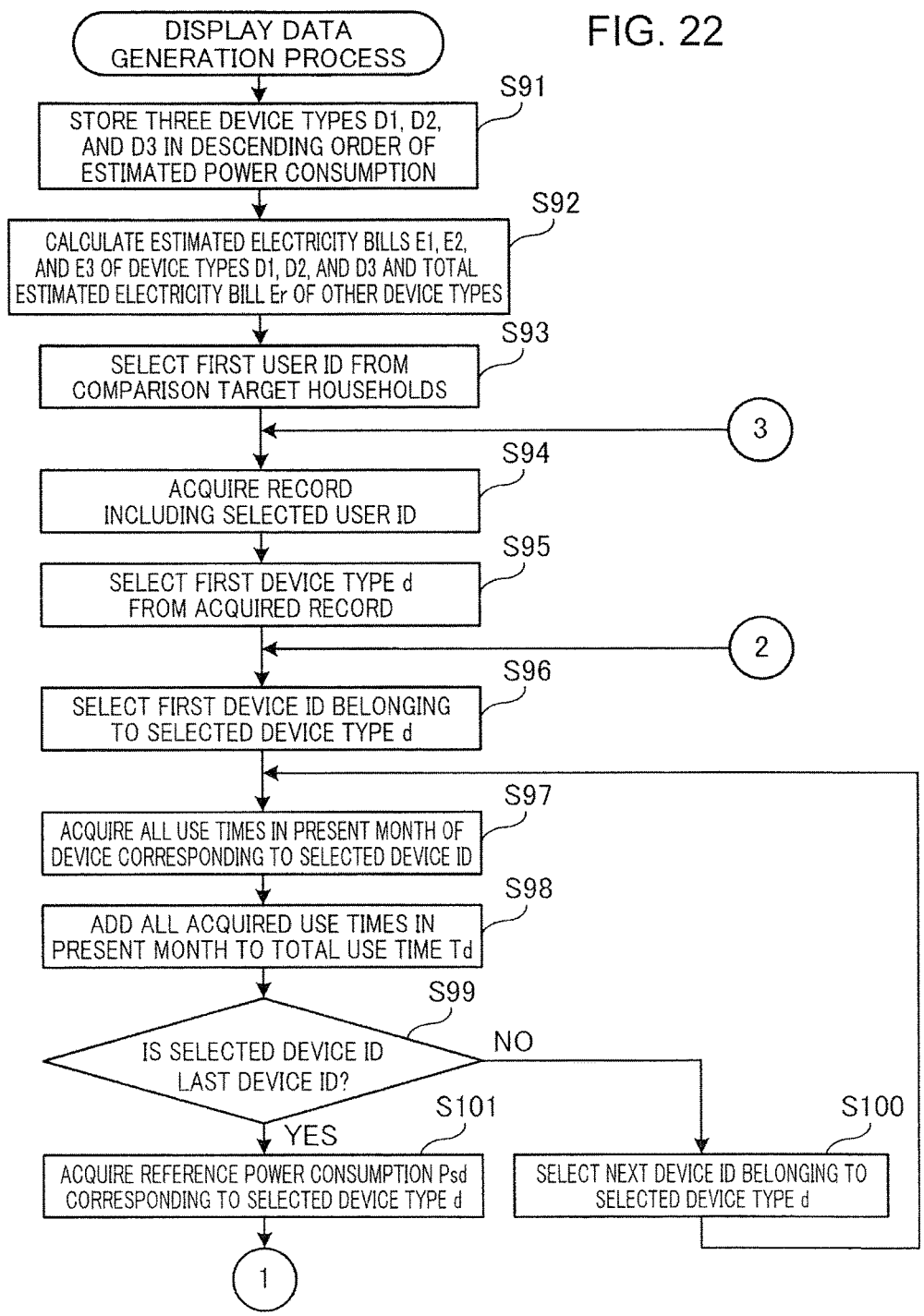
FIG. 22 is a first flow chart illustrating details of a modification of the display data generation process according to the first embodiment of the present disclosure.
Figure 23:
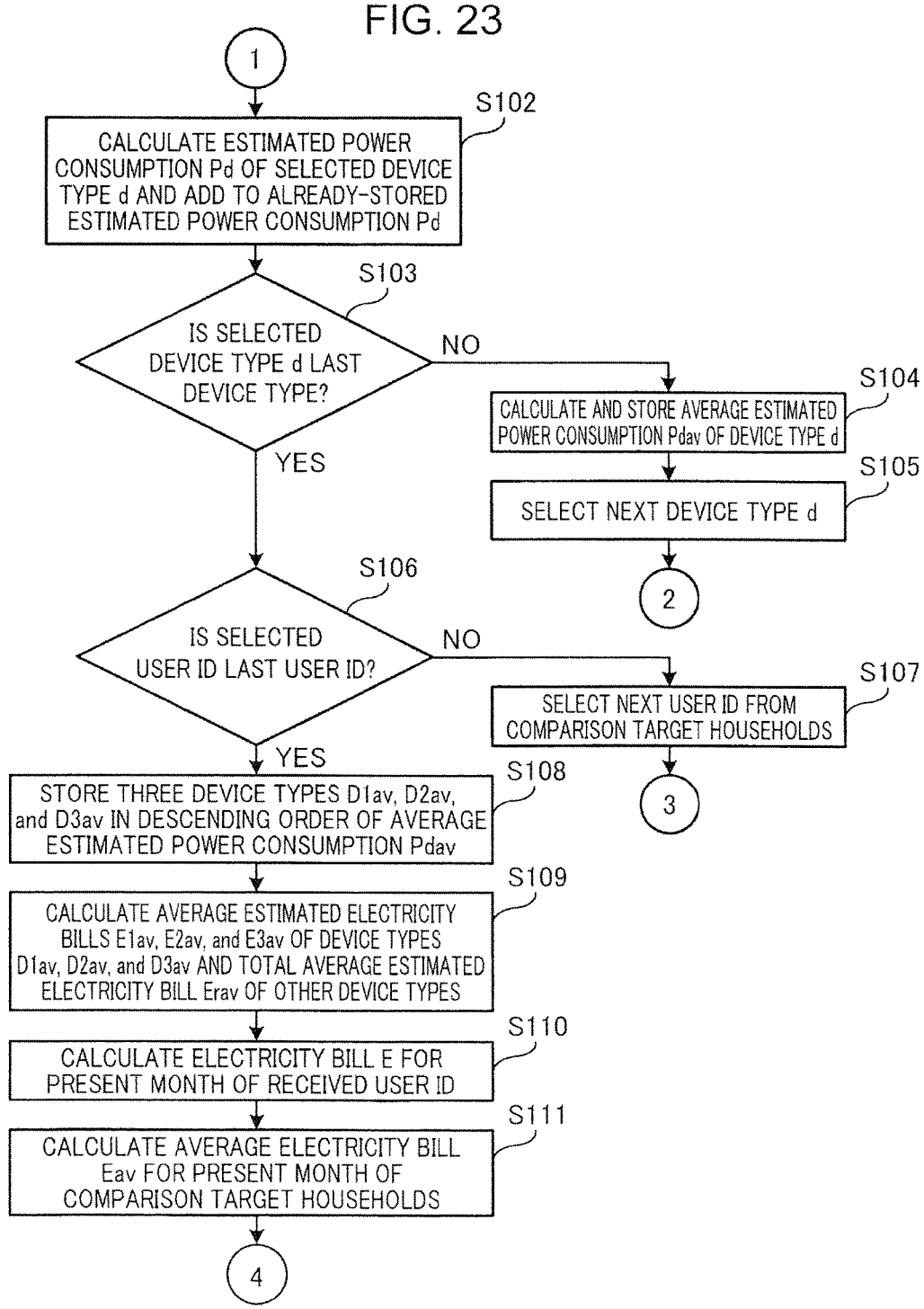
FIG. 23 is a second flow chart illustrating details of a modification of the display data generation process according to the first embodiment of the present disclosure.
Figure 24:
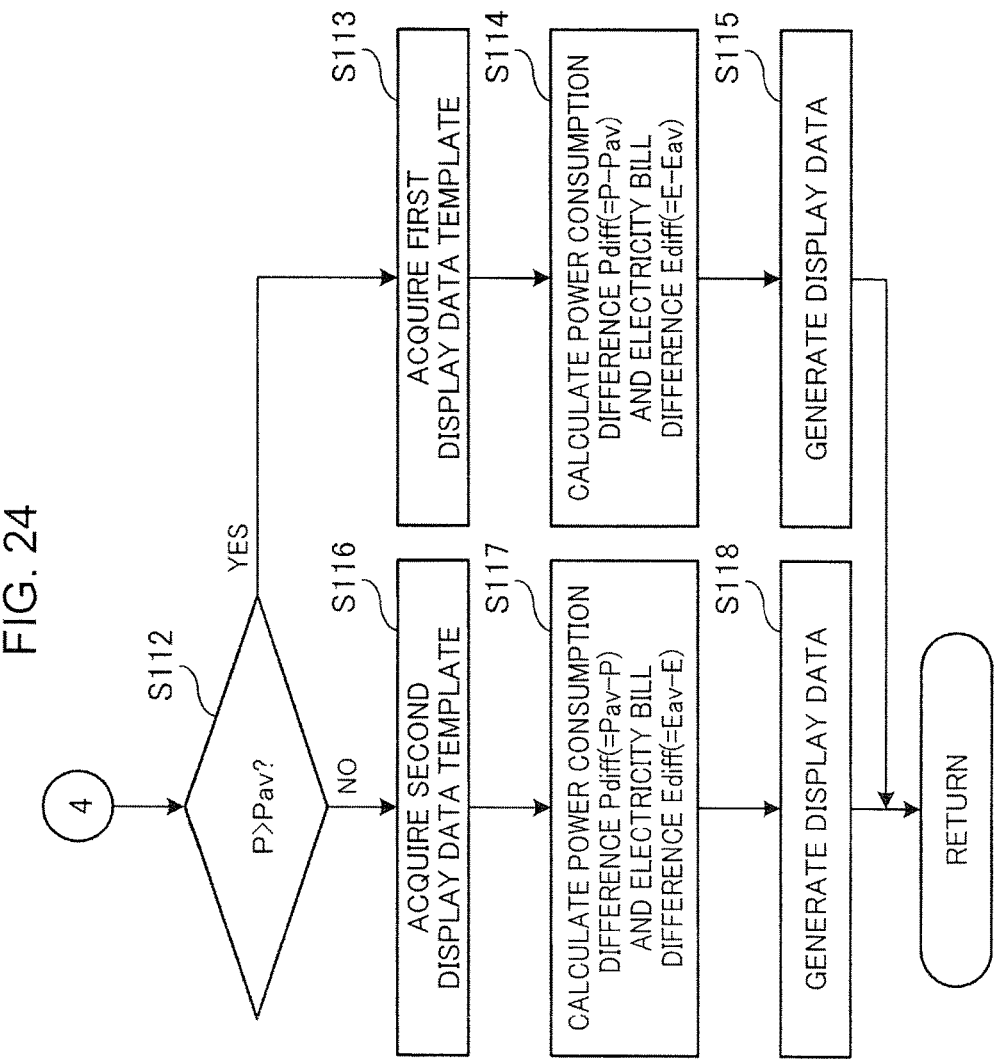
FIG. 24 is a third flow chart illustrating details of a modification of the display data generation process according to the first embodiment of the present disclosure.

FIG. 22 is a first flow chart illustrating details of a modification of the display data generation process according to the first embodiment of the present disclosure, FIG. 23 is a second flow chart illustrating details of a modification of the display data generation process according to the first embodiment of the present disclosure, and FIG. 24 is a third flow chart illustrating details of a modification of the display data generation process according to the first embodiment of the present disclosure.

First, in step S91, the display data generating unit 108 stores three device types D1, D2, and D3 in a descending order of estimated power consumption among estimated power consumption of all device types calculated by the device selecting unit 106.

Next, in step S92, the display data generating unit 108 calculates estimated electricity bills E1, E2, and E3 of the device types D1, D2, and D3 and a total estimated electricity bill Er of device types other than the device types D1, D2, and D3. The display data generating unit 108 calculates the estimated electricity bills E1, E2, and E3 of the device types D1, D2, and D3 by multiplying respective estimated power consumption of the device types D1, D2, and D3 by a prescribed electricity bill unit price. In addition, the display data generating unit 108 calculates the electricity bill E for the present month of the received user ID by multiplying power consumption P for the present month of the received user ID by the prescribed electricity bill unit price. Furthermore, the display data generating unit 108 calculates the total estimated electricity bill Er of the other device types by subtracting the estimated electricity bills E1, E2, and E3 from the electricity bill E.

Next, in step S93, the display data generating unit 108 selects a first user ID from comparison target households selected by the comparison target household selecting unit 104.

Next, in step S94, the display data generating unit 108 acquires a record including the selected user ID from the device use history database 114.

Next, in step S95, the display data generating unit 108 selects a first device type d from the acquired record.

Next, in step S96, the display data generating unit 108 selects a first device ID belonging to the selected device type d.

Next, in step S97, the display data generating unit 108 acquires all use times in the present month of a device corresponding to the selected device ID.

Next, in step S98, the display data generating unit 108 adds all acquired use times in the present month to a total use time Td indicating a sum of use times of each device type. Moreover, the use time Td is temporarily stored in the RAM 23 for each device type. The display data generating unit 108 adds all acquired use times in the present month to the total use time Td stored in the RAM 23 and updates the total use time Td stored in the RAM 23.

Next, in step S99, the display data generating unit 108 determines whether the selected device ID is a last device ID in the selected device type d. When it is determined that the selected device ID is not the last device ID in the selected device type d (NO in step S99), in step S100, the display data generating unit 108 selects a next device ID belonging to the selected device type d. Subsequently, the display data generating unit 108 returns to the process of step S97 and performs processes of step S97 and subsequent steps.

On the other hand, when it is determined that the selected device ID is the last device ID in the selected device type d (YES in step S99), in step S101, the display data generating unit 108 selects reference power consumption Psd corresponding to the selected device type d from the reference power consumption database 113.

Next, in step S102, the display data generating unit 108 calculates estimated power consumption Pd of the selected device type d and adds the calculated estimated power consumption Pd to the already-stored estimated power consumption Pd. The display data generating unit 108 calculates the estimated power consumption Pd by multiplying the total use time Td of the selected device type d with the reference power consumption Psd corresponding to the selected device type d. The calculated estimated power consumption Pd is temporarily stored in, for example, the RAM 23. The display data generating unit 108 adds the calculated estimated power consumption Pd to the calculated estimated power consumption Pd stored in the RAM 23 and updates the estimated power consumption Pd stored in the RAM 23.

Next, in step S103, the display data generating unit 108 determines whether or not the selected device type d is a last device type in the acquired record. When it is determined that the selected device type d is not the last device type in the acquired record (NO in step S103), in step S104, the display data generating unit 108 calculates average estimated power consumption Pdav of the device type d by dividing the stored estimated power consumption Pd with the number of comparison target households and stores the calculated average estimated power consumption Pdav. The calculated average estimated power consumption Pdav is temporarily stored for each device type in, for example, the RAM 23.

Next, in step S105, the display data generating unit 108 selects a next device type d from the acquired record. Subsequently, the display data generating unit 108 returns to the process of step S96 and performs processes of step S96 and subsequent steps.

On the other hand, when it is determined that the selected device type d is the last device type in the acquired record (YES in step S103), in step S106, the display data generating unit 108 determines whether or not the selected user ID is a last user ID in the comparison target households. When it is determined that the selected user ID is not the last user ID in the comparison target households (NO in step S106), in step S107, the display data generating unit 108 selects a next user ID from the comparison target households. Subsequently, the display data generating unit 108 returns to the process of step S94 and performs processes of step S94 and subsequent steps.

On the other hand, when it is determined that the selected user ID is the last user ID in the comparison target households (YES in step S106), in step S108, the display data generating unit 108 stores three device types D1av, D2av, and D3av in a descending order of average estimated power consumption Pdav among all stored average estimated power consumption Pdav.

Next, in step S109, the display data generating unit 108 calculates average estimated electricity bills E1av, E2av, and E3av of the device types D1av, D2av, and D3av and a total average estimated electricity bill Erav of device types other than the device types D1av, D2av, and D3av. The display data generating unit 108 calculates the average estimated electricity bills E1av, E2av, and E3av of the device types D1av, D2av, and D3av by multiplying respective average estimated power consumption of the device types D1av, D2av, and D3av by a prescribed electricity bill unit price. In addition, the display data generating unit 108 calculates the average electricity bill Eav for the present month of the comparison target households by multiplying the average power consumption Pav of all comparison target households by the prescribed electricity bill unit price. Furthermore, the display data generating unit 108 calculates the total average estimated electricity bill Erav of the other device types by subtracting the average estimated electricity bills E1av, E2av, and E3av from the average electricity bill Eav.

Next, in step S110, the display data generating unit 108 calculates an electricity bill E for the present month of the user ID received by the communicating unit 101. The display data generating unit 108 calculates the electricity bill E for the present month of the received user ID by multiplying power consumption P in the present month corresponding to the received user ID by a prescribed electricity bill unit price.

Next, in step S111, the display data generating unit 108 calculates an average electricity bill Eav for the present month of comparison target households. The display data generating unit 108 calculates the average electricity bill Eav for the present month of the comparison target households by multiplying the average power consumption Pav of all comparison target households by the prescribed electricity bill unit price. Moreover, when the average electricity bill Eav has already been calculated in step S109, the process of step S111 may be omitted. Alternatively, the display data generating unit 108 may perform the process of step S111 before step S109.

Since processes of steps S112 to S114 are the same as the processes of steps S83 to S85 shown in FIG. 17, a description thereof will be omitted.

Next, in step S115, the display data generating unit 108 generates display data that respectively applies the power consumption P, the electricity bill E, the average power consumption Pav, the average electricity bill Eav, the power consumption difference Pdiff, the electricity bill difference Ediff, the estimated used device D, the estimated use time T, the device types D1, D2, and D3, the estimated electricity bills E1, E2, and E3, the total estimated electricity bill Er, the device types D1av, D2av, and D3av, the average estimated electricity bills E1av, E2av, and E3av, and the total average estimated electricity bill Erav to the acquired first display data template. Subsequently, the display data generating unit 108 ends the display data generation process.

Since processes of steps S116 and S117 are the same as the processes of steps S87 and S88 shown in FIG. 17, a description thereof will be omitted.

Next, in step S118, the display data generating unit 108 generates display data that respectively applies the power consumption P, the electricity bill E, the average power consumption Pav, the average electricity bill Eav, the power consumption difference Pdiff, the electricity bill difference Ediff, the device types D1, D2, and D3, the estimated electricity bills E1, E2, and E3, the total estimated electricity bill Er, the device types D1av, D2av, and D3av, the average estimated electricity bills E1av, E2av, and E3av, and the total average estimated electricity bill Erav to the acquired second display data template. Subsequently, the display data generating unit 108 ends the display data generation process.

Moreover, while three device types are displayed in a descending order of estimated power consumption in the example described above, the present disclosure is not particularly limited thereto. Alternatively, two device types may be displayed in a descending order of estimated power consumption, or four or more device types may be displayed in a descending order of estimated power consumption.

Figure 25:
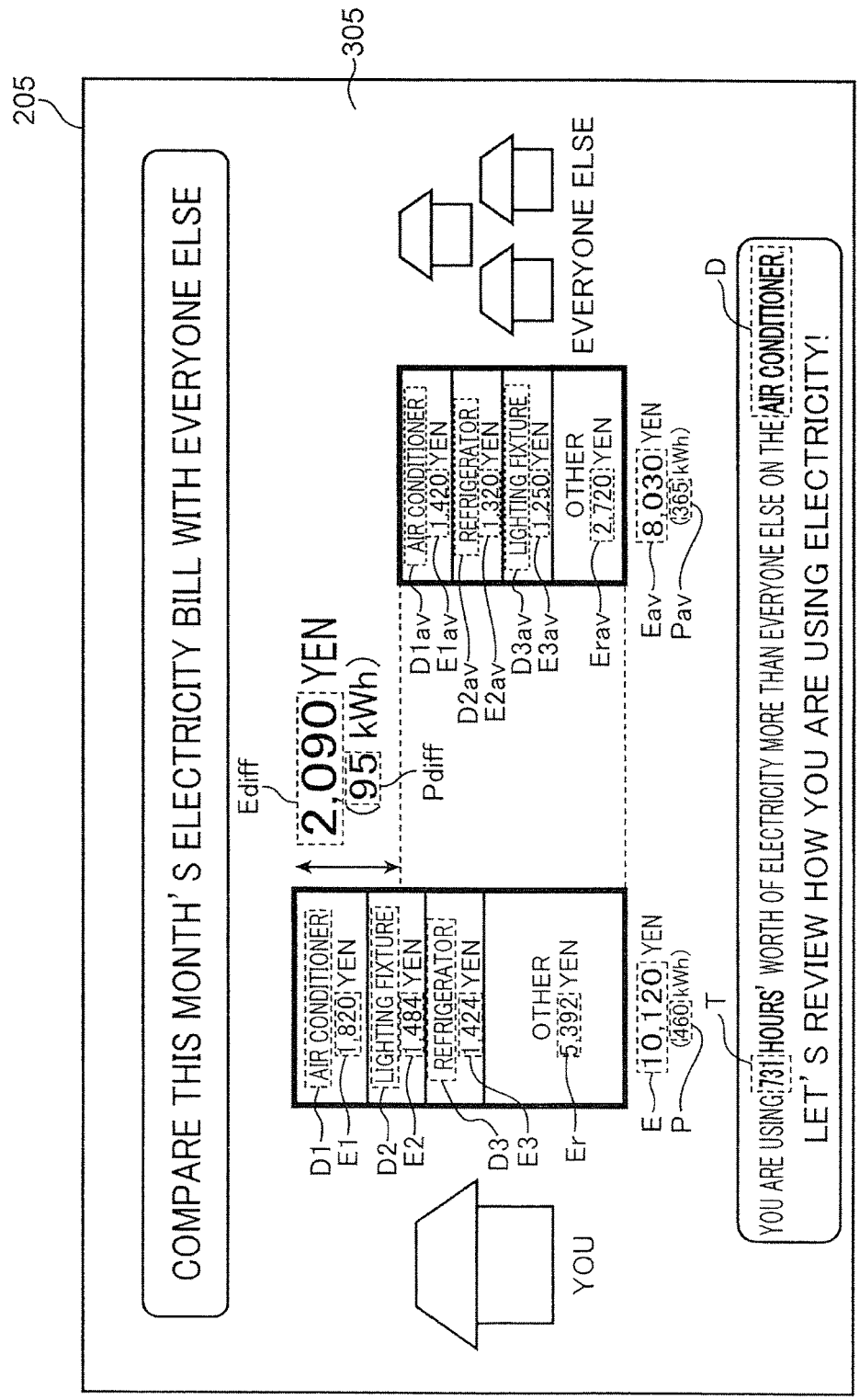
FIG. 25 is a diagram showing an example of display data including an electricity bill corresponding to each of a plurality of electric home appliances according to the present first embodiment.

FIG. 25 is a diagram showing an example of display data including an electricity bill corresponding to each of a plurality of electric home appliances according to the present first embodiment. Moreover, display data 205 shown in FIG. 25 is display data that is generated when power consumption P is higher than average power consumption Pav.

In the display data 205 shown in FIG. 25, power consumption P, an electricity bill E, average power consumption Pav, an average electricity bill Eav, a power consumption difference Pdiff, an electricity bill difference Ediff, an estimated used device D, an estimated use time T, device types D1, D2, and D3, estimated electricity bills E1, E2, and E3, a total estimated electricity bill Er, device types D1av, D2av, and D3av, average estimated electricity bills E1av, E2av, and E3av, and a total average estimated electricity bill Erav are respectively applied to a first display data template 305.

The first display data template 305 shown in FIG. 25 differs from the first display data template 301 shown in FIG. 18 in that the device types D1, D2, and D3, the estimated electricity bills E1, E2, and E3, the total estimated electricity bill Er, the device types D1av, D2av, and D3av, the average estimated electricity bills E1av, E2av, and E3av, and the total average estimated electricity bill Erav are displayed. The estimated electricity bills E1, E2, and E3 of the device types D1, D2, and D3 are displayed as a breakdown of the electricity bill E, and the total estimated electricity bill Er of device types other than the device types D1, D2, and D3 is displayed. In addition, the average estimated electricity bills E1av, E2av, and E3av of the device types D1av, D2av, and D3av are displayed as a breakdown of the average electricity bill Eav, and the total average estimated electricity bill Erav of device types other than the device types D1av, D2av, and D3av is displayed.

In the example shown in FIG. 25, "air conditioner" is applied as the device type D1, "lighting fixture" is applied as the device type D2. "refrigerator" is applied as the device type D3, "1,820" (yen) is applied as the estimated electricity bill E1, "1,484" (yen) is applied as the estimated electricity bill E2, "1,424" (yen) is applied as the estimated electricity bill E3, and "5,392" (yen) is applied as the total estimated electricity bill Er. In addition, "air conditioner" is applied as the device type D1av, "refrigerator" is applied as the device type D2av, "lighting fixture" is applied as the device type D3av, "1,420" (yen) is applied as the average estimated electricity bill E1va, "1,320" (yen) is applied as the average estimated electricity bill E2av, "1,250" (yen) is applied as the average estimated electricity bill E3av, and "2,720" (yen) is applied as the total average estimated electricity bill Erav.

Moreover, while an electric home appliance of a type with highest power usage among electric home appliances corresponding to first user ID in a prescribed period is selected in the device selection process according to the present first embodiment, the present disclosure is not limited thereto. Alternatively, an electric home appliance of a type with a longest use time among electric home appliances corresponding to the first user ID in the prescribed period may be selected in the device selection process. Hereinafter, a device selection process in which an electric home appliance of a type with a longest use time is selected among electric home appliances corresponding to the first user ID in a prescribed period will be described with reference to FIG. 26.

Figure 26:
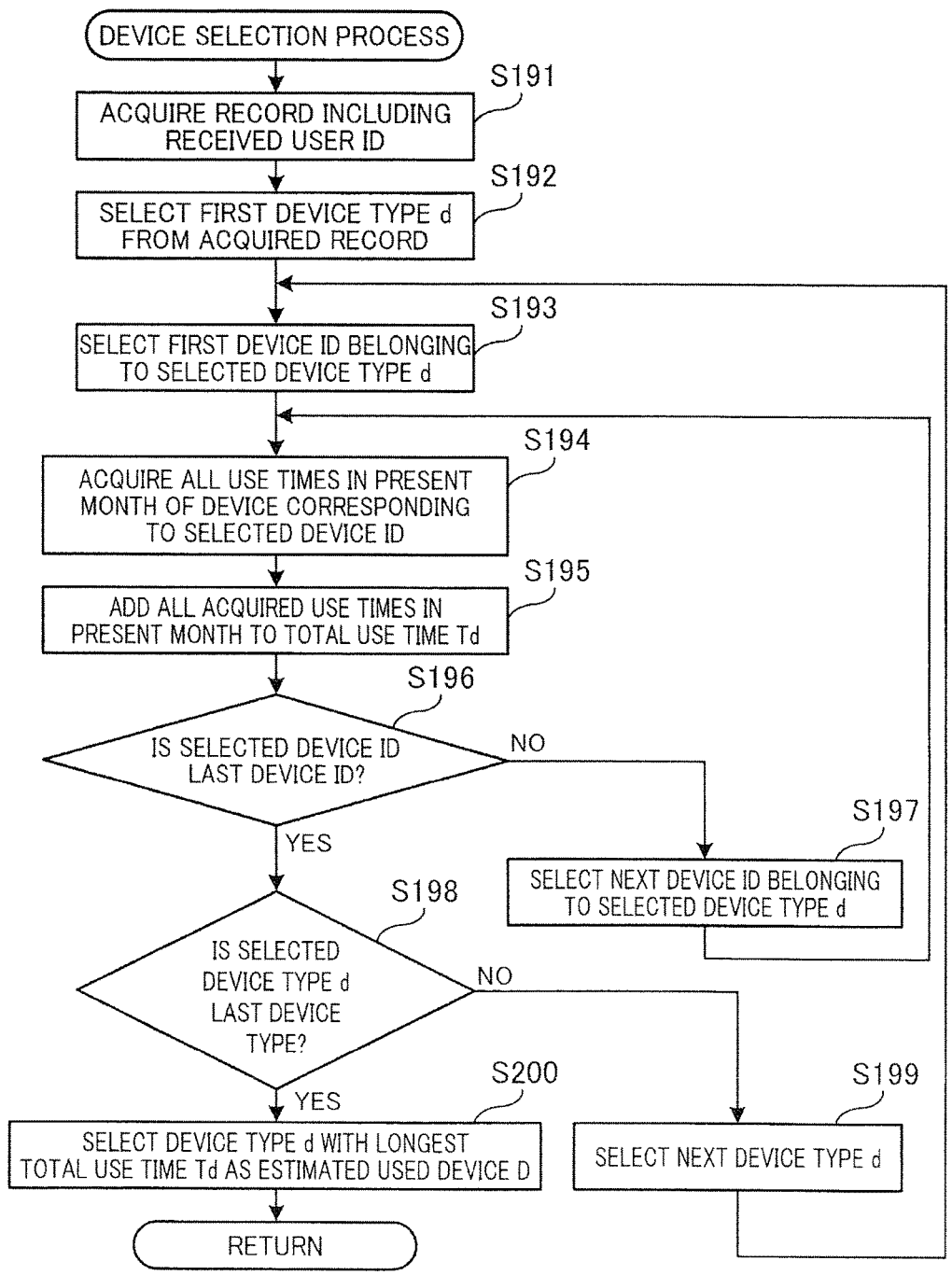
FIG. 26 is a flow chart illustrating details of a modification of the device selection process according to the first embodiment of the present disclosure.

FIG. 26 is a flow chart illustrating details of a modification of the device selection process according to the first embodiment of the present disclosure.

Since processes of steps S191 to S197 are the same as the processes of steps S51 to S57 shown in FIG. 15, a description thereof will be omitted.

When it is determined that a selected device ID is a last device ID in a selected device type d (YES in step S196), in step S198, the device selecting unit 106 determines whether or not the selected device type d is a last device type in an acquired record. When it is determined that the selected device type d is not the last device type in the acquired record (NO in step S198), in step S199, the device selecting unit 106 selects a next device type in the acquired record. Subsequently, the device selecting unit 106 returns to the process of step S193 and performs processes of step S193 and subsequent steps.

On the other hand, when it is determined that the selected device type d is the last device type in the acquired record (YES in step S198), in step S200, the device selecting unit 106 compares a total use time Td of all device types and selects a device type d with a longest total use time Td as the estimated used device D. Subsequently, the device selecting unit 106 ends the device selection process.

Second Embodiment

In the first embodiment, display data is generated which indicates that a differential value between power usage corresponding to first user ID and power usage corresponding to second user ID in a prescribed period corresponds to an estimated use time (a first conversion value) that is generated by converting the differential value to a use time of an estimated used device (an electric home appliance of a first type). However, when the estimated use time is significantly long, a user may not be able to realize how long the estimated use time is.

In consideration thereof, in the second embodiment, a differential value between power usage corresponding to first user ID and power usage corresponding to second user ID in a prescribed period is converted to respective estimated use times of a plurality of types of electric home appliances.

Figure 27:
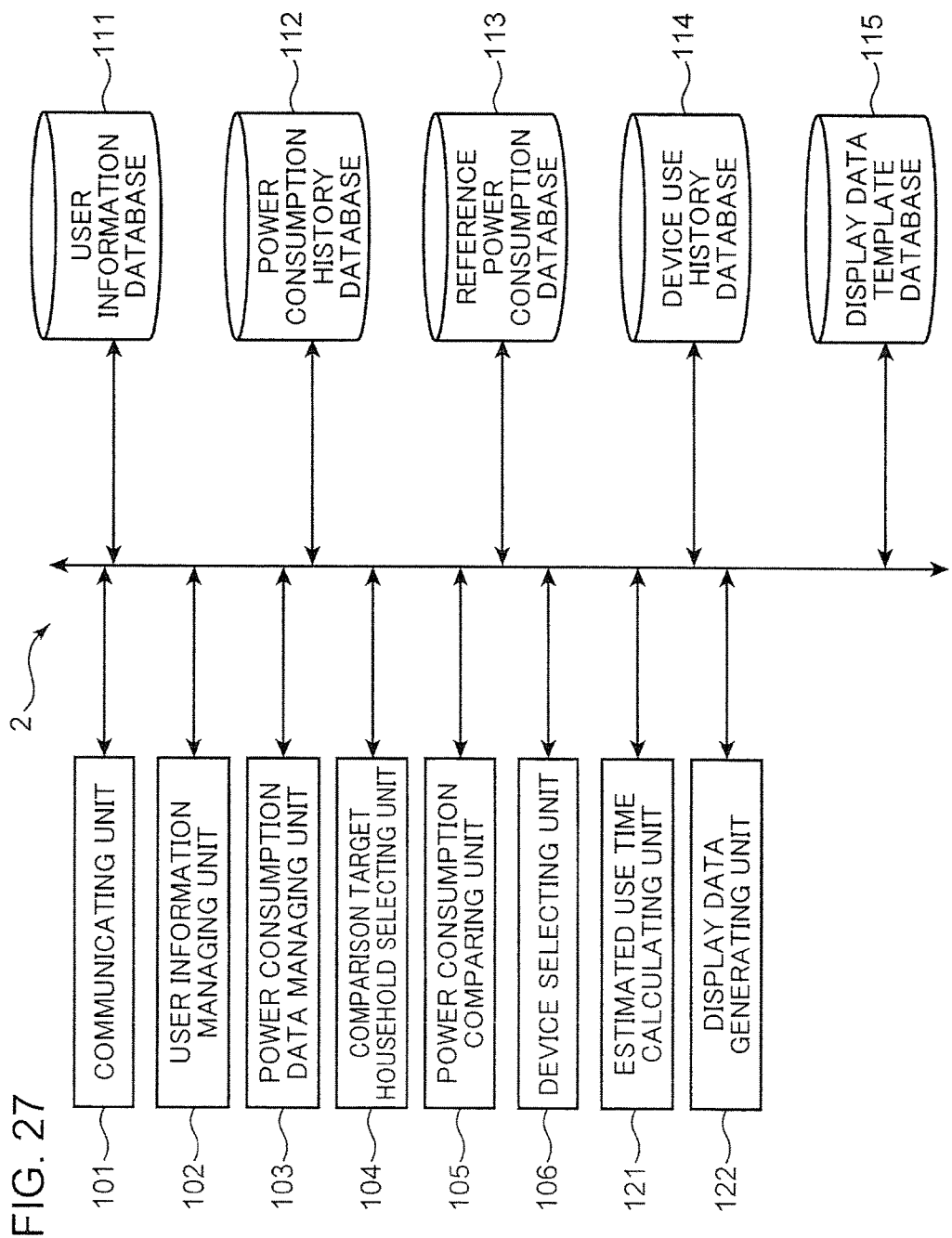
FIG. 27 is a diagram showing a software configuration of a server according to a second embodiment of the present disclosure.

FIG. 27 is a diagram showing a software configuration of a server 2 according to the second embodiment of the present disclosure.

The server 2 shown in FIG. 27 includes a communicating unit 101, a user information managing unit 102, a power consumption data managing unit 103, a comparison target household selecting unit 104, a power consumption comparing unit 105, a device selecting unit 106, an estimated use time calculating unit 121, a display data generating unit 122, a user information database 111, a power consumption history database 112, a reference power consumption database 113, a device use history database 114, and a display data template database 115.

Moreover, a configuration of an information management system according to the second embodiment is the same as the configuration of the information management system according to the first embodiment. In addition, components of the server 2 according to the second embodiment that are the same as those of the server 2 according to the first embodiment will be denoted by same reference numerals and a description thereof will be omitted.

The estimated use time calculating unit 121 generates a second conversion value by converting a portion of a differential value to a use time of an electric home appliance of a first type when a first conversion value exceeds a prescribed upper limit value. In addition, the estimated use time calculating unit 121 generates a third conversion value by converting the remaining portion of the differential value to a use time of an electric home appliance of a second type among the electric home appliances corresponding to first user ID.

Moreover, the electric home appliance of the first type includes an electric home appliance of a type with highest power usage among the electric home appliances corresponding to the first user ID in the prescribed period. In addition, the electric home appliance of the second type includes an electric home appliance of a type with second highest power usage among the electric home appliances corresponding to the first user ID in the prescribed period.

Furthermore, the electric home appliance of the first type favorably includes an air conditioner, a television set, or a lighting fixture. In addition, when the electric home appliance of the first type is any of an air conditioner, a television set, and a lighting fixture, the electric home appliance of the second type favorably includes any of an air conditioner, a television set, and a lighting fixture that does not overlap with the electric home appliance of the first type.

The display data generating unit 122 generates display data indicating that the differential value between power usage corresponding to first user ID and power usage corresponding to second user ID in the prescribed period corresponds to the second conversion value that is generated by converting a portion of the differential value to a use time of the electric home appliance of the first type and a third conversion value that is generated by converting the remaining portion of the differential value to a use time of the electric home appliance of the second type.

In addition, the display data generating unit 122 generates display data indicating that a first electricity bill value corresponding to the differential value between power usage corresponding to second user ID and power usage corresponding to first user ID in the prescribed period corresponds to the second conversion value that is generated by converting a portion of the differential value to a use time of the electric home appliance of the first type and a third conversion value that is generated by converting the remaining portion of the differential value to a use time of the electric home appliance of the second type.

The display data template database 115 stores a first display data template that is displayed when a first cumulative value of power usage corresponding to first user ID among a plurality of user IDs in a prescribed period is greater than a second cumulative value of power usage corresponding to second user ID among the plurality of user IDs in a same period as the prescribed period and exceeds a prescribed upper limit value, a second display data template that is displayed when the first cumulative value is equal to or smaller than the second cumulative value, and a third display data template that is displayed when the first cumulative value is greater than the second cumulative value but does not exceed the prescribed upper limit value.

An outline of processes of the server 2 according to the second embodiment of the present disclosure is the same as the outline of processes of the server 2 according to the first embodiment of the present disclosure shown in FIG. 11. Hereinafter, an estimated use time calculation process and a display data generation process which differ from the first embodiment will be described.

Figure 28:
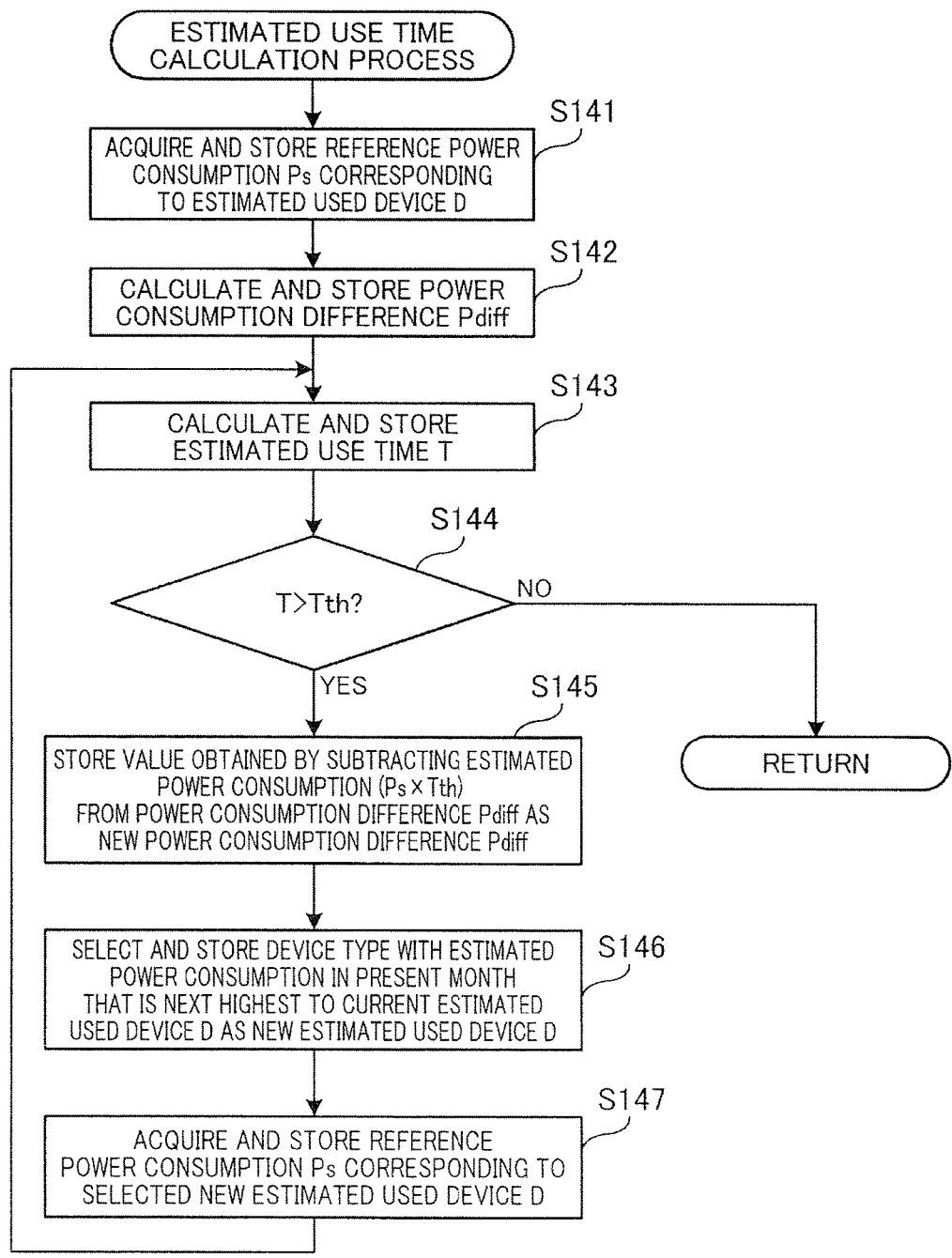
FIG. 28 is a flow chart illustrating details of an estimated use time calculation process according to the second embodiment of the present disclosure.

FIG. 28 is a flow chart illustrating details of the estimated use time calculation process according to the second embodiment of the present disclosure.

First, in step S141, the estimated use time calculating unit 121 acquires reference power consumption Ps corresponding to an estimated used device D selected by the device selecting unit 106 from the reference power consumption database 113 and stores the acquired reference power consumption Ps. The acquired reference power consumption Ps is temporarily stored in, for example, the RAM 23.

Next, in step S142, the estimated use time calculating unit 121 calculates a power consumption difference Pdiff that is a differential value between power consumption P in the present month corresponding to the received user ID and average power consumption Pav of all comparison target households and stores the calculated power consumption difference Pdiff. The estimated use time calculating unit 121 calculates the power consumption difference Pdiff by subtracting the average power consumption Pav of all comparison target households from the power consumption P in the present month corresponding to the received user ID. The calculated power consumption difference Pdiff is temporarily stored in, for example, the RAM 23.

Next, in step S143, the estimated use time calculating unit 121 calculates an estimated use time T by dividing the calculated power consumption difference Pdiff by the acquired reference power consumption Ps and stores the calculated estimated use time T. The calculated estimated use time T is temporarily stored in, for example, the RAM 23.

Next, in step S144, the estimated use time calculating unit 121 determines whether or not the calculated estimated use time T is longer than a prescribed threshold period Tth. The prescribed threshold period Tth is, for example, 720 hours. The prescribed threshold period Tth is stored in the storage unit 27 in advance. When it is determined that the calculated estimated use time T is equal to or shorter than the prescribed threshold period Tth (NO in step S144), the estimated use time calculating unit 121 ends the estimated use time calculation process.

Moreover, for example, the prescribed threshold period Tth is favorably a period over which the estimated used device D had been used in one month (prescribed period).

The prescribed threshold period Tth may be, for example, a period over which the estimated used device D had been used in the present month or the previous month. In addition, the prescribed threshold period Tth may be a period over which the estimated used device D had been used in the same month as the present month a year ago. Furthermore, the prescribed threshold period Tth may be an average of periods over which the estimated used device D had been used in the respective months in one year.

On the other hand, when it is determined that the estimated use time T is longer than the prescribed threshold period Tth (YES in step S144), in step S145, the estimated use time calculating unit 121 subtracts estimated power consumption in a case where the estimated used device D has been used over the prescribed threshold period Tth (reference power consumption Ps×prescribed threshold period Tth) from the power consumption difference Pdiff and stores the value obtained by the subtraction as a new power consumption difference Pdiff. The calculated new power consumption difference Pdiff is temporarily stored in, for example, the RAM 23.

Next, in step S146, the estimated use time calculating unit 121 selects a device type with estimated power consumption in the present month that is next highest to the currently selected estimated used device D from estimated power consumption of all device types selected by the device selecting unit 106 as a new estimated used device D and stores the new estimated used device D. The selected new estimated used device D is temporarily stored in, for example, the RAM 23.

Next, in step S147, the estimated use time calculating unit 121 acquires reference power consumption Ps corresponding to the selected new estimated used device D from the reference power consumption database 113 and stores the acquired reference power consumption Ps. The acquired reference power consumption Ps is temporarily stored in, for example, the RAM 23. Subsequently, the estimated use time calculating unit 121 returns to the process of step S143 and performs processes of step S143 and subsequent steps.

Figure 29:
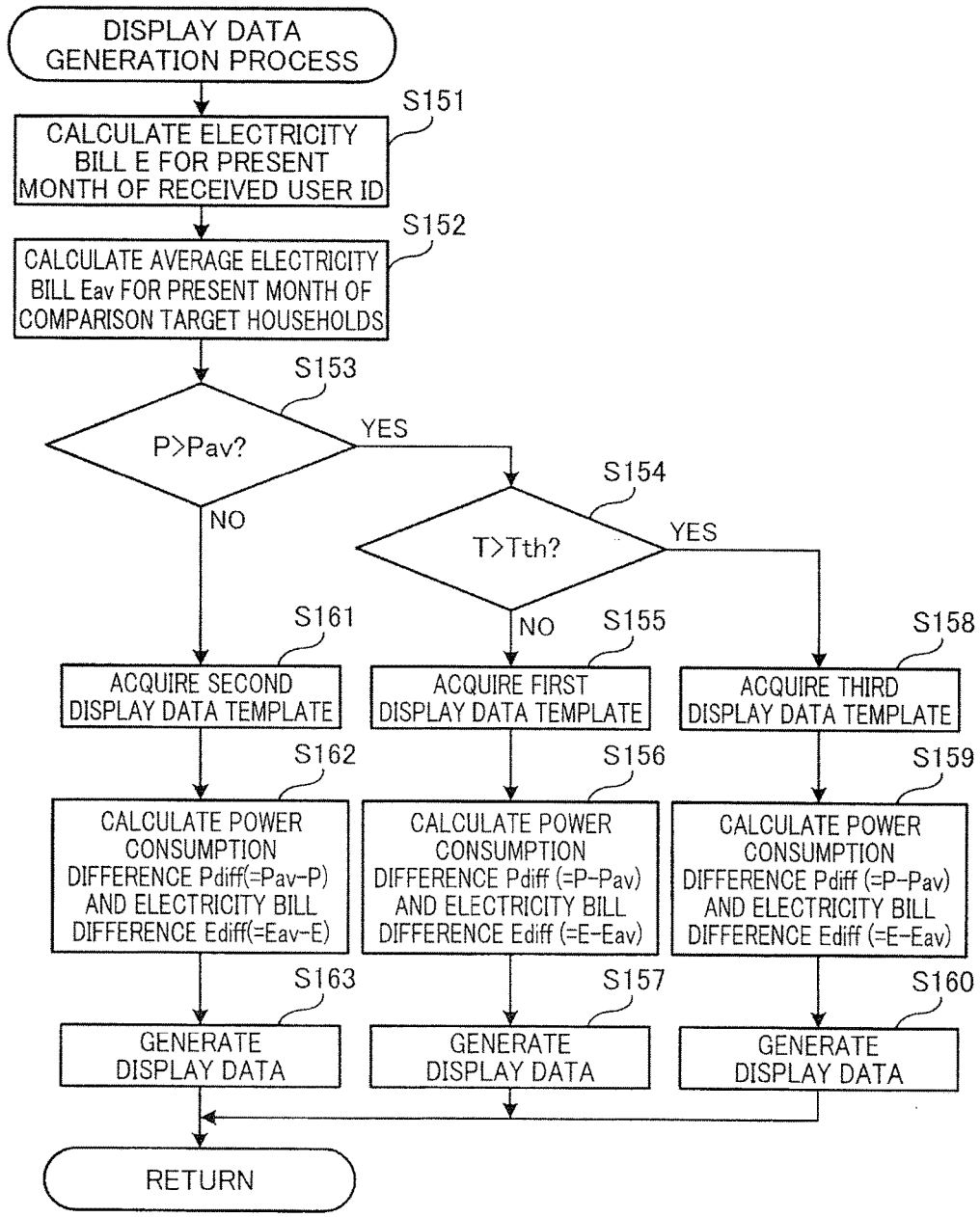
FIG. 29 is a flow chart illustrating details of a display data generation process according to the second embodiment of the present disclosure.

FIG. 29 is a flow chart illustrating details of the display data generation process according to the second embodiment of the present disclosure.

Since processes of steps S151 to S153 are the same as the processes of steps S81 to S83 shown in FIG. 17, a description thereof will be omitted.

When it is determined in step S153 that power consumption P is higher than average power consumption Pav (YES in step S153), the display data generating unit 122 determines whether or not an estimated use time T is longer than the prescribed threshold period Tth. When it is determined that the estimated use time T is equal to or shorter than the prescribed threshold period Tth (NO in step S154), the display data generating unit 122 acquires a first display data template that is displayed when the power consumption P is higher than the average power consumption Pav and the estimated use time T is equal to or shorter than the prescribed threshold period Tth from the display data template database 115 in step S155. Moreover, the first display data template is the same as the first display data template described in the first embodiment.

Since processes of steps S156 and S157 are the same as the processes of steps S85 and S86 shown in FIG. 17, a description thereof will be omitted.

On the other hand, when it is determined that the estimated use time T is longer than the prescribed threshold period Tth (YES in step S154), in step S158, the display data generating unit 122 acquires a third display data template that is displayed when the power consumption P is higher than the average power consumption Pav and the estimated use time T is longer than the prescribed threshold period Tth from the display data template database 115.

Next, in step S159, the display data generating unit 122 calculates a power consumption difference Pdiff that is a differential value between the power consumption P corresponding to the received user ID and the average power consumption Pav corresponding to the user IDs of the comparison target households and an electricity bill difference Ediff that is a differential value between the electricity bill E for the present month of the received user ID and the average electricity bill Eav for the present month of the comparison target households. The display data generating unit 122 calculates the power consumption difference Pdiff by subtracting the average power consumption Pav corresponding to the user IDs of the comparison target households from the power consumption P corresponding to the received user ID. In addition, the display data generating unit 122 calculates the electricity bill difference Ediff by subtracting the average electricity bill Eav for the present month of the comparison target households from the electricity bill E for the present month of the received user ID.

Next, in step S160, the display data generating unit 122 generates display data that respectively applies the power consumption P, the electricity bill E, the average power consumption Pav, the average electricity bill Eav, the power consumption difference Pdiff, the electricity bill difference Ediff, all estimated used devices D, the prescribed threshold period Tth, and an estimated use time T of a last selected estimated used device to the acquired third display data template. Subsequently, the display data generating unit 122 ends the display data generation process.

Since processes of steps S161 to S163 are the same as the processes of steps S87 to S89 shown in FIG. 17, a description thereof will be omitted.

Figure 30:
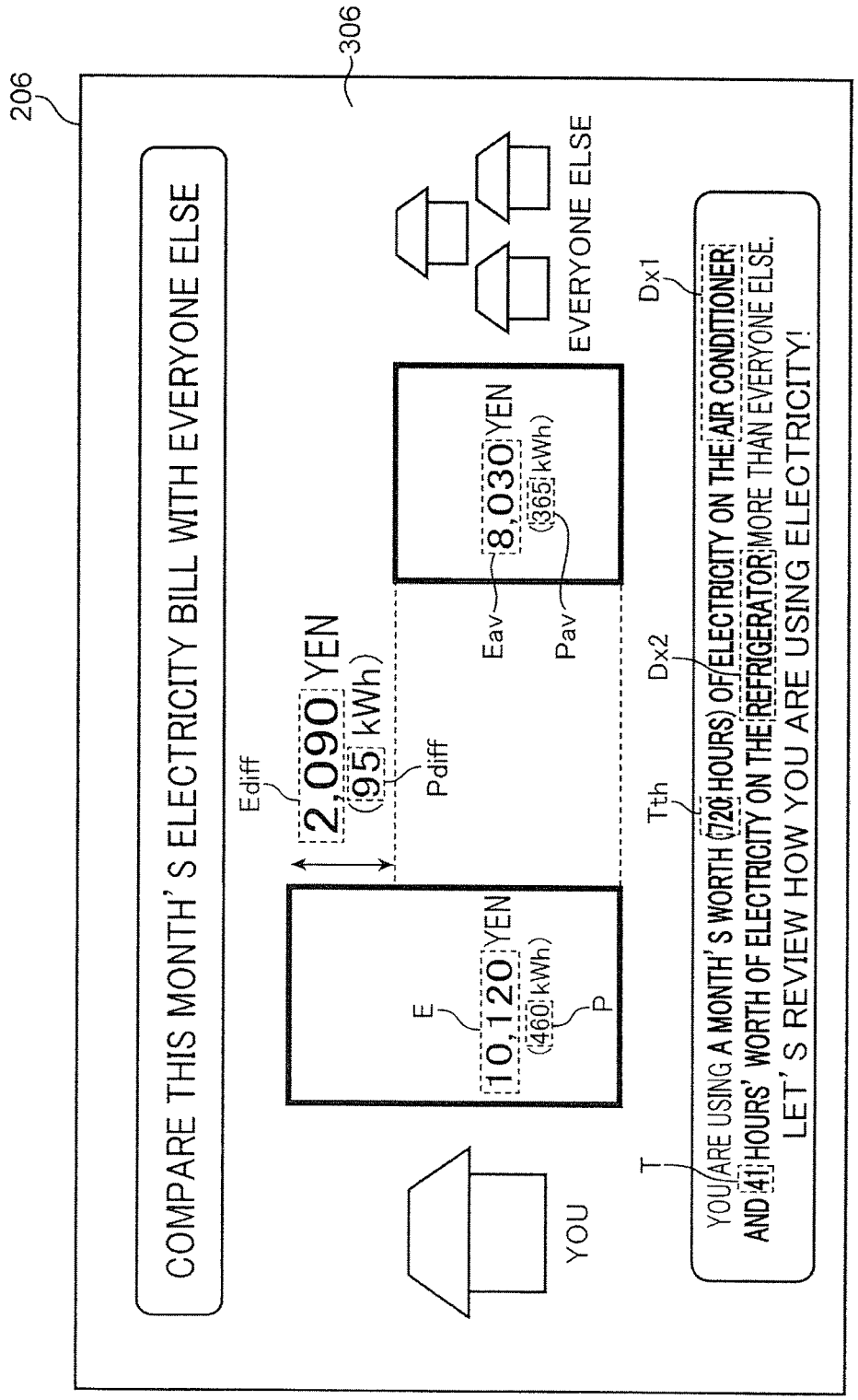
FIG. 30 is a diagram showing an example of display data that is generated when power consumption P is higher than average power consumption Pav and an estimated use time T is longer than a prescribed threshold period Tth according to the present second embodiment.

FIG. 30 is a diagram showing an example of display data that is generated when power consumption P is higher than average power consumption Pav and an estimated use time T is longer than the prescribed threshold period Tth according to the present second embodiment.

In display data 206 shown in FIG. 30, power consumption P, an electricity bill E, average power consumption Pav, an average electricity bill Eav, a power consumption difference Pdiff, an electricity bill difference Ediff, estimated used devices Dx1 and Dx2, a prescribed threshold period Tth, and an estimated use time T are respectively applied to a third display data template 306.

Moreover, the estimated used device Dx1 is a device type with highest estimated power consumption and the estimated used device Dx2 is a device type with second highest estimated power consumption. The estimated use time T is an estimated use time of the estimated used device Dx2. In addition, the prescribed threshold period Tth is set to, for example, 720 hours.

For example, the third display data template 306 includes texts reading "Compare this month's electricity bill with everyone else" and "You are using a month's worth (BBBB hours) of electricity on AAAA and DDDD hours' worth of electricity on CCCC more than everyone else. Let's review how you are using electricity!" The estimated used device Dx1 with the highest estimated power consumption is applied to "AAAA" and the prescribed threshold period Tth is applied to "BBBB". In addition, the estimated used device Dx2 with the second highest estimated power consumption is applied to "CCCC" and the estimated use time T of the estimated used device Dx2 selected last is applied to "DDDD".

Furthermore, in the example shown in FIG. 30, "460" (kWh) is applied as the power consumption P, "10,120" (yen) is applied as the electricity bill E, "365" (kWh) is applied as the average power consumption Pav, "8,030" (yen) is applied as the average electricity bill Eav, "95" (kWh) is applied as the power consumption difference Pdiff, and "2,090" (yen) is applied as the electricity bill difference Ediff.

In addition, in the example shown in FIG. 30, an air conditioner is selected as the estimated used device Dx1 with the highest estimated power consumption and a refrigerator is selected as the estimated used device Dx2 with the second highest estimated power consumption. Therefore, "air conditioner" is applied as the estimated used device Dx1, "720" (hours) is applied as the prescribed threshold period Tth, "refrigerator" is applied as the estimated used device Dx2, and "41" (hours) is applied as the estimated use time T.

As shown, since a differential value between power usage corresponding to first user ID and power usage corresponding to second user ID in a prescribed period is converted to respective estimated use times of a plurality of types of electric home appliances, the user can realize how long the estimated use times are.

Moreover, while an electric home appliance with the highest power consumption and an electric home appliance with the second highest power consumption among electric home appliances corresponding to first user ID in a prescribed period are selected in the device selection process and the estimated use time calculation process according to the present second embodiment, the present disclosure is not limited thereto. Alternatively, an electric home appliance with a longest use time and an electric home appliance with a second longest use time among the electric home appliances corresponding to the first user ID in the prescribed period may be selected in the device selection process and the estimated use time calculation process. A device selection process in which an electric home appliance of a type with a longest use time is selected among electric home appliances corresponding to first user ID in a prescribed period is the same as the device selection process shown in FIG. 26.

Hereinafter, an estimated use time calculation process in which an electric home appliance of a type with a longest use time and an electric home appliance of a type with a second longest use time are selected among electric home appliances corresponding to first user ID in a prescribed period will be described with reference to FIG. 31.

Figure 31:
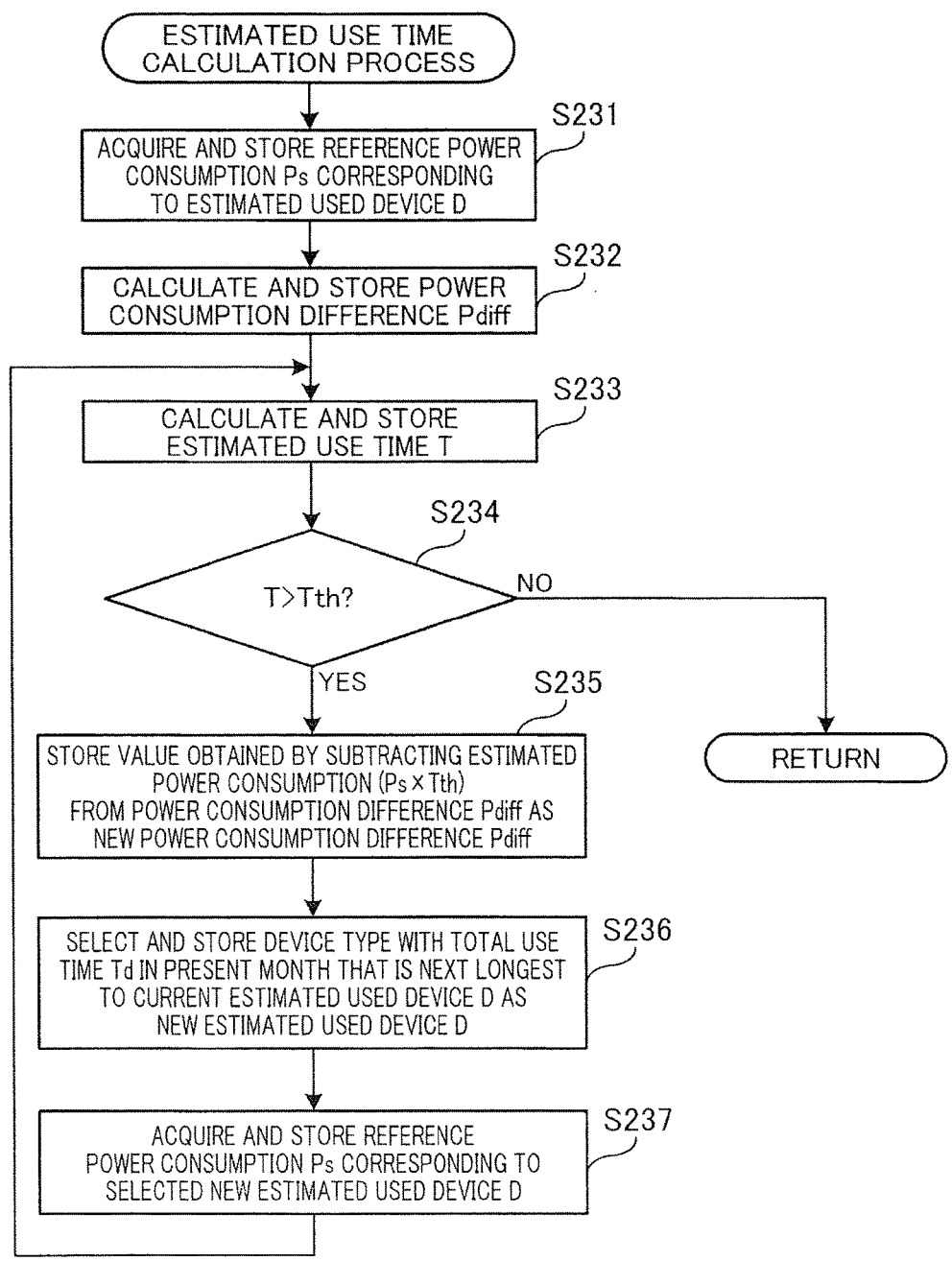
FIG. 31 is a flow chart illustrating details of a modification of the estimated use time calculation process according to the second embodiment of the present disclosure.

FIG. 31 is a flow chart illustrating details of a modification of the estimated use time calculation process according to the second embodiment of the present disclosure.

Since processes of steps S231 to S235 are the same as the processes of steps S141 to S145 shown in FIG. 28, a description thereof will be omitted.

Next, in step S236, the estimated use time calculating unit 121 selects a device type with a total use time Td in the present month that is next longest to the currently selected estimated used device D from total use times Td of all device types selected by the device selecting unit 106 as a new estimated used device D and stores the new estimated used device D. The selected new estimated used device D is temporarily stored in, for example, the RAM 23.

Since a process of step S237 is the same as the process of step S147 shown in FIG. 28, a description thereof will be omitted.

Moreover, while a differential value between power usage corresponding to first user ID and power usage corresponding to second user ID in a prescribed period is converted to respective estimated use times of two types of electric home appliances in the second embodiment, the present disclosure is not particularly limited thereto and the differential value may alternatively be converted to respective estimated use times of three or more types of electric home appliances.

Third Embodiment

For example, use of an air conditioner and a lighting fixture can be cut down for the purpose of achieving energy conservation. However, for example, since a refrigerator is constantly running, it is impossible to cut down on use of a refrigerator. Therefore, when an electric home appliance such as a refrigerator whose use time cannot be reduced is selected as an estimated used device and an estimated use time of the refrigerator is displayed, a user cannot realize how long the estimated use time is.

In consideration thereof, in the third embodiment, electric home appliances whose use time cannot be reduced are excluded from selection objects.

Figure 32:
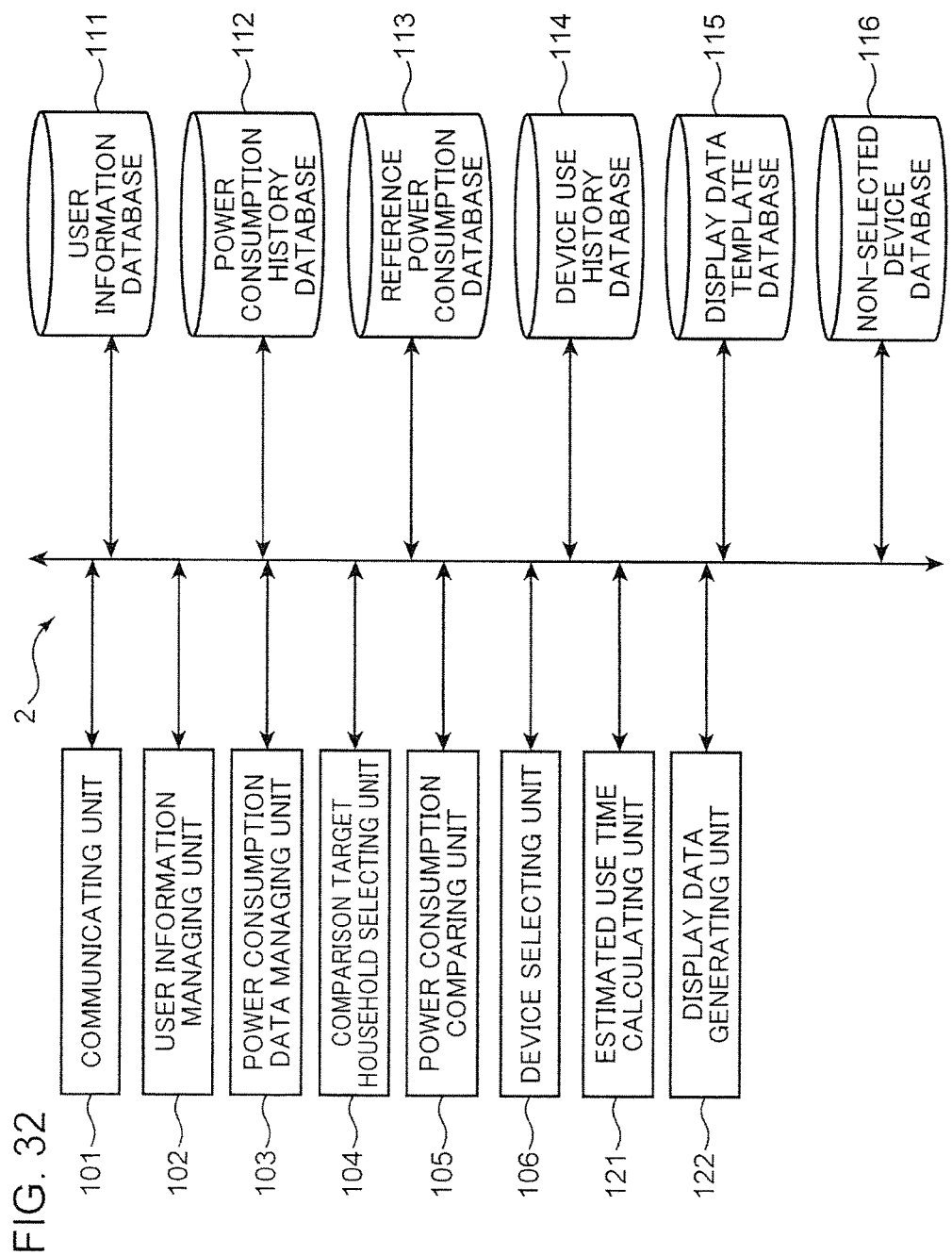
FIG. 32 is a diagram showing a software configuration of a server 2 according to a third embodiment of the present disclosure.

FIG. 32 is a diagram showing a software configuration of a server 2 according to a third embodiment of the present disclosure.

The server 2 shown in FIG. 32 includes a communicating unit 101, a user information managing unit 102, a power consumption data managing unit 103, a comparison target household selecting unit 104, a power consumption comparing unit 105, a device selecting unit 106, an estimated use time calculating unit 121, a display data generating unit 122, a user information database 111, a power consumption history database 112, a reference power consumption database 113, a device use history database 114, a display data template database 115, and a non-selected device database 116.

Moreover, a configuration of an information management system according to the third embodiment is the same as the configuration of the information management systems according to the first and second embodiments. In addition, components of the server 2 according to the third embodiment that are the same as those of the server 2 according to the first and second embodiments will be denoted by same reference numerals and a description thereof will be omitted.

The non-selected device database 116 stores a non-selected device flag that indicates whether or not a device type is selectable as an electric home appliance of a first type whose use time is to be a target of conversion of a differential value. An estimated used device (the electric home appliance of the first type) does not include an electric home appliance of a type whose power-on state continues all day. An electric home appliances of a type whose power-on state continues all day includes, for example, a refrigerator.

FIG. 33 is a diagram showing an example of a non-selected device flag stored in a non-selected device database. As shown in FIG. 33, the non-selected device database 116 stores a device type and a non-selected device flag that indicates whether or not a device type is selectable as an estimated used device in association with each other.

A non-selected device flag with a value of "0" is associated with a device type that is selectable as an estimated used device and a non-selected device flag with a value of "1" is associated with a device type that is not selectable as an estimated used device.

In the example shown in FIG. 33, a non-selected device flag corresponding to a refrigerator has a value of "1" indicating that a refrigerator cannot be selected as an estimated used device while non-selected device flags corresponding to an air conditioner, a lighting fixture, and a television set have a value of "0" indicating that the appliances can be selected as estimated used devices.

An outline of processes of the server 2 according to the third embodiment of the present disclosure is the same as the outline of processes of the server 2 according to the first embodiment of the present disclosure shown in FIG. 11, and a display data generation process of the server 2 according to the third embodiment of the present disclosure is the same as the display data generation process of the server 2 according to the second embodiment of the present disclosure shown in FIG. 29. Hereinafter, an estimated use time calculation process that differs from the first and second embodiments will be described.

Figure 34:
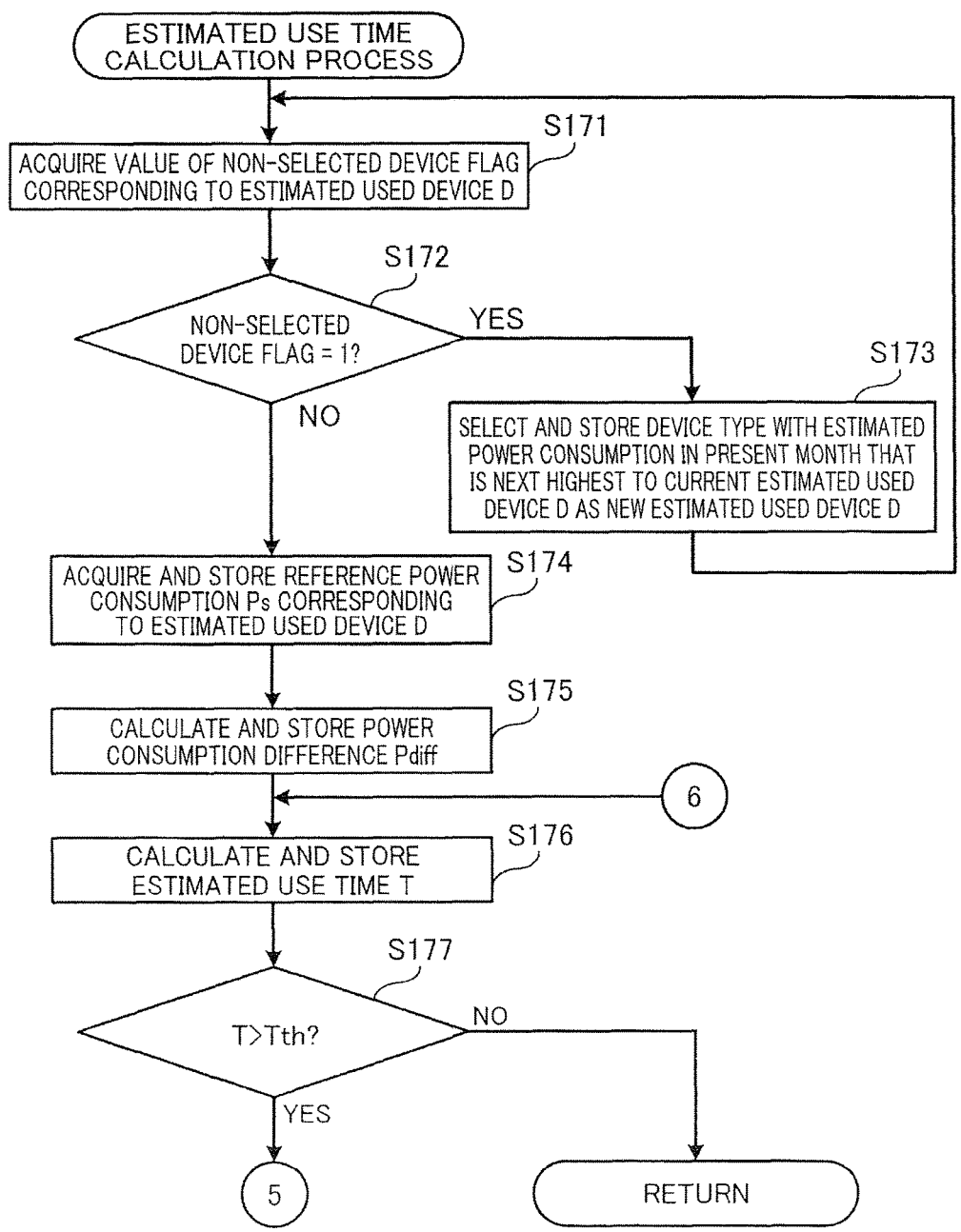
FIG. 34 is a first flow chart illustrating details of an estimated use time calculation process according to the third embodiment of the present disclosure.
Figure 35:
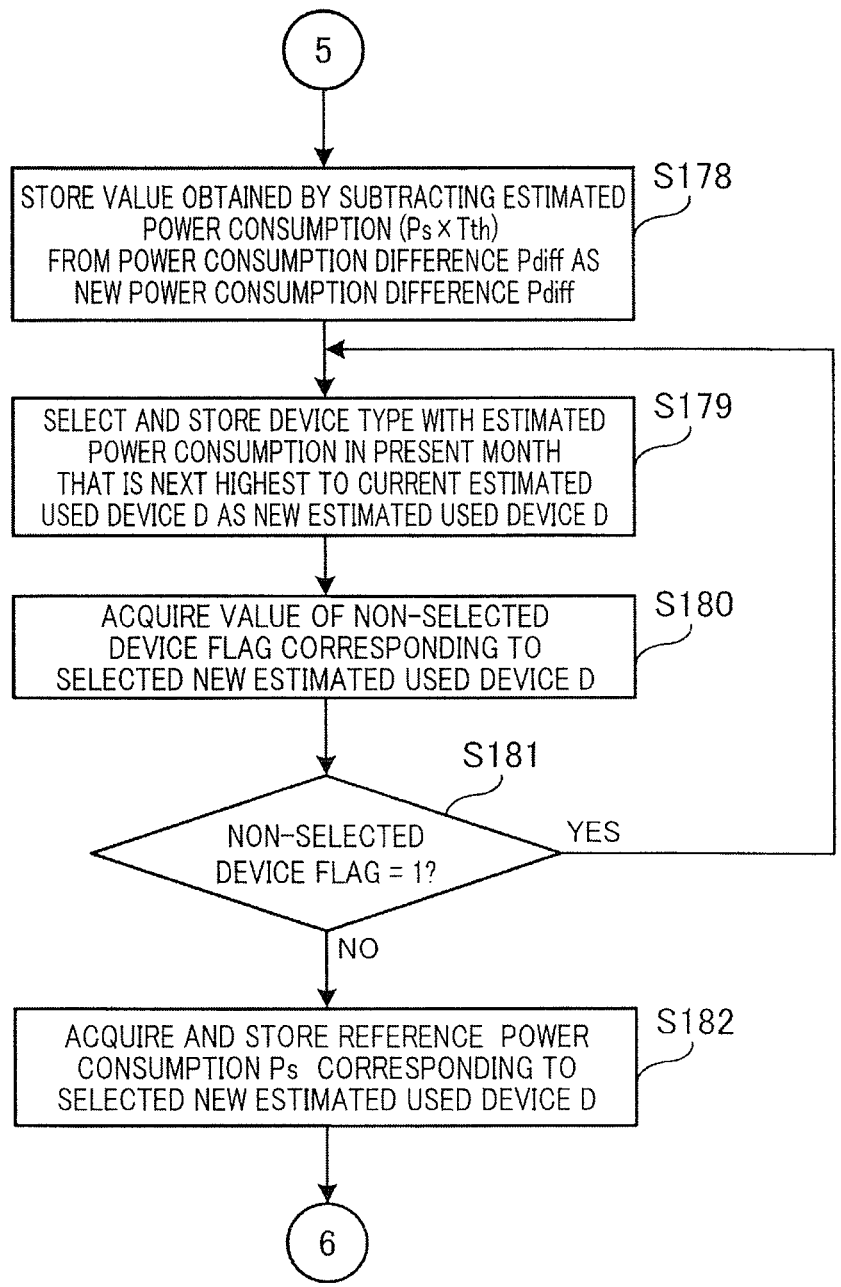
FIG. 35 is a second flow chart illustrating details of the estimated use time calculation process according to the third embodiment of the present disclosure.

FIG. 34 is a first flow chart illustrating details of the estimated use time calculation process according to the third embodiment of the present disclosure, and FIG. 35 is a second flow chart illustrating details of the estimated use time calculation process according to the third embodiment of the present disclosure.

First, in step S171, the estimated use time calculating unit 121 acquires a value of a non-selected device flag corresponding to an estimated used device D selected by the device selecting unit 106 from the non-selected device database 116.

Next, in step S172, the estimated use time calculating unit 121 determines whether or not the value of the acquired non-selected device flag is 1. When it is determined that the value of the acquired non-selected device flag is 1 (YES in step S172), in step S173, the estimated use time calculating unit 121 selects a device type with estimated power consumption in the present month that is next highest to the currently selected estimated used device D from estimated power consumption of all device types selected by the device selecting unit 106 as a new estimated used device D and stores the new estimated used device D. The selected new estimated used device D is temporarily stored in, for example, the RAM 23. Subsequently, the estimated use time calculating unit 121 returns to the process of step S171 and performs processes of step S171 and subsequent steps.

On the other hand, when it is determined that the value of the non-selected device flag is not 1 or, in other words, when it is determined that the value of the non-selected device flag is 0 (NO in step S172), in step S174, the estimated use time calculating unit 121 acquires reference power consumption Ps corresponding to the currently selected estimated used device D from the reference power consumption database 113 and stores the acquired reference power consumption Ps. The acquired reference power consumption Ps is temporarily stored in, for example, the RAM 23.

Since processes of steps S175 to S179 are the same as the processes of steps S142 to S146 shown in FIG. 28, a description thereof will be omitted.

Next, in step S180, the estimated use time calculating unit 121 acquires a value of a non-selected device flag corresponding to the selected new estimated used device D from the non-selected device database 116.

Next, in step S181, the estimated use time calculating unit 121 determines whether or not the value of the acquired non-selected device flag is 1. When it is determined that the value of the non-selected device flag is 1 (YES in step S181), the estimated use time calculating unit 121 returns to the process of step S179 and performs the processes of step S179 and subsequent steps.

On the other hand, when it is determined that the value of the non-selected device flag is not 1 or, in other words, when it is determined that the value of the non-selected device flag is 0 (NO in step S181), in step S182, the estimated use time calculating unit 121 acquires reference power consumption Ps corresponding to the selected new estimated used device D from the reference power consumption database 113 and stores the acquired reference power consumption Ps. The acquired reference power consumption Ps is temporarily stored in, for example, the RAM 23. Subsequently, the estimated use time calculating unit 121 returns to the process of step S176 and performs processes of step S176 and subsequent steps.

Figure 36:
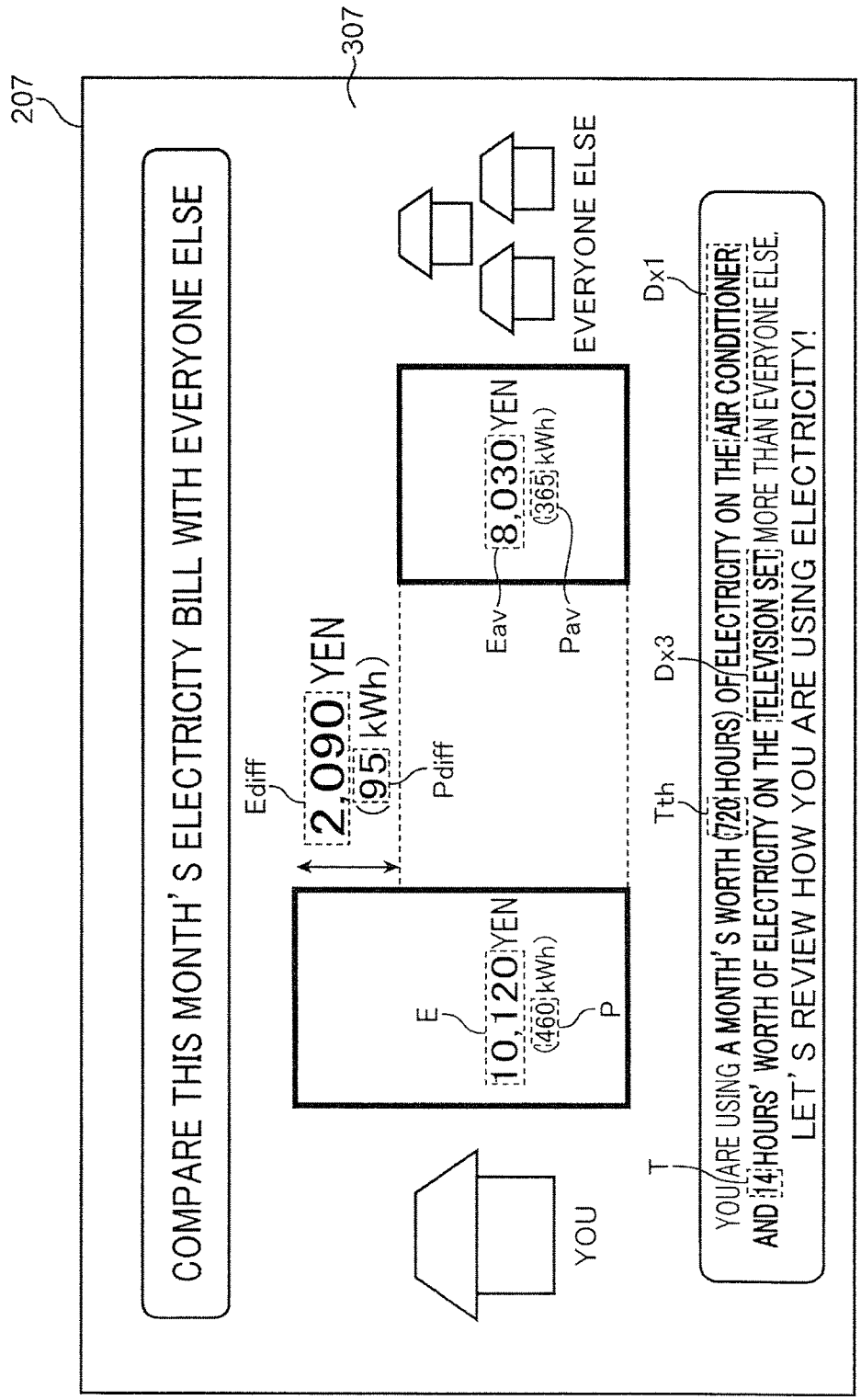
FIG. 36 is a diagram showing an example of display data that is generated when power consumption P is higher than average power consumption Pav and an estimated use time T is longer than a prescribed threshold period Tth according to the present third embodiment.

FIG. 36 is a diagram showing an example of display data that is generated when power consumption P is higher than average power consumption Pav and an estimated use time T is longer than the prescribed threshold period Tth according to the present third embodiment.

In display data 207 shown in FIG. 36, power consumption P, an electricity bill E, average power consumption Pav, an average electricity bill Eav, a power consumption difference Pdiff, an electricity bill difference Ediff, estimated used devices Dx1 and Dx3, a prescribed threshold period Tth, and an estimated use time T are respectively applied to a third display data template 307.

Moreover, the estimated used device Dx1 is a device type with highest estimated power consumption and the estimated used device Dx3 is a device type with third highest estimated power consumption. The estimated use time T is an estimated use time of the estimated used device Dx3. In addition, the prescribed threshold period Tth is set to, for example, 720 hours.

For example, the third display data template 307 includes texts reading "Compare this month's electricity bill with everyone else" and "You are using a month's worth (BBBB hours) of electricity on AAAA and DDDD hours' worth of electricity on CCCC more than everyone else. Let's review how you are using electricity!" The estimated used device Dx1 with the highest estimated power consumption is applied to "AAAA" and the prescribed threshold period Tth is applied to "BBBB". In addition, the estimated used device Dx3 with the third highest estimated power consumption is applied to "CCCC" and the estimated use time T of the estimated used device Dx3 selected last is applied to "DDDD".

Furthermore, in the example shown in FIG. 36, "460" (kWh) is applied as the power consumption P, "10,120" (yen) is applied as the electricity bill E, "365" (kWh) is applied as the average power consumption Pav, "8,030" (yen) is applied as the average electricity bill Eav, "95" (kWh) is applied as the power consumption difference Pdiff, and "2,090" (yen) is applied as the electricity bill difference Ediff.

In addition, in the example shown in FIG. 36, an air conditioner is selected as the estimated used device Dx1 with the highest estimated power consumption, a refrigerator is selected as an estimated used device Dx2 with second highest estimated power consumption, and a television set is selected as the estimated used device Dx3 with the third highest estimated power consumption. Although the estimated power consumption of the refrigerator is second highest, since the non-selected device flag of the refrigerator is set to 1, the refrigerator is not applied to the third display data template 307 as an estimated used device.

Therefore, "air conditioner" is applied as the estimated used device Dx1, "720" (hours) is applied as the prescribed threshold period Tth, "television set" is applied as the estimated used device Dx3, and "14" (hours) is applied as the estimated use time T.

As shown, since a differential value between power usage corresponding to first user ID and power usage corresponding to second user ID in a prescribed period is not converted to an estimated use time of an electric home appliance of a type whose power-on state continues all day, the user can more realize how long the estimated use times are.

Moreover, while an electric home appliance with the highest power consumption and an electric home appliance with the second highest power consumption among selectable electric home appliances corresponding to first user ID in a prescribed period are selected in the device selection process and the estimated use time calculation process according to the present third embodiment, the present disclosure is not limited thereto. Alternatively, an electric home appliance with a longest use time and an electric home appliance with a second longest use time among the selectable electric home appliances corresponding to the first user ID in the prescribed period may be selected in the device selection process and the estimated use time calculation process. A device selection process in which an electric home appliance of a type with the longest use time is selected among electric home appliances corresponding to first user ID in a prescribed period is the same as the device selection process shown in FIG. 26.

Hereinafter, an estimated use time calculation process in which an electric home appliance of a type with a longest use time and an electric home appliance of a type with a second longest use time are selected among selectable electric home appliances corresponding to first user ID in a prescribed period will be described with reference to FIGS. 37 and 38.

Figure 37:
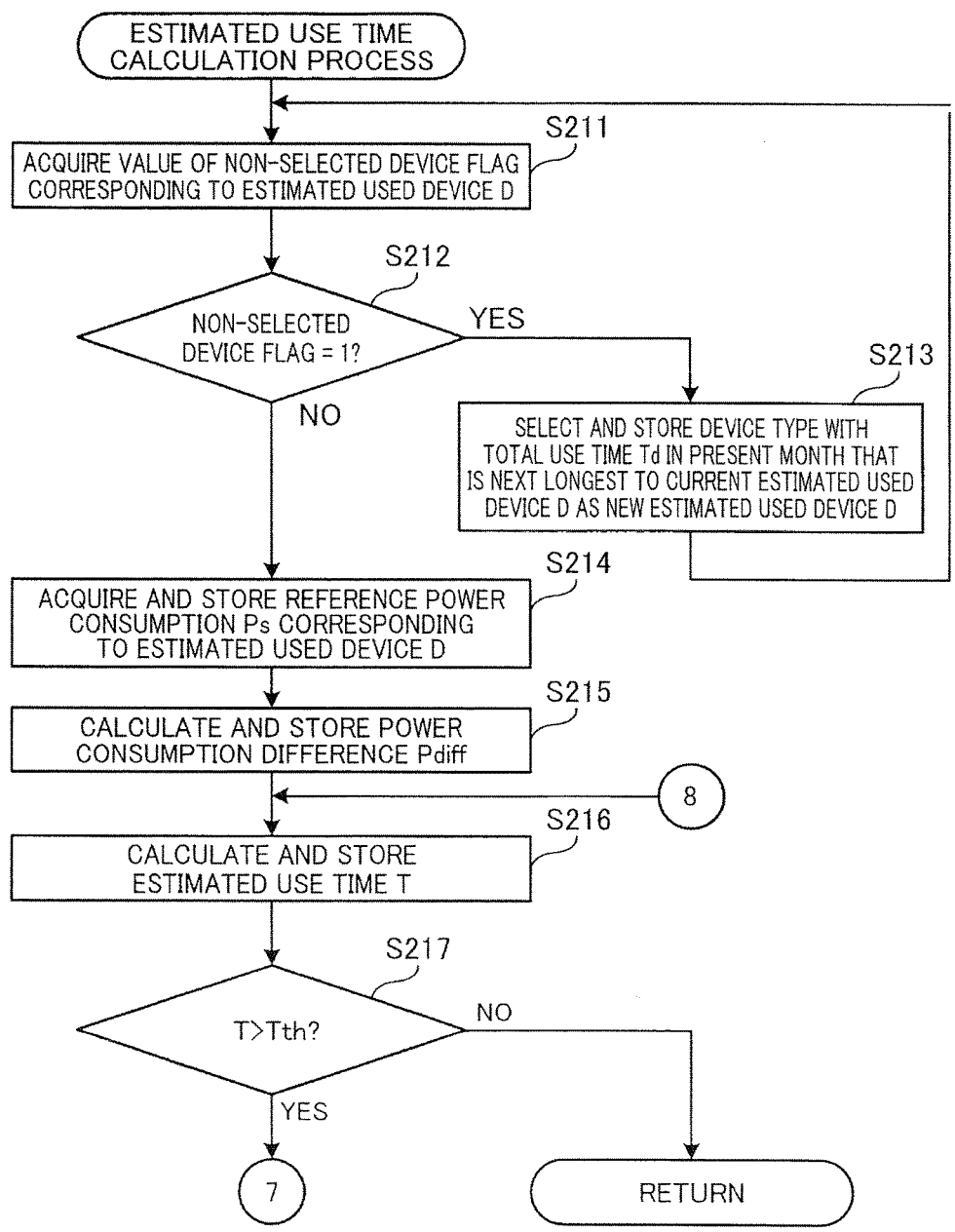
FIG. 37 is a first flow chart illustrating details of a modification of the estimated use time calculation process according to the third embodiment of the present disclosure.
Figure 38:
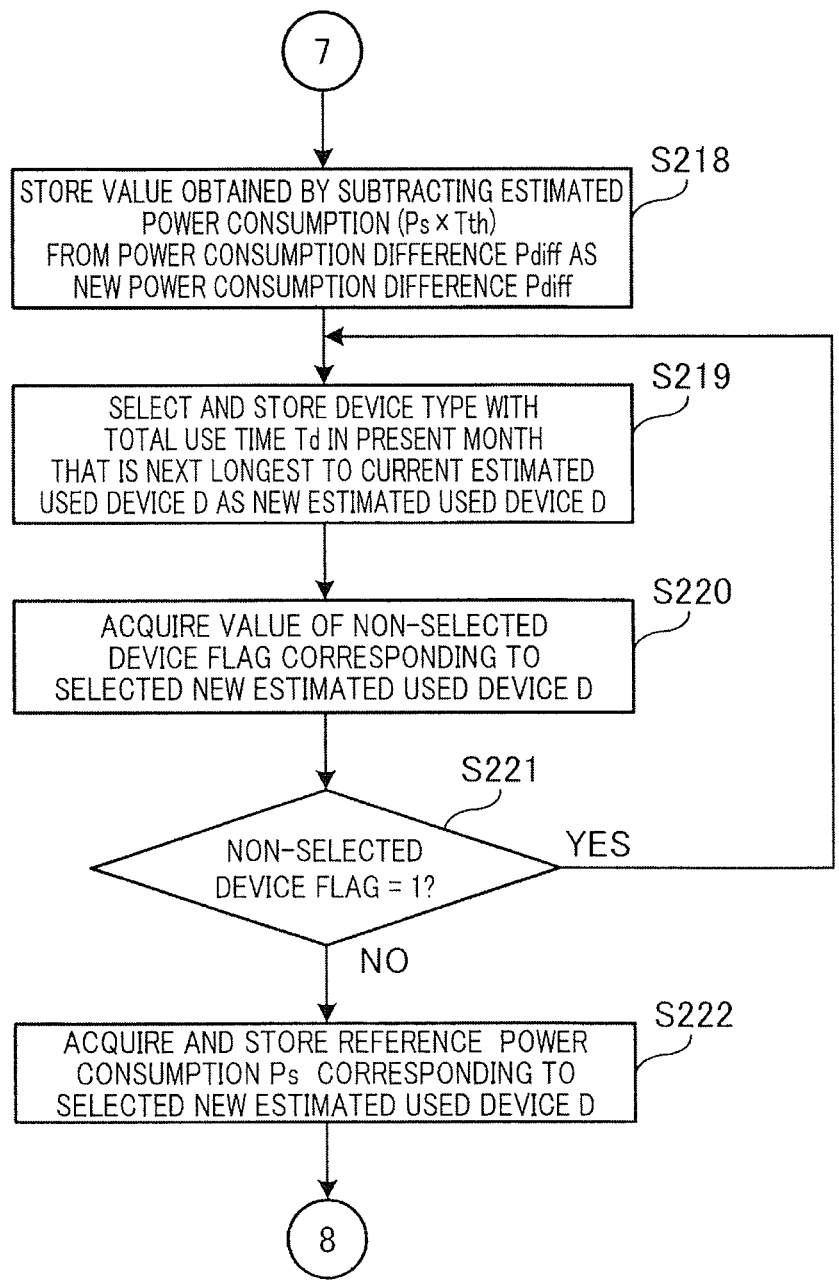
FIG. 38 is a second flow chart illustrating details of a modification of the estimated use time calculation process according to the third embodiment of the present disclosure.

FIG. 37 is a first flow chart illustrating details of a modification of the estimated use time calculation process according to the third embodiment of the present disclosure, and FIG. 38 is a second flow chart illustrating details of a modification of the estimated use time calculation process according to the third embodiment of the present disclosure.

Since processes of steps S211 and S212 are the same as the processes of steps S171 and S172 shown in FIG. 34, a description thereof will be omitted.

When it is determined that a value of the non-selected device flag is 1 (YES in step S212), in step S213, the estimated use time calculating unit 121 selects a device type with a total use time Td in the present month that is next longest to the currently selected estimated used device D from total used times Td of all device types selected by the device selecting unit 106 as a new estimated used device D and stores the new estimated used device D. The selected new estimated used device D is temporarily stored in, for example, the RAM 23. Subsequently, the estimated use time calculating unit 121 returns to the process of step S211 and performs processes of step S211 and subsequent steps.

Since processes of steps S214 to S218 are the same as the processes of steps S174 to S178 shown in FIGS. 34 and 35, a description thereof will be omitted.

Next, in step S219, the estimated use time calculating unit 121 selects a device type with a total use time Td in the present month that is next longest to the currently selected estimated used device D from total use times Td of all device types selected by the device selecting unit 106 as a new estimated used device D and stores the new estimated used device D. The selected new estimated used device D is temporarily stored in, for example, the RAM 23.

Since processes of steps S220 to S222 are the same as the processes of steps S180 to S182 shown in FIG. 35, a description thereof will be omitted.

The specific embodiments and examples set forth in the section titled Description of Embodiments are merely intended to elucidate the technical details of the present disclosure and, as such, the present disclosure should not be narrowly interpreted as being limited to such specific examples. It is to be understood that various changes and modifications can be made to the present disclosure without departing from the spirit thereof and from the scope of the subjoined claims.

INDUSTRIAL APPLICABILITY

The method for providing information, the information management system, and the information terminal device according to the present disclosure are capable of prompting a user to engage in energy conservation and are useful as a method for providing information, an information management system, and an information terminal device for managing information related to usage of an electric home appliance in association with a user ID.

The invention claimed is:
1. A method for providing information in an information management system that manages log information related to electric home appliances in association with each of a plurality of user IDs, the method comprising:
   inputting, via a network, information indicating power usage corresponding to each of the plurality of user IDs;
   obtaining, from the inputted information, power usage for a first type of electric home appliance for each of the plurality of user IDs;
   generating a differential value between i) a first cumulative value of power usage corresponding to a first user ID among the plurality of user IDs in a prescribed period and ii) a second cumulative value of power usage corresponding to a second user ID among the plurality of user IDs in a same period as the prescribed period;
   receiving a selection of a first target electric home appliance among a plurality of electric home appliances of the first type;
   generating a first conversion value by converting the differential value to a use time of the first target electric home appliance corresponding to the first user ID;
   generating a first electricity bill value corresponding to the differential value;
   generating display data indicating that the differential value between i) the first cumulative power usage corresponding to the first user ID and ii) the second cumulative power usage corresponding to the second user ID in the prescribed period corresponds to the first conversion value that is generated by converting the differential value to the use time of the first target electric home appliance; and
   transmitting the display data to an information terminal device corresponding to the first user ID for displaying the display data of the first target electric home appliance on a display of the information terminal device, wherein the display data includes the first electricity bill value, and
   wherein the display data is generated when the first cumulative value is larger than the second cumulative value.

2. The method according to claim 1, wherein
the display data includes the first cumulative value and the second cumulative value.

3. The method according to claim 1, further comprising:
generating a second electricity bill value corresponding to the first cumulative value and a third electricity bill value corresponding to the second cumulative value, wherein
the display data includes the second electricity bill value and the third electricity bill value.

4. The method according to claim 1, wherein
a residence corresponding to the second user ID is located within a prescribed range from a residence corresponding to the first user ID.

5. The method according to claim 1, wherein
a composition of residents in a residence corresponding to the second user ID is the same as a composition of residents in a residence corresponding to the first user ID.

6. The method according to claim 1, wherein
a layout of a residence corresponding to the second user ID is the same as a layout of a residence corresponding to the first user ID.

7. The method according claim 1, wherein
the second user ID is associated with a plurality of second user IDs, and
the second cumulative value is obtained by averaging cumulative values of power usage of electric home appliances corresponding to the plurality of the second user IDs in the prescribed period.

8. The method according to claim 1, wherein
the first target electric home appliance of the first type includes an electric home appliance with highest power usage among the electric home appliances corresponding to the first user ID in the prescribed period.

9. The method according to claim 1, wherein
the first target electric home appliance of the first type includes an electric home appliance with a longest use time among the electric home appliances corresponding to the first user ID in the prescribed period.

10. The method according to claim 1, further comprising:
obtaining a divided value by dividing the differential value using power consumption of the first target electric home appliance of the first type, to use the obtained divided value as the first conversion value.

11. The method according to claim 1, wherein
the first target electric home appliance of the first type includes one of an air conditioner, a television set, and a lighting fixture.

12. The method according to claim 1, further comprising:
generating, when the first conversion value exceeds a prescribed upper limit value, a second conversion value by converting a portion of the differential value to a use time of the first target electric home appliance of the first type;
generating a third conversion value by converting the remaining portion of the differential value to a use time of a second target electric home appliance corresponding to a second type among the electric home appliances corresponding to the first user ID; and
generating the display data which indicates that the differential value corresponds to i) the second conversion value that is generated by converting of the portion of the differential value to the use time of the first target electric home appliance of the first type and to ii) the third conversion value that is generated by converting the remaining portion of the differential value to the use time of the second target electric home appliance of the second type.

13. The method according to claim 12, wherein
the first target electric home appliance of the first type includes a first electric home appliance with highest power usage among the electric home appliances corresponding to the first user ID in the prescribed period, and
the second target electric home appliance of the second type includes a second electric home appliance with second highest power usage among the electric home appliances corresponding to the first user ID in the prescribed period.

14. The method according to claim 12, wherein
the first target electric home appliance of the first type includes a first electric home appliance with a longest use time among the electric home appliances corresponding to the first user ID in the prescribed period, and
the second target electric home appliance of the second type includes a second electric home appliance with a second longest use time among the electric home appliances corresponding to the first user ID in the prescribed period.

15. The method according to claim 12, wherein
the first electric home appliance includes one of an air conditioner, a television set, and a lighting fixture, and when the first electric home appliance is any of the air conditioner, the television set, and the lighting fixture, the second electric home appliance includes any of the air conditioner, the television set, and the lighting fixture that does not overlap with the electric home appliance.

16. The method according to claim 1, wherein
the prescribed period includes one month.

17. The method according to claim 1, wherein
the prescribed period includes one week.

18. The method according to claim 1, wherein
the log information related to the first target electric home appliance includes information indicating a use time of the first target electric home appliance.

19. The method according to claim 1, wherein
the log information related to the first target electric home appliance includes information indicating a use time slot of the first target electric home appliance on each day.

20. The method according to claim 1, wherein
the first target electric home appliance of the first type does not include an electric home appliance which is set to a continuous power-on state all day.

21. The method according to claim 20, wherein
the first target electric home appliance which is set to the continuous power-on state all day includes a refrigerator.

* * * * *